United States Patent
Imamura et al.

(10) Patent No.: US 10,206,202 B2
(45) Date of Patent: Feb. 12, 2019

(54) MOBILE STATION APPARATUS, BASE STATION APPARATUS, COMMUNICATION METHOD, INTEGRATED CIRCUIT, AND COMMUNICATION SYSTEM

(71) Applicant: Sharp Kabushiki Kaisha, Osaka-shi, Osaka (JP)

(72) Inventors: Kimihiko Imamura, Osaka (JP);
Daiichiro Nakashima, Osaka (JP);
Toshizo Nogami, Osaka (JP);
Kazuyuki Shimezawa, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 252 days.

(21) Appl. No.: 14/374,799

(22) PCT Filed: Jan. 17, 2013

(86) PCT No.: PCT/JP2013/050714
§ 371 (c)(1),
(2) Date: Jul. 25, 2014

(87) PCT Pub. No.: WO2013/111657
PCT Pub. Date: Aug. 1, 2013

(65) Prior Publication Data
US 2014/0376479 A1    Dec. 25, 2014

(30) Foreign Application Priority Data
Jan. 27, 2012    (JP) ................................. 2012-015016

(51) Int. Cl.
*H04L 5/00* (2006.01)
*H04W 72/04* (2009.01)
(Continued)

(52) U.S. Cl.
CPC ........... *H04W 72/042* (2013.01); *H04L 5/001* (2013.01); *H04L 5/0023* (2013.01);
(Continued)

(58) Field of Classification Search
CPC ....... H04L 5/0053; H04L 5/001; H04W 72/04
See application file for complete search history.

(56) References Cited

U.S. PATENT DOCUMENTS

2010/0195604 A1*  8/2010  Papasakellariou .... H04L 1/1893
                                                         370/329
2012/0320846 A1* 12/2012  Papasakellariou .. H04W 72/042
                                                         370/329
(Continued)

OTHER PUBLICATIONS

Apple Inc., "On the Structure and Usage Scenarios of ePDCCH", 3GPP TSG RAN WG1 Meeting #67, R1-114300, San Francisco, USA, Nov. 14-18, 2011, pp. 1-9.
(Continued)

*Primary Examiner* — Shukri Taha
(74) *Attorney, Agent, or Firm* — Birch, Stewart, Kolasch & Birch, LLP

(57) ABSTRACT

The present invention enables efficient transmission/reception of a signal including control information between a base station apparatus and a mobile station apparatus. To realize this, second elements are formed using resources that are obtained by dividing one physical resource block pair, each of first elements is constituted by one or more of the second elements, a control channel is constituted by an aggregation of one or more of the first elements, and there is provided a controller that associates any one of the first elements with one or a plurality of the second elements.

8 Claims, 26 Drawing Sheets

(51) Int. Cl.
*H04L 25/02* (2006.01)
*H04B 7/024* (2017.01)
*H04B 7/0413* (2017.01)

(52) U.S. Cl.
CPC .......... *H04L 5/0035* (2013.01); *H04L 5/0053* (2013.01); *H04L 25/0224* (2013.01); *H04B 7/024* (2013.01); *H04B 7/0413* (2013.01)

(56) References Cited

U.S. PATENT DOCUMENTS

| | | | | |
|---|---|---|---|---|
| 2013/0114565 | A1* | 5/2013 | Chen | H04L 5/0053 370/330 |
| 2014/0071918 | A1* | 3/2014 | Park | H04W 72/14 370/329 |
| 2014/0105164 | A1* | 4/2014 | Moulsley | H04W 72/042 370/329 |
| 2014/0185578 | A1* | 7/2014 | Park | H04L 5/0053 370/329 |
| 2014/0204843 | A1* | 7/2014 | Larsson | H04L 5/001 370/329 |
| 2014/0286277 | A1* | 9/2014 | Jang | H04L 5/0048 370/329 |
| 2014/0301343 | A1* | 10/2014 | Park | H04L 5/0055 370/329 |
| 2014/0334416 | A1* | 11/2014 | Ko | H04L 5/0053 370/329 |
| 2014/0348093 | A1* | 11/2014 | Ihm | H04L 5/0048 370/329 |
| 2015/0085802 | A1* | 3/2015 | Papasakellariou | H04W 72/042 370/329 |

OTHER PUBLICATIONS

ETRI, "Discussions on enhanced PDCCH in Rel-11", 3GPP TSG RAN WG1 Meeting #66bis, R1-113067, Zhuhai, China, Oct. 10-14, 2011, pp. 1-4.

Samsung, "Discussion on ePDCCH Design Issues", 3GPP TSG-RAN1 #66 meeting, R1-112517, Athens, Greece, Aug. 22-26, 2011, pp. 1-4.

Ericsson et al., "Way Forward on downlink control channel enhancements by UE-specific RS", 3GPP TSG-RAN WG1 #66bis, R1-113589, Zhuhai, China, Oct. 10-14, 2011, 2 pages.

Samsung, "Resource multiplexing of E-PDCCH", 3GPP TSG RAN WG1 #67, R1-114241, San Francisco, CA, Nov. 14-18, 2011, 3 pages.

NTT Docomo, "Mapping Design for E-PDCCH in Rel-11", 3GPP TSG RAN WG1 Meeting #67, R1-114081, San Francisco, Nov. 14-18, 2011, 5 pages.

* cited by examiner

MOBILE STATION APPARATUS, BASE STATION APPARATUS, COMMUNICATION METHOD, INTEGRATED CIRCUIT, AND COMMUNICATION SYSTEM

TECHNICAL FIELD

The present invention relates to a mobile station apparatus, a base station apparatus, a communication method, an integrated circuit, and a communication system with which, in a communication system including a plurality of mobile station apparatuses and a base station apparatus, a region in which signals including control information are possibly mapped can be efficiently configured, a base station apparatus is capable of efficiently transmitting signals including control information to a mobile station apparatus, and the mobile station apparatus is capable of efficiently receiving the signals including the control information from the base station apparatus.

BACKGROUND ART

Evolution of radio access schemes and radio networks for cellular mobile communication (hereinafter referred to as "Long Term Evolution (LTE)" or "Evolved Universal Terrestrial Radio Access (EUTRA)") has been standardized in the 3rd Generation Partnership Project (3GPP). In LTE, an orthogonal frequency division multiplexing (OFDM) scheme, which is a multi-carrier transmission scheme, is used as a communication scheme for wireless communication from a base station apparatus to a mobile station apparatus (hereinafter referred to as downlink (DL)). Also, in LTE, a single-carrier frequency division multiple access (SC-FDMA) scheme, which is a single-carrier transmission scheme, is used as a communication scheme for wireless communication from a mobile station apparatus to a base station apparatus (hereinafter referred to as uplink (UL)). In LTE, a discrete Fourier transform-spread OFDM (DFT-Spread OFDM) scheme is used as an SC-FDMA scheme.

LTE-A (LTE-Advanced), which is a development of LTE and in which new technology is applied, has been studied. In LTE-A, support of at least the same channel structure as LTE is being discussed. A channel means a medium used to transmit a signal. A channel used in a physical layer is referred to as a physical channel, and a channel used in a medium access control (MAC) layer is referred to as a logical channel. The types of physical channels include a physical downlink shared channel (PDSCH) used to transmit and receive downlink data and control information, a physical downlink control channel (PDCCH) used to transmit and receive downlink control information, a physical uplink shared channel (PUSCH) used to transmit and receive uplink data and control information, a physical uplink control channel (PUCCH) used to transmit and receive control information, a synchronization channel (SCH) used to establish downlink synchronization, a physical random access channel (PRACH) used to establish uplink synchronization, a physical broadcast channel (PBCH) used to transmit downlink system information, and so forth. A mobile station apparatus or a base station apparatus maps signals generated from control information, data, or the like to respective physical channels, and transmits the signals. Data transmitted on the physical downlink shared channel or the physical uplink shared channel is referred to as a transport block.

Control information mapped to the physical uplink control channel is referred as uplink control information (UCI). The uplink control information is control information (a receive confirmation acknowledgement; ACK/NACK) representing a positive acknowledgement (ACK) or a negative acknowledgement (NACK) for received data mapped to the physical downlink shared channel, control information (Scheduling Request: SR) representing a request for assignment of uplink resources, or control information (Channel Quality Indicator: CQI) representing downlink reception quality (also referred to as channel quality).

<Coordinated Communication>

In LTE-A, to reduce or suppress interference experienced by a mobile station apparatus in a cell edge area, or to increase the receive signal power, intercell coordinated communication (Cooperative Multipoint: CoMP communication) in which adjacent cells cooperatively communicate with each other is being discussed. For example, a form in which a base station apparatus communicates using an arbitrary single frequency band is referred to as a "cell". For example, a method in which weighting signal processing (precoding processing) that differs among a plurality of cells is applied to a signal, and a plurality of base station apparatuses coordinate with each other to transmit the signal to the same mobile station apparatus (also referred to as Joint Processing or Joint Transmission) and so forth are being discussed as intercell coordinated communication. With this method, the signal power to interference plus noise power ratio of a mobile station apparatus can be enhanced, and the reception performance in the mobile station apparatus can be improved. For example, a method in which a plurality of cells coordinate with each other to perform scheduling for a mobile station apparatus (Coordinated Scheduling: CS) is being discussed as intercell coordinated communication. With this method, the signal power to interference plus noise power ratio of a mobile station apparatus can be enhanced. For example, a method in which a plurality of cells coordinate with each other to transmit a signal to a mobile station apparatus by applying beamforming (Coordinated Beamforming: CB) is being discussed as intercell coordinated communication. With this method, the signal power to interference plus noise power ratio of a mobile station apparatus can be enhanced. For example, a method in which a signal is transmitted using a certain resource in only one cell and a signal is not transmitted using a certain resource in one cell (Blanking, Muting) is being discussed as intercell coordinated communication. With this method, the signal power to interference plus noise power ratio of a mobile station apparatus can be enhanced.

Regarding a plurality of cells used in coordinated communication, different cells may be configured by different base station apparatuses, different cells may be configured by different RRHs (Remote Radio Heads, an outdoor radio unit smaller than a base station apparatus; also referred to as a Remote Radio Unit: RRU) managed by the same base station apparatus, different cells may be configured by a base station apparatus and an RRH managed by the base station apparatus, and different cells may be configured by a base station apparatus and an RRH managed by another base station apparatus different from the base station apparatus.

A base station apparatus with wide coverage is generally referred to as a macro base station apparatus. A base station apparatus with narrow coverage is generally referred to as a pico base station apparatus or a femto base station apparatus. For RRHs, operation in areas of narrower coverage than of macro base station apparatuses is being discussed. A deployment such as a communication system which includes a macro base station apparatus and an RRH, and in which the coverage supported by the macro base station apparatus includes part or all of the coverage supported by the RRH, is referred to as a heterogeneous network deployment. In a communication system with such a heterogeneous network deployment, a method in which a macro base station apparatus and an RRH coordinate with each other to transmit a signal to a mobile station apparatus located in a mutually overlapping coverage area is being discussed. Here, the RRH is managed by the macro base station apparatus, and transmission/reception is controlled. The macro base station apparatus and the RRH are connected to each other by a wired link such as an optical fiber, or by a wireless link using a relay technology. In this way, the macro base station apparatus and the RRH perform coordinated communication using some or all of the same radio resources, and accordingly overall frequency utilization efficiency (transmission capacity) can be increased within the area of coverage constructed by the macro base station apparatus.

In the case of being located near a macro base station apparatus or an RRH, a mobile station apparatus is capable of performing single-cell communication with the macro base station apparatus or the RRH. In other words, a certain mobile station apparatus communicates with a macro base station apparatus or an RRH without using coordinated communication to transmit or receive a signal. For example, the macro base station apparatus receives an uplink signal from a mobile station apparatus that is close in distance to the macro base station apparatus. For example, the RRH receives an uplink signal from a mobile station apparatus that is close in distance to the RRH. Furthermore, in a case where the mobile station apparatus is located near an edge of coverage constructed by the RRH (cell edge), countermeasures against the same channel interference from the macro base station apparatus is necessary. For multi-cell communication (coordinated communication) between a macro base station apparatus and an RRH, a method for reducing or suppressing interference experienced by a mobile station apparatus in a cell edge area by using a CoMP scheme in which adjacent base station apparatuses coordinate with each other is being discussed.

Also, it is discussed that a mobile station apparatus receives signals transmitted from both a macro base station apparatus and an RRH using coordinated communication in the downlink, and transmits a signal to any one of the macro base station apparatus and the RRH in an appropriate form in the uplink. For example, the mobile station apparatus transmits an uplink signal with transmit power that is suitable for the macro base station apparatus to receive the signal. For example, the mobile station apparatus transmits an uplink signal with transmit power that is suitable for the RRH to receive the signal. Accordingly, unnecessary interference in the uplink can be reduced, and the frequency utilization efficiency can be enhanced.

It is necessary for a mobile station apparatus to obtain, regarding a process of receiving a data signal, control information representing a modulation scheme to be used for the data signal, a coding rate, a spatial multiplexing number, a transmit power adjustment value, assignment of resources, and so forth. In LTE-A, introduction of a new control channel for transmitting control information regarding a data signal is being discussed (NPL 1). For example, improvement of the capacity of the entire control channel is being discussed. For example, support of interference coordination in the frequency domain for a new control channel is being discussed. For example, support of spatial multiplexing for a new control channel is being discussed. For example, support of beamforming for a new control channel is being discussed. For example, support of diversity for a new control channel is being discussed. For example, use of a new control channel in a new type of carrier is being discussed. For example, not transmitting a reference signal common to all mobile station apparatuses in a cell in a new type of carrier is being discussed. For example, reducing the frequency of transmitting a reference signal common to all mobile station apparatuses in a cell in a new type of carrier to be lower than in a conventional technology is being discussed. For example, demodulating a signal such as control information using a reference signal specific to a mobile station apparatus in a new type of carrier is being discussed.

For example, applying coordinated communication and multi-antenna transmission for a new control channel as application of beamforming is being discussed. Specifically, it is discussed that a plurality of base station apparatuses and a plurality of RRHs compatible with LTE-A apply precoding processing for a signal on a new control channel, and the same precoding processing is applied to a reference signal (RS) for demodulating the signal on the new control channel. Specifically, it is discussed that a plurality of base station apparatuses and a plurality of RRHs compatible with LTE-A map, in the region of resources where a PDSCH is mapped in LTE, a signal on a new control channel and an RS to which the same precoding processing is applied, and transmit the signal and RS. It is discussed that a mobile station apparatus compatible with LTE-A demodulates the signal on the new control channel subjected to precoding processing using the RS that has been received and subjected to the same precoding processing, and obtains control information. With this method, it is not necessary to transmit and receive information regarding the precoding processing applied to a signal on a new control channel between a base station apparatus and a mobile station apparatus.

For example, as application of diversity, a method for obtaining an effect of frequency diversity by forming a signal on a new control channel using resources separated in the frequency domain is being discussed. On the other hand, a method for forming a signal on a new control channel using resources not separated in the frequency domain in a case where beamforming is applied to the new control channel is being discussed.

For example, as support of spatial multiplexing, application of MU-MIMO (Multi User-Multi Input Multi Output) in which control channels for different mobile station apparatuses are multiplexed on the same resource is being discussed. Specifically, it is discussed that a base station apparatus transmits reference signals that are orthogonal to each other between different mobile station apparatuses and transmits signals on different new control channels by spatially multiplexing the signals on a common resource. For example, spatial multiplexing of signals on different new control channels is realized by applying appropriate beamforming (precoding processing) to each of the signals on the different new control channels.

CITATION LIST

Non Patent Literature

NPL 1: 3GPP TSG RAN1 #66bis, Zhuhai, China, 10-14, Oct. 2011, R1-113589 "Way Forward on downlink control channel enhancements by UE-specific RS"

SUMMARY OF INVENTION

Technical Problem

It is desirable that a control channel be transmitted and received with efficient use of resources. An amount of resources satisfying requirements for each mobile station apparatus is necessary for the control channel. If resources are not efficiently used for the control channel, the capacity of the control channel cannot be increased, and the number of mobile station apparatuses to which the control channel is assigned cannot be increased.

For example, it is desirable that an increase in capacity of control channels of an entire system be efficiently controlled by efficiently configuring the resources to be used for the control channels.

The present invention has been made in view of the above-described points, and an object of the invention relates to a communication system, a mobile station apparatus, a base station apparatus, a communication method, and an integrated circuit with which, in a communication system including a plurality of mobile station apparatuses and a base station apparatus, a region in which signals including control information are possibly mapped can be efficiently configured, a base station apparatus is capable of efficiently transmitting signals including control information to a mobile station apparatus, and the mobile station apparatus is capable of efficiently receiving the signals including the control information from the base station apparatus.

Solution to Problem (1) To achieve the above-described object, the present invention takes the following measures. That is, a mobile station apparatus of the present invention includes a controller configured to use either one of two values as the number of second elements that constitute a first element; and a receiver configured to receive, using the one of two values, an enhanced physical downlink control channel that is transmitted using one or a plurality of the first elements. Each one of the second elements is constituted using resources that are obtained by dividing at least a part of a resource block pair in N (N is a natural number), the resource block pair being constituted by a plurality of resource elements. Each one of the first elements consists of a plurality of the second elements.

(2) In the mobile station apparatus of the present invention, the one or the plurality of the first elements used for the enhanced physical downlink control channel to be received are each constituted by a plurality of the second elements, and the receiver is configured to receive the enhanced physical downlink control channel that is transmitted using a plurality of resource elements, each of which is used to constitute at least a part of a second element.

(3) In the mobile station apparatus of the present invention, the controller is configured to be capable of using one of the two values based on at least information transmitted from the base station using an RRC signal.

(4) A base station apparatus of the present invention includes a controller configured to use either one of two values as the number of second elements that constitute a first element; and a transmitter configured to transmit, using the one of two values, an enhanced physical downlink control channel using one or a plurality of the first elements. Each one of the second elements is constituted using resources that are obtained by dividing at least a part of a resource block pair in N (N is a natural number), the resource block pair being constituted by a plurality of resource elements. Each one of the first elements consists of a plurality of the second elements.

(5) In the base station apparatus of the present invention, the one or the plurality of the first elements used to transmit the enhanced physical downlink control channel are each constituted by a plurality of the second elements, and a plurality of the resource elements, each of which is used to constitute at least a part of a second element, are used to transmit the enhanced physical downlink control channel.

(6) In the base station apparatus of the present invention, the controller is configured to be capable of using one of the two values based on at least information transmitted using an RRC signal.

(7) A communication method used for a mobile station apparatus of the present invention includes a step of using either one of two values as the number of second elements that constitute a first element; and a step of receiving, using the one of two values, an enhanced physical downlink control channel that is transmitted using one or a plurality of the first elements. Each one of the second elements is constituted using resources that are obtained by dividing at least a part of a resource block pair in N (N is a natural number), the resource block pair being constituted by a plurality of resource elements. Each one of the first elements consists of a plurality of the second elements.

(8) In the communication method used for the mobile station apparatus of the present invention, the one or the plurality of the first elements used to transmit the enhanced physical downlink control channel are each constituted by a plurality of the second elements, and the enhanced physical downlink control channel that is transmitted using a plurality of resource elements, each of which is used to constitute at least a part of a second element, is received.

(9) In the communication method used for the mobile station apparatus of the present invention, one of the two values is used based on at least information transmitted from the base station using an RRC signal.

(10) A communication method used for a base station apparatus of the present invention includes a step of using either one of two values as the number of second elements that constitute a first element; and a step of transmitting, using the one of two values, an enhanced physical downlink control channel using one or a plurality of the first elements. Each one of the second elements is constituted using resources that are obtained by dividing at least a part of a resource block pair in N (N is a natural number), the resource block pair being constituted by a plurality of resource elements. Each one of the first elements consists of a plurality of the second elements.

(11) In the communication method used for the base station apparatus of the present invention, the one or the plurality of the first elements used to transmit the enhanced physical downlink control channel are each constituted by a plurality of the second elements, and a plurality of the resource elements, each of which is used to constitute at least a part of a second element, are used to transmit the enhanced physical downlink control channel.

(12) In the communication method used for the base station apparatus of the present invention, one of the two values is used based on at least information transmitted using an RRC signal.

(13) An integrated circuit used for a mobile station apparatus of the present invention includes a function of using either one of two values as the number of second elements that constitute a first element; and a function of receiving, using the one of two values, an enhanced physical downlink control channel that is transmitted using one or a plurality of the first elements. Each one of the second elements is constituted using resources that are obtained by dividing at least a part of a resource block pair in N (N is a natural number), the resource block pair being constituted by a plurality of resource elements. Each one of the first elements consists of a plurality of the second elements.

(14) In the integrated circuit used for the mobile station apparatus of the present invention, the one or the plurality of the first elements used to transmit the enhanced physical downlink control channel are each constituted by a plurality of the second elements, and a plurality of the resource elements, each of which is used to constitute at least a part of a second element, are used to transmit the enhanced physical downlink control channel.

(15) In the integrated circuit used for the mobile station apparatus of the present invention, the function of using either one of two values is capable of using one of two values based on at least information transmitted from the base station using an RRC signal.

(16) An integrated circuit used for a base station apparatus of the present invention includes a function of using either one of two values as the number of second elements that constitute a first element; and a function of transmitting, using the one of two values, an enhanced physical downlink control channel using one or a plurality of the first elements. Each one of the second elements is constituted using resources that are obtained by dividing at least a part of a resource block pair in N (N is a natural number), the resource block pair being constituted by a plurality of resource elements. Each one of the first elements consists of a plurality of the second elements.

(17) In the integrated circuit used for the base station apparatus of the present invention, the one or the plurality of the first elements used to transmit the enhanced physical downlink control channel are each constituted by a plurality of the second elements, and a plurality of the resource elements, each of which is used to constitute at least a part of a second element, are used to transmit the enhanced physical downlink control channel.

(18) In the integrated circuit used for the base station apparatus of the present invention, the function of using either one of two values is capable of using one of the two values based on at least information transmitted using an RRC signal.

(19) A communication system of the present invention is a communication system in which a mobile station apparatus and a base station apparatus are configured to communicate with each other using an enhanced physical downlink control channel. The base station apparatus is configured to transmit, using either one of two values as the number of second elements constituting each of first elements, the enhanced physical downlink control channel using one or a plurality of the first elements. The mobile station apparatus is configured to receive, using one of the two values as the number of second elements constituting each of the first elements, the enhanced physical downlink control channel that is transmitted using the one or the plurality of the first elements. Each one of the second elements is constituted using resources that are obtained by dividing at least a part of a resource block pair in N (N is a natural number), the resource block pair being constituted by a plurality of resource elements. Each one of the first elements consists of a plurality of the second elements.

(20) In the communication system of the present invention, the one or the plurality of the first elements used to transmit the enhanced physical downlink control channel are each constituted by a plurality of the second elements, and a plurality of the resource elements, each of which is used to constitute at least a part of a second element, are used to transmit the enhanced physical downlink control channel.

(21) In the communication system of the present invention, the mobile station apparatus is configured to use one of the two values based on at least information transmitted using an RRC signal.

In this description, the present invention is disclosed in the point of improving a communication system in which a region where a control channel is possibly mapped is configured for a mobile station apparatus by a base station apparatus, a mobile station apparatus, a base station apparatus, a communication method, and an integrated circuit. The communication scheme to which the present invention is applicable is not limited to a communication scheme such as LTE or LTE-A having upward compatibility with LTE. For example, the present invention is also applicable to a UMTS (Universal Mobile Telecommunications System).

Advantageous Effects of Invention

According to the present invention, a base station apparatus is capable of efficiently transmitting a signal including control information to a mobile station apparatus, the mobile station apparatus is capable of efficiently receiving the signal including the control information from the base station apparatus, and a more efficient communication system can be realized.

DESCRIPTION OF EMBODIMENTS

The technology described in this description can be used in various wireless communication systems, such as a code division multiple access (CDMA) system, a time division multiple access (TDMA) system, a frequency division multiple access (FDMA) system, an orthogonal FDMA (OFDMA) system, a single-carrier FDMA (SC-FDMA) system, and other systems. The terms "system" and "network" can be often used synonymously. A CDMA system can be compatible with radio technologies (standards), such as universal terrestrial radio access (UTRA) and cdma2000 (registered trademark). UTRA includes wideband CDMA (WCDMA) and other improvements of CDMA. cdma2000 covers the standards of IS-2000, IS-95, and IS-856. A TDMA system can be compatible with a radio technology such as Global System for Mobile Communications (GSM) (registered trademark)). An OFDMA system can be compatible with radio technologies, such as Evolved UTRA (E-UTRA), Ultra Mobile Broadband (UMB), IEEE 802.11 (Wi-Fi), IEEE 802.16 (WiMAX), IEEE 802.20, and Flash-OFDM (registered trademark). UTRA and E-UTRA correspond to part of universal mobile telecommunications system (UMTS). 3GPP LTE (Long Term Evolution) is UMTS that uses E-UTRA in which OFDMA is adopted in the downlink and SC-FDMA is adopted in the uplink. LTE-A is a system, radio technology, and standard achieved by improving LTE. UTRA, E-UTRA, UMTS, LTE, LTE-A, and GSM are described in documents issued by an organization called 3rd Generation Partnership Project (3GPP). cdma2000 and UMB are described in documents issued by an organization called 3rd Generation Partnership Project 2 (3GPP2). For clarity, an aspect of the present technology will be described below regarding data communication in LTE and LTE-A, and terms related to LTE and LTE-A will be used in many places of the following description.

Hereinafter, an embodiment of the present invention will be described in detail with reference to the drawings. The overview of a communication system and the configuration of a radio frame according to the embodiment will be described with reference to FIGS. 9 to 26. The configuration of the communication system according to the embodiment will be described with reference to FIGS. 1 to 6. Operation processes of the communication system according to the embodiment will be described with reference to FIGS. 7 and 8.

Figure 9:
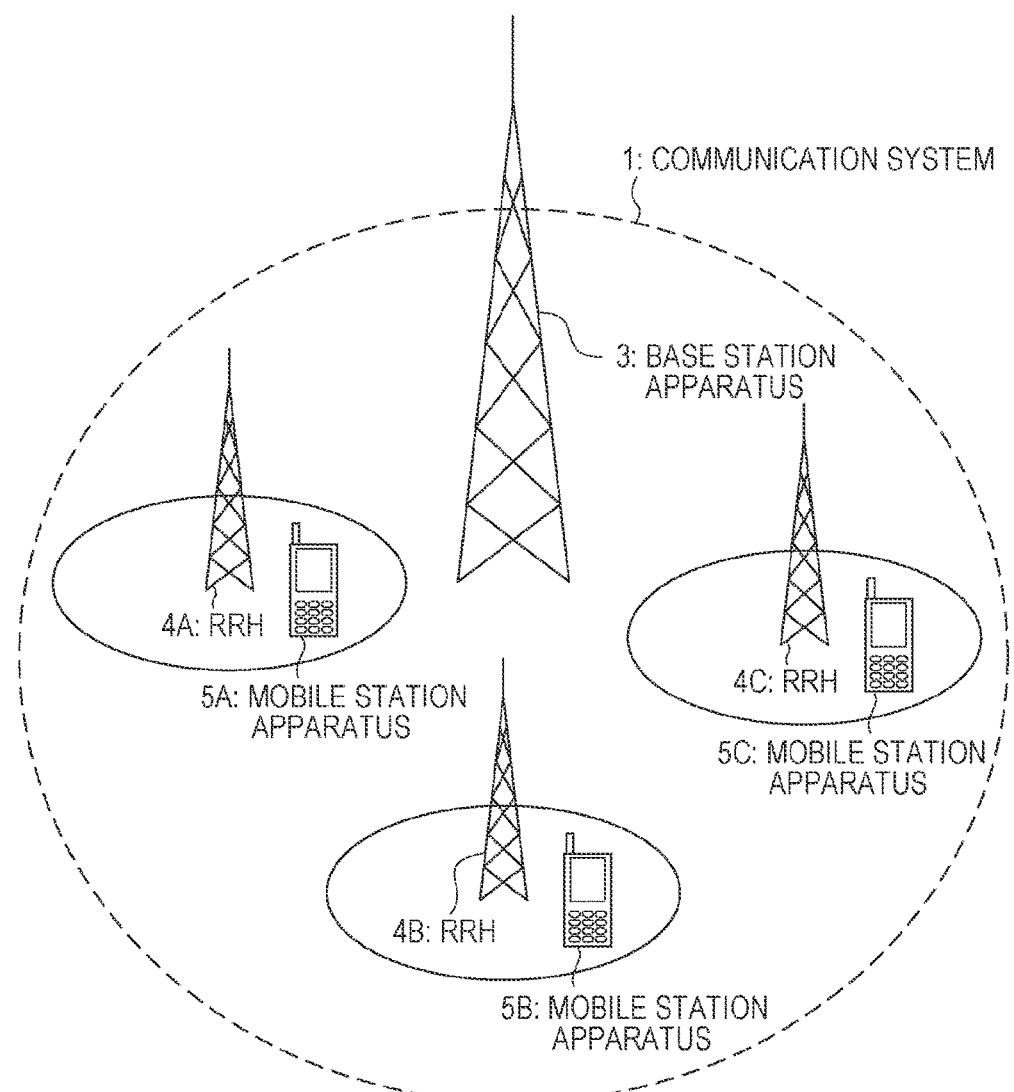
FIG. 9 is a diagram schematically illustrating the overview of a communication system according to the embodiment of the present invention.

FIG. 9 is a diagram schematically illustrating the overview of the communication system according to the embodiment of the present invention. In the communication system 1 illustrated in FIG. 9, a base station apparatus (eNodeB, NodeB, BS: Base Station, AP: Access Point, also referred to as a macro base station) 3, a plurality of RRHs (Remote Radio Heads, devices including an outdoor radio unit smaller than a base station apparatus, also referred to as Remote Radio Units: RRUs) (also referred to as remote antennas or distributed antennas) 4A, 4B, and 4C, and a plurality of mobile station apparatuses (also referred to as UE: User Equipment, MS: Mobile Stations, MT: Mobile Terminals, terminals, terminal devices, or mobile terminals) 5A, 5B, and 5C communicate with one another. In the embodiment, a description will be given below as appropriate, with each of the RRHs 4A, 4B, and 4C being referred to as an RRH 4, and each of the mobile station apparatuses 5A, 5B, and 5C being referred to as a mobile station apparatus 5. In the communication system 1, the base station apparatus 3 and the RRH 4 coordinate with each other to communicate with the mobile station apparatus 5. In FIG. 9, the base station apparatus 3 and the RRH 4A perform coordinated communication with the mobile station apparatus 5A, the base station apparatus 3 and the RRH 4B perform coordinated communication with the mobile station apparatus 5B, and the base station apparatus 3 and the RRH 4C perform coordinated communication with the mobile station apparatus 5C.

An RRH may be called a specific form of a base station apparatus. Specifically, an RRH may be called a base station apparatus which includes only a signal processor, and in which a parameter to be used in the RRH is set by and scheduling is determined by another base station apparatus. Therefore, in the following description, it should be noted that the expression "base station apparatus 3" includes the RRH 4 as appropriate.

<Coordinated Communication>

In the communication system 1 according to the embodiment of the present invention, coordinated communication (Cooperative Multipoint: CoMP communication) in which a signal is transmitted and received cooperatively using a plurality of cells can be used. For example, a form in which a base station apparatus performs communication using an arbitrary single frequency band is referred to as a "cell". For example, in coordinated communication, weighting signal processing (precoding processing) that differs among a plurality of cells (the base station apparatus 3 and the RHH 4) is applied to a signal, and the base station apparatus 3 and the RRH 4 coordinate with each other to transmit the signal to the same mobile station apparatus 5 (Joint Processing, Joint Transmission). For example, in coordinated communication, a plurality of cells (the base station apparatus 3 and the RRH 4) coordinate with each other to perform scheduling for the mobile station apparatus 5 (Coordinated Scheduling: CS). For example, in coordinated communication, a plurality of cells (the base station apparatus 3 and the RRH 4) coordinate with each other to transmit a signal to the mobile station apparatus 5 by applying beamforming (Coordinated Beamforming: CB). For example, in coordinated communication, only one of cells (the base station apparatus 3 or the RRH 4) transmits a signal using a certain resource, and the other cell (the base station apparatus 3 or the RRH 4) does not transmit a signal using a certain resource (Blanking, Muting).

Although a description is omitted in the embodiment of the present invention, regarding a plurality of cells used in coordinated communication, different cells may be configured by different base station apparatuses 3, different cells may be configured by different RRHs 4 managed by the same base station apparatus 3, or different cells may be configured by a base station apparatus 3 and an RRH 4 managed by another base station apparatus 3 different from the base station apparatus 3.

A plurality of cells are physically used as different cells, and may be logically used as the same cell. Specifically, a common cell identifier (physical cell ID) may be used for individual cells. A configuration in which a plurality of transmission apparatuses (the base station apparatus 3 and the RRH 4) transmit a common signal to the same reception apparatus using the same frequency band is referred to as a single frequency network (SFN).

It is assumed that the deployment of the communication system 1 according to the embodiment of the present invention is a heterogeneous network deployment. The communication system 1 includes the base station apparatus 3 and the RRHs 4, and the coverage supported by the base station apparatus 3 includes part or all of the coverage supported by the RRHs 4. Here, "coverage" means an area in which communication can be performed with requirements being satisfied. In the communication system 1, the base station apparatus 3 and the RRH 4 coordinate with each other to transmit a signal to the mobile station apparatus 5 located in a mutually overlapping coverage. Here, the RRH 4 is managed by the base station apparatus 3, and transmission and reception are controlled. The base station apparatus 3 and the RRH 4 are connected to each other by a wired link such as an optical fiber or a wireless link using a relay technology.

In the case of being located near the base station apparatus 3 or the RRH 4, the mobile station apparatus 5 may perform single-cell communication with the base station apparatus 3 or the RRH 4. That is, a certain mobile station apparatus 5 may communicate with the base station apparatus 3 or the RRH 4 without using coordinated communication, so as to transmit or receive a signal. For example, the base station apparatus 3 may receive an uplink signal from the mobile station apparatus 5 that is close in distance to the base station apparatus 3. For example, the RRH 4 may receive an uplink signal from the mobile station apparatus 5 that is close in distance to the RRH 4. Also, for example, both the base station apparatus 3 and the RRH 4 may receive an uplink signal from the mobile station apparatus 5 located near an edge of the coverage constructed by the RRH 4 (cell edge).

The mobile station apparatus 5 may receive signals transmitted from both the base station apparatus 3 and the RRH 4 using coordinated communication in the downlink, and may transmit a signal to any one of the base station apparatus 3 and the RRH 4 in an appropriate form in the uplink. For example, the mobile station apparatus 5 transmits an uplink signal with transmit power appropriate for the base station apparatus 3 to receive the signal. For example, the mobile station apparatus 5 transmits an uplink signal with transmit power appropriate for the RRH 4 to receive the signal.

In the embodiment of the present invention, MU (Multi-User)-MIMO can be applied within a single base station apparatus 3. For example, MU-MIMO is a technology in which beam control is performed, using a precoding technology or the like, on signals addressed to a plurality of mobile station apparatuses 5 that exist in different areas (for example, area A and area B) in the area covered by the base station apparatus 3 that uses a plurality of transmit antennas, and thereby the signals addressed to the mobile station apparatuses 5 are kept orthogonal to each other or co-channel interference is reduced even if the same resource is used in the frequency domain and the time domain. MU-MIMO is also called SDMA (Space Division Multiple Access) because it spatially demultiplexes signals addressed to the mobile station apparatuses 5.

In MU-MIMO, the base station apparatus 3 transmits UE-specific RSs that are orthogonal to each other between different mobile station apparatuses 5, and transmits signals of different second PDCCHs by spatially multiplexing the signals on a common resource. In MU-MIMO, different precoding processing operations are applied to individual mobile station apparatuses 5 for which spatial multiplexing is performed. Within the area covered the base station apparatus 3, different precoding processing operations can be performed on the second PDCCH and UE-specific RS of the mobile station apparatus 5 located in area A and those of the mobile station apparatus 5 located in area B. A region where the second PDCCH is to be possibly mapped can be independently configured for the mobile station apparatus 5 located in area A and the mobile station apparatus 5 located in area B, and precoding processing can be independently applied.

In the communication system 1, downlink (DL), which corresponds to a communication direction from the base station apparatus 3 or the RRH 4 to the mobile station apparatus 5, includes a downlink pilot channel, a physical downlink control channel (PDCCH), and a physical downlink shared channel (PDSCH). Coordinated communication is applied to or not applied to the PDSCH. The PDCCH is made up of a first PDCCH and a second PDCCH (E-PD-CCH: Enhanced-PDCCH). The downlink pilot channel is made up of a first-type reference signal (CRS described below) used to demodulate the PDSCH and the first PDCCH, a second-type reference signal (UE-specific RS described below) used to demodulate the PDSCH and the second PDCCH, and a third-type reference signal (CSI-RS described below).

From one point of view, the first PDCCH is a physical channel that uses the same transmit port (antenna port, transmit antenna) as that for the first-type reference signal. The second PDCCH is a physical channel that uses the same transmit port as that for the second-type reference signal. The mobile station apparatus 5 demodulates a signal mapped to the first PDCCH by using the first-type reference signal, and demodulates a signal mapped to the second PDCCH by using the second-type reference signal. The first-type reference signal is common to all the mobile station apparatuses 5 in a cell, is inserted into almost all resource blocks, and is usable by any mobile station apparatus 5. Thus, the first PDCCH can be demodulated by any mobile station apparatus 5. On the other hand, the second-type reference signal can be basically inserted into only assigned resource blocks. Precoding processing can be adaptively applied to the second-type reference signal, like data.

From one point of view, the first PDCCH is a control channel mapped to OFDM symbols to which the PDSCH is not mapped. The second PDCCH is a control channel mapped to OFDM symbols to which the PDSCH is mapped. From one point of view, the first PDCCH is a control channel to which a signal is basically mapped over all PRBs in the downlink system band (PRBs in the first slot), and the second PDCCH is a control channel to which a signal is mapped over PRB pairs (PRBs) configured by the base station apparatus 3 in the downlink system band. Although the details will be described below, from one point of view, signal configurations of the first PDCCH and the second PDCCH are different from each other. For the first PDCCH, a CCE configuration described below is used as a signal configuration. For the second PDCCH, an E-CCE (Enhanced-CCE) (first element) configuration described below is used as a signal configuration. In other words, the smallest unit (element) of resources used for the configuration of one control channel differs between the first PDCCH and the second PDCCH. Each control channel includes one or more smallest units.

In the communication system 1, uplink (UL), which corresponds to a communication direction from the mobile station apparatus 5 to the base station apparatus 3 or the RRH 4, includes a physical uplink shared channel (PUSCH), an uplink pilot channel (uplink reference signal; UL RS, SRS: Sounding Reference Signal, DM RS: Demodulation Reference Signal), and a physical uplink control channel (PUCCH). A channel means a medium used to transmit a signal. A channel used in a physical layer is referred to as a physical channel, and a channel used in a medium access control (MAC) layer is referred to as a logical channel.

The present invention can be applied to a communication system in a case where coordinated communication is applied to the downlink, for example, in a case where multi-antenna transmission is applied to the downlink. To simplify the description, a description will be given of a case where coordinated communication is not applied to the uplink, that is, a case where multi-antenna transmission is not applied to the uplink, but the present invention is not limited to such a case.

The PDSCH is a physical channel used to transmit and receive downlink data and control information (different from control information transmitted on the PDCCH). The PDCCH is a physical channel used to transmit and receive downlink control information (different from control information transmitted on the PDSCH). The PUSCH is a physical channel used to transmit and receive uplink data and control information (different from control information transmitted in the downlink). The PUCCH is a physical channel used to transmit and receive uplink control information (UCI). The types of UCI include a receive confirmation acknowledgement (ACK/NACK) representing a positive acknowledgement (ACK; or a negative acknowledgement (NACK) for downlink data on the PDSCH, a scheduling request (SR) representing whether or not assignment of resources is to be requested, and so forth. Other types of physical channels include a synchronization channel (SCH) used to establish synchronization in the downlink, a physical random access channel (PRACH) used to establish synchronization in the uplink, a physical broadcast channel (PBCH) used to transmit downlink system information (also referred to as SIB: System Information Block), and so forth. The PDSCH is also used to transmit downlink system information.

The mobile station apparatus 5, the base station apparatus 3, or the RRH 4 maps signals generated from control information, data, or the like to individual physical channels, and transmits the signals. The data transmitted on the PDSCH or PUSCH is referred to as a transport block. The area managed by the base station apparatus 3 or the RRH 4 is called a cell.

<Configuration of Downlink Time Frame>

Figure 10:
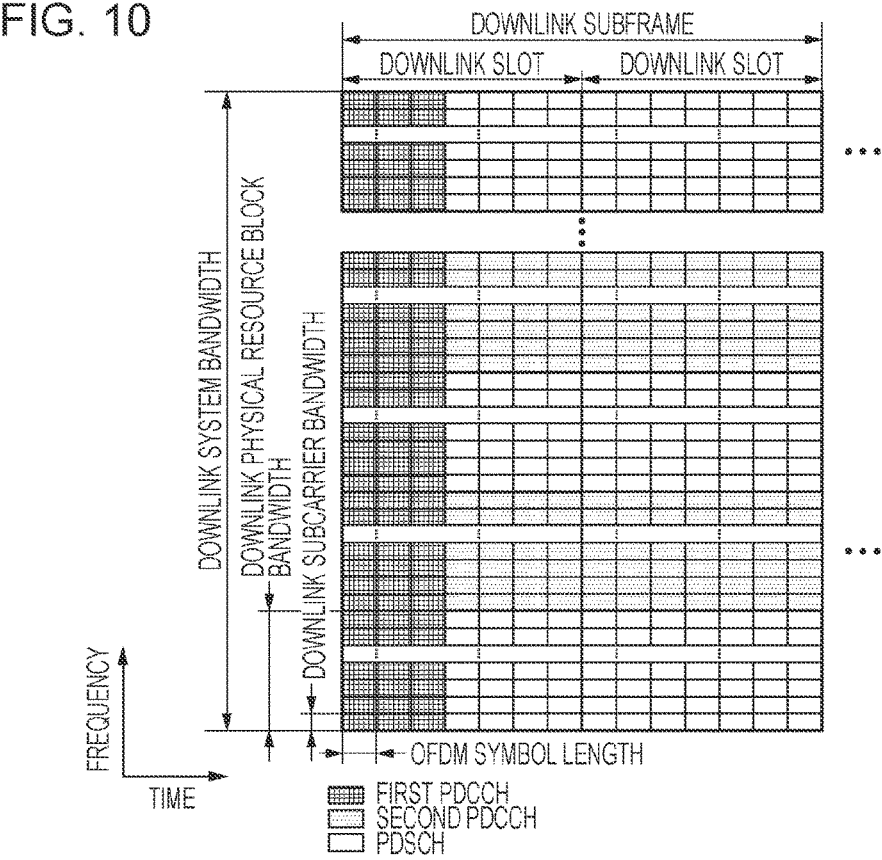
FIG. 10 is a diagram schematically illustrating the configuration of a downlink time frame from the base station apparatus 3 or an RRH 4 to the mobile station apparatus 5 according to the embodiment of the present invention.

FIG. 10 is a diagram schematically illustrating the configuration of a downlink time frame from the base station apparatus 3 or the RRH 4 to the mobile station apparatus 5 according to the embodiment of the present invention. In FIG. 10, the horizontal axis represents the time domain and the vertical axis represents the frequency domain. A downlink time frame is made up of a pair of resource blocks (RBs) (also referred to as physical resource blocks (PRBs)), the pair being referred to as a physical resource block pair (PRB pair). Each PRB pair is a unit of assignment of resources, and each RB has a frequency band and a time band of predetermined widths in the downlink. One downlink PRB pair (referred to as a downlink physical resource block pair (DL PRB pair)) is made up of two PRBs that are contiguous in the time domain in the downlink (referred to as downlink physical resource blocks (DL PRBs)).

In FIG. 10, one DL PRB is made up of twelve subcarriers in the frequency domain of the downlink (referred to as downlink subcarriers), and is made up of seven OFDM (orthogonal frequency division multiplexing) symbols in the time domain. The system band of the downlink (referred to as a downlink system band) is a downlink communication band of the base station apparatus 3 or the RRH 4. For example, the system bandwidth of the downlink (referred to as a downlink system bandwidth) has a frequency bandwidth of 20 MHz.

In the downlink system band, a plurality of DL PRBs (DL PRB pairs) are mapped on the basis of the downlink system bandwidth. For example, the downlink system band having a frequency bandwidth of 20 MHz is made up of one hundred and ten DL PRBs (DL PRB pairs).

In the time domain illustrated in FIG. 10, there are a slot made up of seven OFDM symbols (referred to as a downlink slot) and a subframe made up of two downlink slots (referred to as a downlink subframe). A unit made up of one downlink subcarrier and one OFDM symbol is referred to as a resource element (RE) (downlink resource element). In each downlink subframe, at least a PDSCH used to transmit information data (also referred to as a transport block), a first PDCCH used to transmit control information for the PDSCH, and a second PDCCH used to transmit control information for the PDSCH are mapped. In FIG. 10, the first PDCCH is made up of the first to third OFDM symbols in the downlink subframe, and the PDSCH and the second PDCCH are made up of the fourth to fourteenth OFDM symbols in the downlink subframe. The PDSCH and the second PDCCH are mapped to different DL PRB pairs. The number of OFDM symbols constituting the first PDCCH and the number of OFDM symbols constituting the PDSCH and the second PDCCH may be changed for each downlink subframe. The number of OFDM symbols constituting the second PDCCH may be fixed. For example, regardless of the number of OFDM symbols constituting the first PDCCH and the number of OFDM symbols constituting the PDSCH, the second PDCCH may be made up of the fourth to fourteenth OFDM symbols of the downlink subframe.

Although not illustrated in FIG. 10, a downlink pilot channel used to transmit a reference signal (RS) of the downlink (referred to as a downlink reference signal) is mapped to a plurality of downlink resource elements in a distributed manner. Here, a downlink reference signal includes at least a first-type reference signal, a second-type reference signal, and a third-type reference signal, which are different from one another. For example, a downlink reference signal is used to estimate channel variations of the PDSCH and PDCCH (first PDCCH, second PDCCH). The first-type reference signal is used to demodulate the PDSCH and the first PDCCH, and is also referred to as a Cell specific RS (CRS). The second-type reference signal is used to demodulate the PDSCH and the second PDCCH, and is also referred to as a UE-specific RS. For example, the third-type reference signal is used only to estimate channel variations, and is also referred to as a Channel State Information RS (CSI-RS). The downlink reference signal is a signal that is known in the communication system 1. The number of downlink resource elements constituting the downlink reference signal may depend on the number of transmit antennas (antenna ports) used by the base station apparatus 3 and the RRH 4 to communicate with the mobile station apparatus 5. Hereinafter, a description will be given of a case where a CRS is used as the first-type reference signal, a UE-specific RS is used as the second-type reference signal, and a CSI-RS is used as the third-type reference signal. The UE-specific RS can also be used to demodulate the PDSCH to which coordinated communication is applied and the PDSCH to which coordinated communication is not applied. The UE-specific RS can also be used to demodulate the second PDCCH to which coordinated communication (precoding processing) is applied and the second PDCCH to which coordinated communication is not applied.

To the PDCCH (the first PDCCH or the second PDCCH), a signal generated from control information, such as information representing assignment of DL PRB pairs to the PDSCH, information representing assignment of UL PRB pairs to the PUSCH, and information representing a mobile station identifier (referred to as a Radio Network Temporary Identifier: RNTI), a modulation scheme, a coding rate, a retransmission parameter, a spatial multiplexing number, a precoding matrix, and a transmit power control command (TPC command), is mapped. The control information included in the PDCCH is referred to as downlink control information (DCI). The DCI including information representing assignment of DL PRB pairs to the PDSCH is referred to as downlink assignment (DL assignment, also referred to as Downlink grant), and the DCI including information representing assignment of UL PRB pairs to the PUSCH is referred to as uplink grant (referred to as UL grant). The downlink assignment includes a transmit power control command for the PUCCH. The uplink assignment includes a transmit power control command for the PUSCH. One PDCCH includes only information representing assignment of resources of one PDSCH or information representing assignment of resources of one PUSCH, and does not include information representing assignment of resources of a plurality of PDSCHs or information representing assignment of resources of a plurality of PUSCHs.

Furthermore, information to be transmitted on the PDCCH includes a cyclic redundancy check (CRC) code. A detailed description will be given of the relationship among DCI, RNTI, and CRC that are transmitted on the PDCCH. A CRC code is generated from DCI by using a predetermined generator polynomial. Processing of exclusive OR (also referred to as scrambling) is performed on the generated CRC code by using an RNTI. A signal generated by modulating a bit representing DCI and a bit generated through processing of exclusive OR performed on the CRC code by using the RNTI (referred to as CRC masked by UE ID) is actually transmitted on the PDCCH.

The resource of the PDSCH is mapped to the same downlink subframe as the downlink subframe to which the resource of the PDCCH including the downlink assignment used to assign the resource of the PDSCH in the time domain is mapped.

Figure 11:
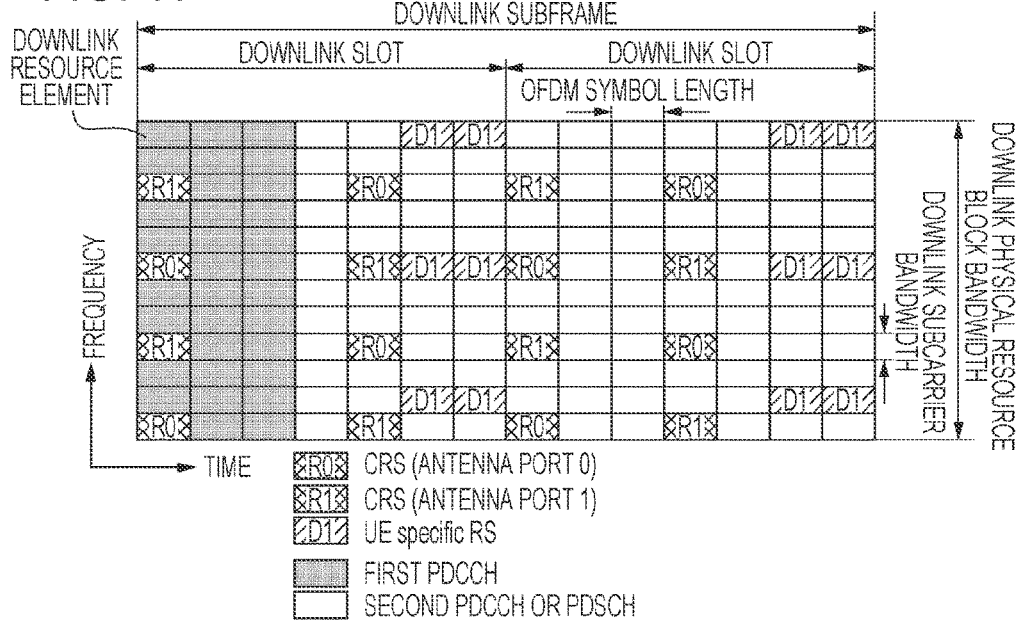
FIG. 11 is a diagram illustrating an example of mapping of downlink reference signals in a downlink subframe in the communication system 1 according to the embodiment of the present invention.

Mapping of downlink reference signals will be described. FIG. 11 is a diagram illustrating an example of mapping of downlink reference signals in a downlink subframe in the communication system 1 according to the embodiment of the present invention. To simplify the description, mapping of downlink reference signals in a certain DL PRB pair will be described with reference to FIG. 11. In a plurality of DL PRB pairs in the downlink system band, the same mapping method is used.

Among the shaded downlink resource elements, R0 and R1 represent CRSs for antenna ports 0 and 1, respectively. Here, an antenna port means a logical antenna used in signal processing. One antenna port may be made up of a plurality of physical antennas. A plurality of physical antennas constituting the same antenna port transmit the same signal. Within the same antenna port, delay diversity or CDD (Cyclic Delay Diversity) may be applied by using a plurality of physical antennas, but other signal processing cannot be used. Here, FIG. 11 illustrates a case where CRSs correspond to two antenna ports. However, the communication system according to the embodiment may correspond to a different number of antenna ports. For example, a CRS corresponding to one antenna port or four antenna ports may be mapped to downlink resources. The CRS can be mapped to all the DL PRB pairs in the downlink system band.

Among the shaded downlink resource elements, D1 represents a UE-specific RS. In the case of transmitting a UE-specific RS by using a plurality of antenna ports, different codes are used by the individual antenna ports. That is, CDM (Code Division Multiplexing) is applied to the UE-specific RS. Here, regarding a UE-specific RS, the length of a code used in CDM and the number of downlink resource elements used for mapping may be changed on the basis of the type of signal processing (the number of antenna ports) used for a control signal or data signal to be mapped to the DL PRB pair. FIG. 11 illustrates an example of mapping of a UE-specific RS in a case where the number of antenna ports used to transmit the UE-specific RS is one (antenna port 7) or two (antenna port 7 and antenna port 8). For example, in the base station apparatus 3 and the RRH 4, in a case where the number of antenna ports used to transmit UE-specific RSs is two, the UE-specific RSs are multiplexed and mapped by using a code having a length of two, with two downlink resource elements in the time domain (OFDM symbols) contiguous in the same frequency domain (subcarrier) being one unit (the unit of CDM). In other words, in this case, CDM is applied to multiplexing of the UE-specific RSs. In FIG. 11, the UE-specific RSs for the antenna port 7 and the antenna port 8 are multiplexed with D1 by using CDM.

Figure 12:
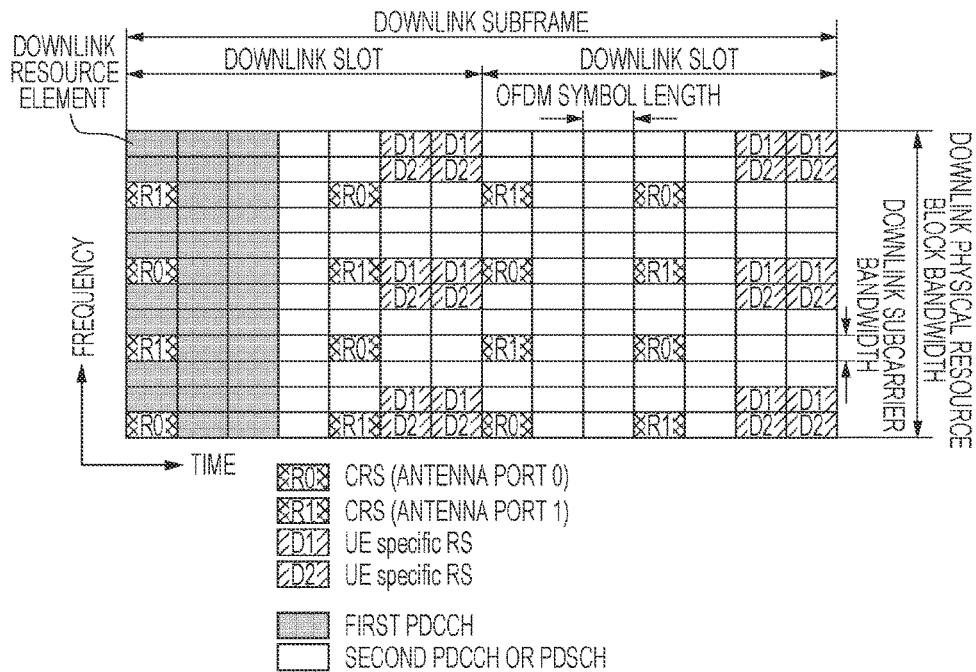
FIG. 12 is a diagram illustrating an example of mapping of downlink reference signals in a downlink subframe in the communication system 1 according to the embodiment of the present invention.

FIG. 12 is a diagram illustrating an example of mapping of downlink reference signals in a downlink subframe in the communication system 1 according to the embodiment of the present invention. Among the shaded downlink resource elements, D1 and D2 represent UE-specific RSs. FIG. 12 illustrates an example of mapping of UE-specific RSs in a case where the number of antenna ports used to transmit UE-specific RSs is three (antenna port 7, antenna port 8, and antenna port 9) or four (antenna port 7, antenna port 8, antenna port 9, and antenna port 10). For example, in the base station apparatus 3 and the RRH 4, in a case where the number of antenna ports used to transmit UE-specific RSs is four, the number of downlink resource elements to which the UE-specific RSs are mapped is doubled, and the UE-specific RSs are multiplexed with and mapped to downlink resource elements that differ every two antenna ports. In other words, in this case, CDM and FDM (Frequency Division Multiplexing) are applied to multiplexing of the UE-specific RSs. In FIG. 12, the UTE-specific RSs for the antenna port 7 and the antenna port 8 are multiplexed with D1 by using CDM, and the UE-specific RSs for the antenna port 8 and the antenna port 9 are multiplexed with D2 by using CDM.

For example, in a case where the number of antenna ports used to transmit UE-specific RSs in the base station apparatus 3 and the RRH 4 is eight, the number of downlink resource elements to which the UE-specific RSs are mapped is doubled, and the UE-specific RSs are multiplexed and mapped using a code having a length of four, with four downlink resource elements being one unit. In other words, in this case, CDM of different code lengths is applied to multiplexing of the UE-specific RSs.

In the UE-specific RS, a scramble code is further superposed on the code of each antenna port. The scramble code is generated on the basis of a cell ID and scramble ID reported from the base station apparatus 3 and the RRH 4. For example, the scramble code is generated from a pseudo-random sequence that is generated on the basis of a cell ID and scramble ID reported from the base station apparatus 3 and the RRH 4. For example, the scramble ID is a value representing 0 or 1. The scramble ID and antenna port to be used may be subjected to joint coding, and information representing them may be indexed. To generate a scramble code used for a UE-specific RS, parameters individually reported for the individual mobile station apparatuses 5 may be used. The UE-specific RS is mapped within a DL PRB pair of the PDSCH and the second PDCCH assigned to the mobile station apparatus 5 for which use of the UE-specific RS has been set.

Each of the base station apparatus 3 and the RRH 4 may assign a signal of CRS to different downlink resource elements, or may assign a signal of CRS to the same downlink resource element. For example, in a case where a cell ID reported from the base station apparatus 3 is different from a cell ID reported from the RRH 4, a signal of CRS may be assigned to different downlink resource elements. In another example, only the base station apparatus 3 may assign a signal of CRS to some of downlink resource elements, whereas the RRH 4 does not have to assign a signal of CRS to any downlink resource element. For example, in a case where a cell ID is reported from only the base station apparatus 3, only the base station apparatus 3 may assign a signal of CRS to some of downlink resource elements, whereas the RRH 4 does not have to assign a signal of CRS to any downlink resource element, as described above. In another example, the base station apparatus 3 and the RRH 4 may assign a signal of CRS to the same downlink resource element, and the same sequence may be transmitted from the base station apparatus 3 and the RRH 4. For example, in a case where the cell IDs reported from the base station apparatus 3 and the RRH 4 are the same, a signal of CRS may be assigned in the manner described above.

Figure 13:
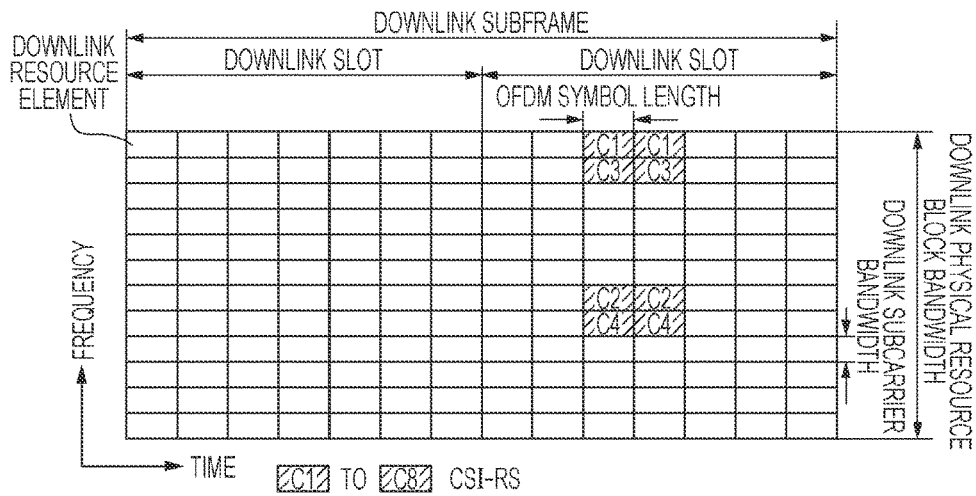
FIG. 13 is a diagram illustrating a DL PRB pair to which CSI-RSs (channel state information reference signals) for eight antenna ports are mapped.

FIG. 13 is a diagram illustrating a DL PRB pair to which CSI-RSs (channel state information reference signals) for eight antenna ports are mapped. FIG. 13 illustrates a case where CSI-RSs are mapped in a case where the number of antenna ports (the number of CSI ports) used in the base station apparatus 3 and the RRH 4 is eight. In FIG. 13, illustration of a CRS, a UE-specific RS, a PDCCH, a PDSCH, and so forth is omitted to simplify the description.

The CSI-RSs are code-division-multiplexed for every two CSI ports, that is, in individual CDM groups, two chips of orthogonal codes (Walsh codes) are used, and CSI ports (ports of CSI-RSs (antenna ports, resource grid)) are assigned to the individual orthogonal codes. Further, the individual CDM groups are frequency-division-multiplexed. By using four CDM groups, CSI-RSs for eight antenna ports, CSI ports 1 to 8 (antenna ports 15 to 22), are mapped. For example, in a CDM group C1 of the CSI-RSs, the CSI-RSs for the CSI ports 1 and 2 (antenna ports 15 and 16) are code-division-multiplexed and mapped. In a CDM group C2 of the CSI-RSs, the CSI-RSs for the CSI ports 3 and 4 (antenna ports 17 and 18) are code-division-multiplexed and mapped. In a CDM group C3 of the CSI-RSs, the CSI-RSs for the CSI ports 5 and 6 (antenna ports 19 and 20) are code-division-multiplexed and mapped. In a CDM group C4 of the CSI-RSs, the CSI-RSs for the CSI ports 7 and 8 (antenna ports 21 and 22) are code-division-multiplexed and mapped.

In a case where the number of antenna ports for the CSI-RSs of the base station apparatus 3 and the RRH 4 is eight, the base station apparatus 3 and the RRH 4 are capable of setting the number of layers (rank, spatial multiplexing number) to be applied to the PDSCH to eight at maximum. Further, the base station apparatus 3 and the RRH 4 are capable of transmitting a CSI-RS in a case where the number of antenna ports for the CSI-RS is one, two, or four. The base station apparatus 3 and the RRH 4 are capable of transmitting a CSI-RS for one antenna port or two antenna ports by using the CDM group C1 of the CSI-RS illustrated in FIG. 13. The base station apparatus 3 and the RRH 4 are capable of transmitting CSI-RSs for four antenna ports by using the CDM groups C1 and C2 of the CSI-RSs illustrated in FIG. 13.

The base station apparatus 3 and the RRH 4 may assign a signal of CSI-RS to different downlink resource elements, or may assign a signal of CSI-RS to the same downlink resource element. For example, the base station apparatus 3 and the RRH 4 may assign different downlink resource elements and/or different signal sequences to a CSI-RS. In the mobile station apparatus 5, a CSI-RS transmitted from the base station apparatus 3 and a CSI-RS transmitted from the RRH 4 are identified as CSI-RSs corresponding to different antenna ports. For example, the base station apparatus and the RRH 4 may assign the same downlink resource element to a CSI-RS, and the same sequence may be transmitted from the base station apparatus 3 and the RRH 4.

The configuration of a CSI-RS (CSI-RS-Config-r10) is reported from the base station apparatus 3 or the RRH 4 to the mobile station apparatus 5. The configuration of a CSI-RS includes at least information representing the number of antenna ports set for CSI-RSs (antennaPortsCount-r10), information representing a downlink subframe to which a CSI-RS is mapped (subframeConfig-r10), and information representing the frequency domain to which a CSI-RS is mapped (ResourceConfiq-r10). The number of antenna ports for CSI-RSs is, for example, any one of one, two, four, and eight. As information representing the frequency domain in which a CSI-RS is mapped, an index indicating the position of a head resource element among resource elements to which the CSI-RS corresponding to the antenna port 15 (CSI port 1) is mapped is used. If the position of the CSI-RS corresponding to the antenna port 15 is determined, the CSI-RSs corresponding to the other antenna ports are uniquely determined on the basis of a predetermined rule. As information representing a downlink subframe to which a CSI-RS is mapped, the position and period of the downlink subframe to which the CSI-RS is mapped are indicated by an index. For example, if the index of subframeConfig-r10 is 5, it means that a CSI-RS is mapped every ten subframes, and that, in a radio frame in which ten subframes serve as a unit, a CSI-RS is mapped to subframe 0 (the number of a subframe in a radio frame). In another example, if the index of subframeConfig-r10 is 1, it means that a CSI-RS is mapped every five subframes, and that, in a radio frame in which ten subframes serve as a unit, CSI-RSs are mapped to subframes 1 and 6.

<Configuration of Uplink Time Frame>

Figure 14:
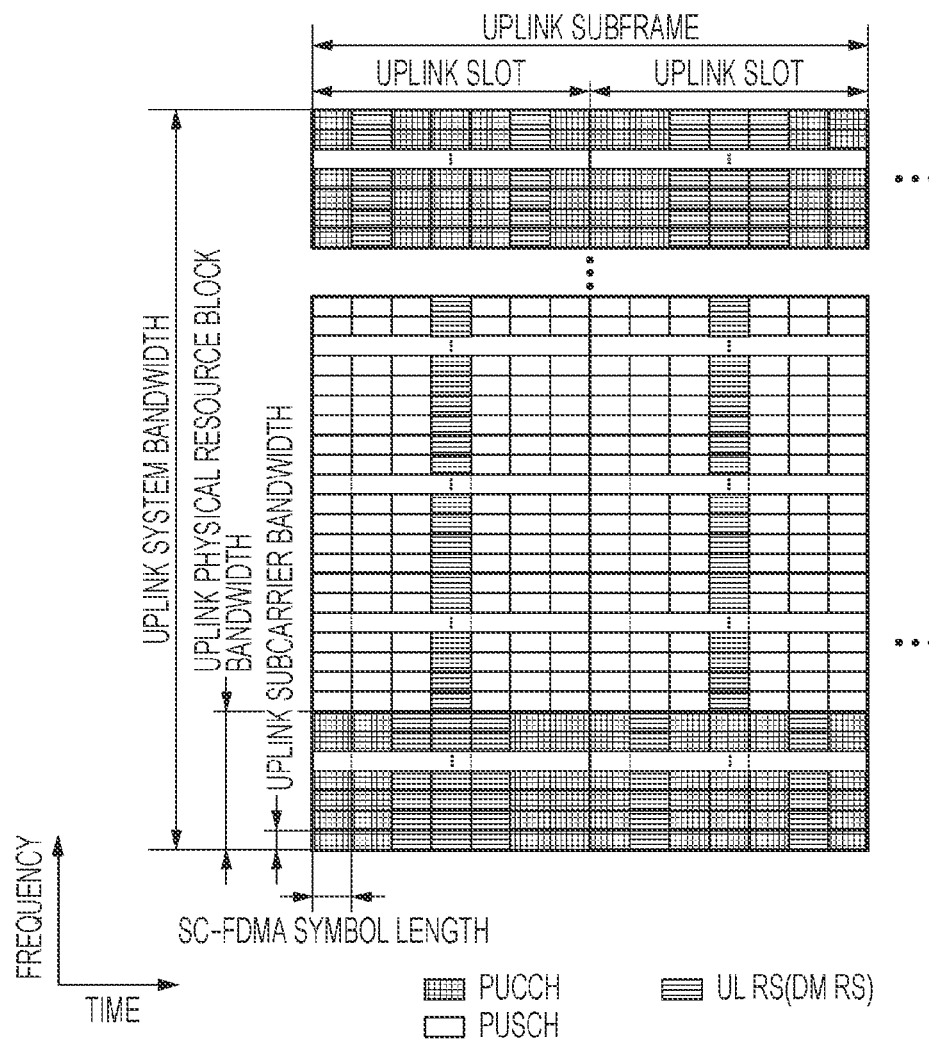
FIG. 14 is a diagram schematically illustrating the configuration of an uplink time frame from the mobile station apparatus 5 to the base station apparatus 3 or the RRH 4 according to the embodiment of the present invention.

FIG. 14 is a diagram schematically illustrating the configuration of an uplink time frame from the mobile station apparatus 5 to the base station apparatus 3 or the RRH 4 according to the embodiment of the present invention. In FIG. 14, the horizontal axis represents the time domain and the vertical axis represents the frequency domain. An uplink time frame is made up of a pair of physical resource blocks (referred to as an uplink physical resource block pair (UL PRB pair)). Each PRB pair is a unit of assignment of resources, and each RB has a frequency band and a time band of predetermined widths in the uplink. One UL PRB pair is made up of two uplink PRBs that are contiguous in the time domain in the uplink (referred to as uplink physical resource blocks (UL PRBs)).

In FIG. 14, one UL PRB is made up of twelve subcarriers in the frequency domain of the uplink (referred to as uplink subcarriers), and is made up of seven SC-FDMA (Single-Carrier Frequency Division Multiple Access) symbols in the time domain. The system band of the uplink (referred to as an uplink system band) is an uplink communication band of the base station apparatus 3 and the RRH 4. For example, the system bandwidth of the uplink (referred to as an uplink system bandwidth) has a frequency bandwidth of 20 MHz.

In the uplink system band, a plurality of UL PRB pairs are mapped on the basis of the uplink system bandwidth. For example, the uplink system band having a frequency bandwidth of 20 MHz is made up of one hundred and ten UL PRBs. In the time domain illustrated in FIG. 14, there are a slot made up of seven SC-FDMA symbols (referred to as an uplink slot) and a subframe made up of two uplink slots (referred to as an uplink subframe). A unit made up of one uplink subcarrier and one SC-FDMA symbol is referred to as a resource element (referred to as an uplink resource element).

In each uplink subframe, at least a PUSCH used to transmit information data, a PUCCH used to transmit uplink control information (UCI), and a UL RS (DM RS) for demodulating the PUSCH and PUCCH (estimating channel variations) are mapped. Although not illustrated, a PRACH used to establish uplink synchronization is mapped to any uplink subframe. Further, although not illustrated, a UL RS (SRS) used to measure channel quality or an out-of-synchronization state is mapped to any uplink subframe. The PUCCH is used to transmit a UCI (ACK/NACK) representing a positive acknowledgement (ACK) or a negative acknowledgement (NACK) for data received using the PDSCH, a UCI (SR: Scheduling Request) at least representing whether or not assignment of uplink resources is to be requested, and a UCI (CQI: Channel Quality Indicator) representing reception quality in the downlink (also referred to as channel quality).

In a case where the mobile station apparatus 5 requests assignment of uplink resources to the base station apparatus 3, the mobile station apparatus 5 transmits a signal on the PUCCH for transmitting an SR. The base station apparatus 3 determines, from a result indicating that a signal has been detected in the resource of the PUCCH for transmitting an SR, that the mobile station apparatus 5 requests assignment of uplink resources. In a case where the mobile station apparatus 5 does not request assignment of uplink resources to the base station apparatus 3, the mobile station apparatus 5 does not transmit any signal on the pre-assigned resource of the PUCCH for transmitting an SR. The base station apparatus 3 determines, from a result indicating that a signal is not detected in the resource of the PUCCH for transmitting an SR, that the mobile station apparatus 5 does not request assignment of uplink resources.

The PUCCH uses different types of signal configurations in individual cases where a UCI made up of an ACK/NACK is transmitted, where a UCI made up of an SR is transmitted, and where a UCI made up of a CQI is transmitted. The PUCCH used to transmit an ACK/NACK is referred to as PUCCH format 1a or PUCCH format 1b. In PUCCH format 1a, BPSK (Binary Phase Shift Keying) is used as a modulation scheme for modulating information regarding an ACK/NACK. In PUCCH format 1a, one-bit information is indicated by a modulated signal. In PUCCH format 1b, QPSK (Quadrature Phase Shift Keying) is used as a modulation scheme for modulating information regarding an ACK/NACK. In PUCCH format 1b, two-bit information is indicated by a modulated signal. The PUCCH used to transmit an SR is referred to as PUCCH format 1. The PUCCH used to transmit a CQI is referred to as PUCCH format 2. The PUCCH used to simultaneously transmit a CQI and an ACK/NACK is referred to as PUCCH format 2a or PUCCH format 2b. In PUCCH format 2a or PUCCH format 2b, a reference signal on an uplink pilot channel (DM RS) is multiplied by a modulated signal generated from information on an ACK/NACK. In PUCCH format 2a, one-bit information regarding an ACK/NACK and information regarding a CQI are transmitted. In PUCCH format 2b, two-bit information regarding an ACK/NACK and information regarding a CQI are transmitted.

One PUSCH is made up of one or more UL PRB pairs. One PUCCH is made up of two UL PRBs that are in a symmetrical relationship in the frequency domain within the uplink system band, and are positioned in different uplink slots. One PRACH is made up of six UL PRB pairs. For example, referring to FIG. 14, in an uplink subframe, the UL PRB of the lowest frequency in the first uplink slot and the UL PRB of the highest frequency in the second uplink slot constitute one UL PRB pair used for PUCCH. In a case where the mobile station apparatus 5 is set so as not to perform simultaneous transmission of the PUSCH and PUCCH, if the resource of the PUCCH and the resource of the PUSCH are assigned in the same uplink subframe, the mobile station apparatus 5 transmits a signal using only the resource of the PUSCH. In a case where the mobile station apparatus 5 is set so as to perform simultaneous transmission of the PUSCH and PUCCH, if the resource of the PUCCH and the resource of the PUSCH are assigned in the same uplink subframe, the mobile station apparatus 5 is basically capable of transmitting a signal using both the resource of the PUCCH and the resource of the PUSCH.

A UL RS is a signal used for an uplink pilot channel. The UL RS is made up of a demodulation reference signal (DM RS) used to estimate channel variations of the PUSCH and PUCCH, and a sounding reference signal (SRS) used to measure channel quality for frequency scheduling and adaptive modulation of the PUSCH of the base station apparatus 3 and the RRH 4, and to measure an out-of-synchronization state between the base station apparatus 3 or the RRH 4 and the mobile station apparatus 5. To simplify the description, an SRS is not illustrated in FIG. 14. A DM RS is mapped to different SC-FDMA symbols in the case of being mapped within the same UL PRB as the PUSCH and the case of being mapped within the same UL PRB as the PUCCH. The DM RS is a signal known in the communication system 1 and is used to estimate channel variations of the PUSCH and PUCCH.

In the case of being mapped within the same UL PRB as the PUSCH, the DM RS is mapped to the fourth SC-FDMA symbol in an uplink slot. In the case of being mapped within the same UL PRB as the PUCCH including an ACK/NACK, the DM RS is mapped to the third, fourth, and fifth SC-FDMA symbols in an uplink slot. In the case of being mapped within the same UL PRB as the PUCCH including an SR, the DM RS is mapped to the third, fourth, and fifth SC-FDMA symbols in an uplink slot. In the case of being mapped within the same UL PRB as the PUCCH including a CQI, the DM RS is mapped to the second and sixth SC-FDMA symbols in an uplink slot.

An SRS is mapped within the UL PRB determined by the base station apparatus 3, and is mapped to the fourteenth SC-FDMA symbol in an uplink subframe (the seventh SC-FDMA symbol in the second uplink slot in the uplink subframe). The SRS can be mapped to only the uplink subframe of the period determined by the base station apparatus 3 in the cell (referred to as a sounding reference signal subframe; SRS subframe). The base station apparatus 3 assigns, for each mobile station apparatus 5, a period of transmitting an SRS and an UL PRB assigned to the SRS for the SRS subframe.

FIG. 14 illustrates a state where the PUCCH is mapped to the endmost UL PRB in the frequency domain in the uplink system band. Alternatively, the second or third UL PRB from the end of the uplink system band may be used for the PUCCH.

In the PUCCH, code multiplexing in the frequency domain and code multiplexing in the time domain are used. Code multiplexing in the frequency domain is implemented by multiplying, in units of subcarriers, each code of a code sequence by a modulated signal modulated from uplink control information. Code multiplexing in the time domain is implemented by multiplying, in units of SC-FDMA symbols, each code of a code sequence by a modulated signal modulated from uplink control information. A plurality of PUCCHs are mapped to the same UL PRB, different codes are assigned to the individual PUCCHs, and code multiplexing is realized by the assigned codes in the frequency domain or the time domain. In the PUCCH used to transmit an ACK/NACK (referred to as PUCCH format 1a or PUCCH format 1b), code multiplexing in the frequency domain and the time domain is used. In the PUCCH used to transmit an SR (referred to as PUCCH format 1), code multiplexing in the frequency domain and the time domain is used. In the PUCCH used to transmit a CQI (referred to as PUCCH format 2, PUCCH format 2a, or PUCCH format 2b), code multiplexing in the frequency domain is used. To simplify the description, a description of code multiplexing of the PUCCH is omitted as appropriate.

The resource of the PUSCH is mapped in the time domain in the uplink subframe after a certain number (for example, four) from the downlink subframe in which the resource of the PDCCH including an uplink grant used to assign the resource of the PUSCH is mapped.

The resource of the PDSCH is mapped in the time domain in the same downlink subframe as the downlink subframe in which the resource of the PDCCH including a downlink assignment used to assign the resource of the PDSCH is mapped.

<Configuration of First PDCCH>

The first PDCCH is made up of a plurality of control channel elements (CCEs). The number of CCEs used in each downlink system band depends on a downlink system bandwidth, the number of OFDM symbols constituting the first PDCCH, and the number of downlink reference signals on a downlink pilot channel corresponding to the number of transmit antennas of the base station apparatus 3 (or the RRH 4) used for communication. A CCE is made up of a plurality of downlink resource elements, as described below.

Figure 15:
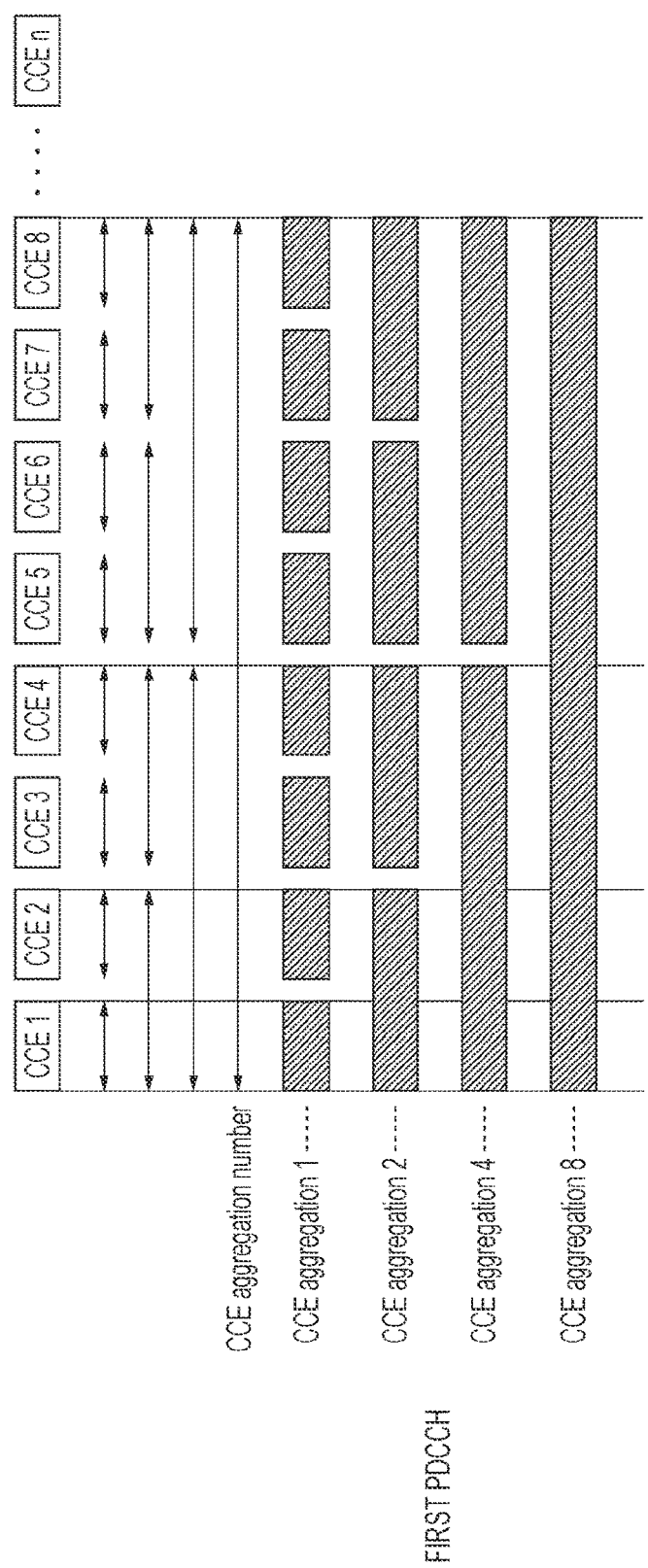
FIG. 15 is a diagram illustrating a logical relationship between a first PDCCH and CCEs in the communication system 1 according to the embodiment of the present invention.

FIG. 15 is a diagram illustrating a logical relationship between the first PDCCH and CCEs in the communication system 1 according to the embodiment of the present invention. CCEs used between the base station apparatus 3 (or the RRH 4) and the mobile station apparatus 5 have numbers identifying the CCEs. The numbers are assigned to the CCEs on the basis of a predetermined rule. Here, "CCE t" represents a CCE having a CCE number "t". The first PDCCH is made up of an aggregation of a plurality of CCEs (CCE Aggregation). The number of CCEs constituting the aggregation is hereinafter referred to as "CCE aggregation number". The CCE aggregation number constituting the first PDCCH is set by the base station apparatus 3 on the basis of a coding rate set to the first PDCCH and the number of bits of DCI included in the first PDCCH. An aggregation made up of n CCEs is hereinafter referred to as "CCE aggregation n".

For example, the base station apparatus 3 configures the first PDCCH using one CCE (CCE aggregation 1), configures the first PDCCH using two CCEs (CCE aggregation 2), configures the first PDCCH using four CCEs (CCE aggregation 4), or configures the first PDCCH using eight CCEs (CCE aggregation 8). For example, the base station apparatus 3 uses, for the mobile station apparatus 3 with good channel quality, a CCE aggregation number in which the number of CCEs constituting the first PDCCH is small, and uses, for the mobile station apparatus 3 with bad channel quality, a CCE aggregation number in which the number of CCEs constituting the first PDCCH is large. Also, for example, in the case of transmitting DCI of a small number of bits, the base station apparatus 3 uses a CCE aggregation number in which the number of CCEs constituting the first PDCCH is small. In the case of transmitting DCI of a large number of bits, the base station apparatus 3 uses a CCE aggregation number in which the number of CCEs constituting the first PDCCH is large.

In FIG. 15, shaded elements are first PDCCH candidates. The first PDCCH candidates are targets for which the mobile station apparatus 5 performs decoding and detection of the first PDCCH. First PDCCH candidates are independently configured for individual CCE aggregation numbers. Each of the first PDCCH candidates configured for the individual CCE aggregation numbers is made up of one or more different CCEs. For each CCE aggregation number, the number of first PDCCH candidates is independently set. The first PDCCH candidates configured for each CCE aggregation number are made up of CCEs having consecutive numbers. The mobile station apparatus 5 performs decoding and detection of the first PDCCH for the first PDCCH candidates, the number of which is set for each CCE aggregation number. If the mobile station apparatus 5 determines that a first PDCCH for the mobile station apparatus 5 has been detected, the mobile station apparatus 5 does not have to perform (may stop) decoding and detection of the first PDCCH for some of the first PDCCH candidates.

Figure 16:
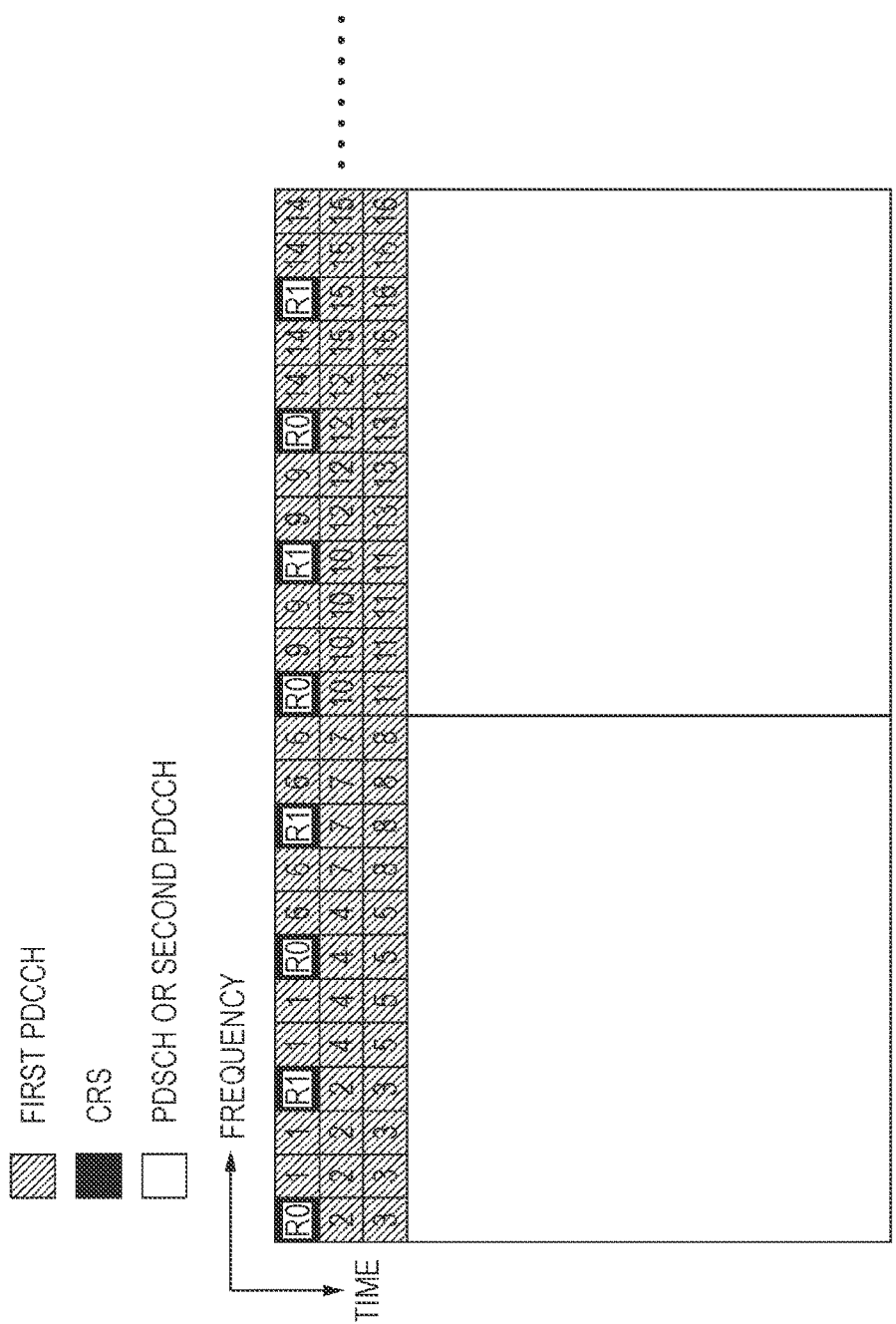
FIG. 16 is a diagram illustrating an example of arrangement of resource element groups in a downlink radio frame in the communication system 1 according to the embodiment of the present invention.

A plurality of downlink resource elements constituting a CCE are made up of a plurality of resource element groups (REGs, also referred to as mini-CCEs). A resource element group is made up of a plurality of downlink resource elements. For example, one resource element group is made up of four downlink resource elements. FIG. 16 is a diagram illustrating an example of arrangement of resource element groups in a downlink radio frame in the communication system 1 according to the embodiment of the present invention. Here, resource element groups used for the first PDCCH are illustrated, and illustration and description regarding a non-related part (PDSCH, second PDCCH, UE-specific RS, CSI-RS) are omitted. Here, a description will be given of a case where the first PDCCH is made up of the first to third OFDM symbols and downlink reference signals (R0, R1) corresponding to the CRSs for two transmit antennas (antenna port 0, antenna port 1) are mapped. In FIG. 16, the vertical axis represents the frequency domain and the horizontal axis represents the time domain.

In the example of arrangement illustrated in FIG. 16, one resource element group is made up of four downlink resource elements that are adjacent in the frequency domain. In FIG. 16, the downlink resource elements with the same number of the first PDCCH belong to the same resource element group. Resource element groups are formed, with resource elements R0 (a downlink reference signal for the antenna port 0) and R1 (a downlink reference signal for the antenna port 1) to which downlink reference signals are mapped being skipped. In FIG. 16, a number "1" is assigned to the resource element group of the first OFDM symbol with the lowest frequency, a number "2" is assigned to the resource element group of the second OFDM symbol with the lowest frequency, and a number "3" is assigned to the resource element group of the third OFDM symbol with the lowest frequency. Also, FIG. 16 illustrates that a number "4" is assigned to the resource element group adjacent in frequency to the resource element group having a number "2" of the second OFDM symbol to which a downlink reference signal is not mapped, and that a number "5" is assigned to the resource element group adjacent in frequency to the resource element group having a number "3" of the third OFDM symbol to which a downlink reference signal is not mapped. Further, FIG. 16 illustrates that a number "6" is assigned to the resource element group adjacent in frequency to the resource element group having a number "1" of the first OFDM symbol, that a number "7" is assigned to the resource element group adjacent in frequency to the resource element group having a number "4" of the second OFDM symbol, and that a number "8" is assigned to the resource element group adjacent in frequency to the resource element group having a number "5" of the third OFDM symbol.

A CCE is made up of a plurality of resource element groups illustrated in FIG. 16. For example, one CCE is made up of nine different resource element groups distributed in the frequency domain and the time domain. Specifically, regarding a CCE used for the first PDCCH, interleave is performed on all the resource element groups having numbers illustrated in FIG. 16 in units of resource element groups by using a block interleaver for the entire downlink system band, and nine resource element groups having consecutive numbers obtained through interleave constitute one CCE.

<Configuration of Second PDCCH>

Figure 17:
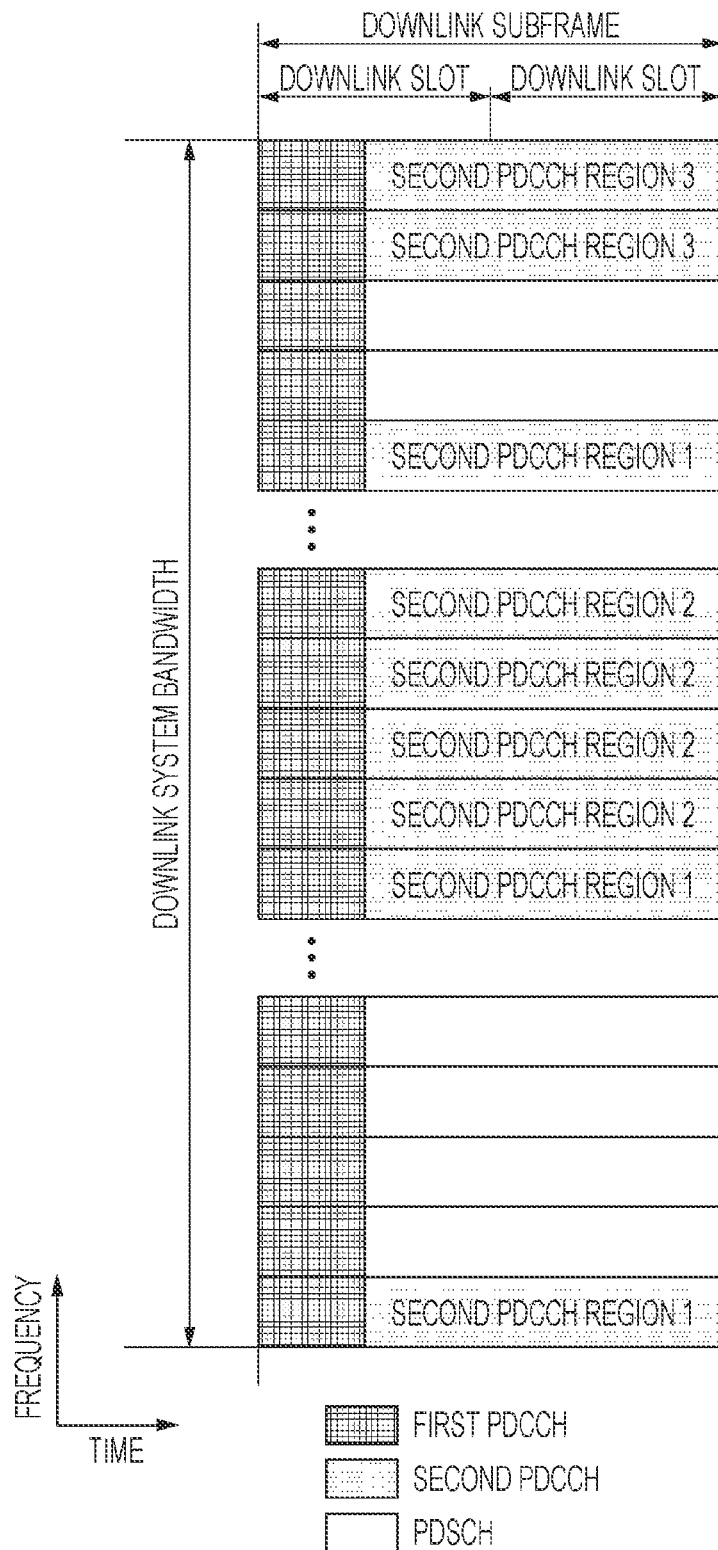
FIG. 17 is a diagram schematically illustrating the configuration of regions where second PDCCHs are possibly mapped in the communication system 1 according to the embodiment of the present invention.

FIG. 17 is a diagram schematically illustrating an example of the configuration of regions where a second PDCCH is possibly mapped in the communication system 1 according to the embodiment of the present invention (hereinafter referred to as second PDCCH regions to simplify the description). The base station apparatus 3 is capable of forming (configuring, mapping) a plurality of second PDCCH regions (second PDCCH region 1, second PDCCH region 2, and second PDCCH region 3) in a downlink system band. One second PDCCH region is made up of one or more DL PRB pairs. In a case where one second PDCCH region is made up of a plurality of DL PRB pairs, the second PDCCH region may be made up of DL PRB pairs that are distributed in the frequency domain or DL PRB pairs that are contiguous in the frequency domain. For example, the base station apparatus 3 is capable of configuring a second PDCCH region for each of a plurality of mobile station apparatuses 5.

For the individual second PDCCH regions, different transmission methods are set for signals to be mapped thereto. For example, precoding processing is applied to a signal mapped to a certain second PDCCH region. For example, precoding processing is not applied to a signal mapped to a certain second PDCCH region. In the second PDCCH region in which precoding processing is applied to a mapped signal, the same precoding processing can be applied to a second PDCCH and a UE-specific RS in a DL PRB pair. In the second PDCCH region in which precoding processing is applied to a mapped signal, different types of precoding processing (applied precoding vectors are different) (applied precoding matrices are different) may be applied to a second PDCCH and a UE-specific RS between different DL PRB pairs.

Figure 18:
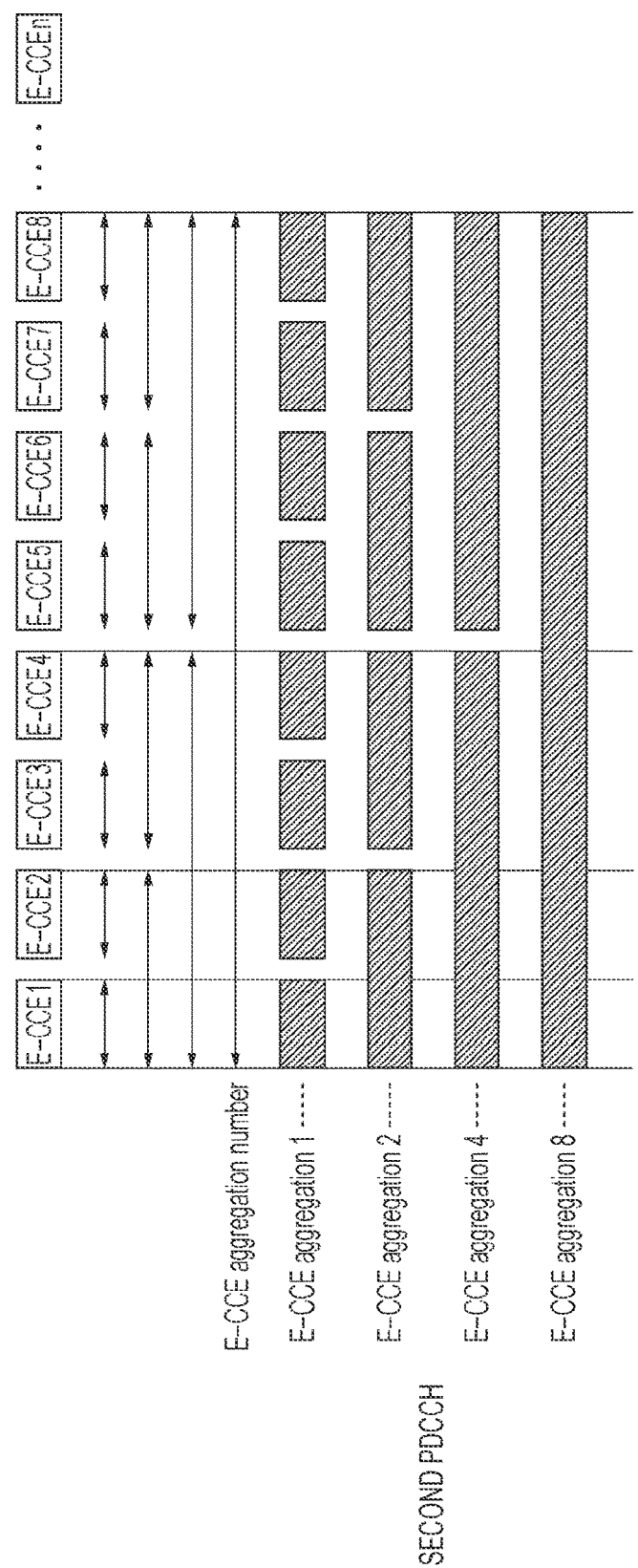
FIG. 18 is a diagram illustrating a logical relationship between a second PDCCH and E-CCEs in the communication system 1 according to the embodiment of the present invention.

One second PDCCH is made up of one or more E-CCEs (first elements). FIG. 18 is a diagram illustrating a logical relationship between a second PDCCH and E-CCEs in the communication system 1 according to the embodiment of the present invention. E-CCEs used between the base station apparatus 3 (or the RRH 4) and the mobile station apparatus 5 have numbers identifying the E-CCEs. Numbering of the E-CCEs is performed on the basis of a predetermined rule. Here, "E-CCE t" represents an E-CCE having an E-CCE number (E-CCE index) "t". The second PDCCH is made up of an aggregation including a plurality of E-CCEs (E-CCE Aggregation). The number of E-CCEs included in the aggregation is hereinafter referred to as "E-CCE aggregation number". For example, an E-CCE aggregation number constituting the second PDCCH is set by the base station apparatus 3 on the basis of a coding rate set to the second PDCCH and the number of bits of DCI included in the second PDCCH. An aggregation made up of n E-CCEs is hereafter referred to as "E-CCE aggregation n".

For example, the base station apparatus 3 configures a second PDCCH using one E-CCE (E-CCE aggregation 1), configures a second PDCCH using two E-CCEs (E-CCE aggregation 2), configures a second PDCCH using four E-CCEs (E-CCE aggregation 4), and configures a second PDCCH using eight E-CCEs (E-CCE aggregation 8). For example, the base station apparatus 3 uses, for the mobile station apparatus 3 with good channel quality, an E-CCE aggregation number in which the number of E-CCEs constituting the second PDCCH is small, and uses, for the mobile station apparatus 3 with bad channel quality, an E-CCE aggregation number in which the number of E-CCEs constituting the second PDCCH is large. For example, in the case of transmitting DCI of a small number of bits, the base station apparatus 3 uses an E-CCE aggregation number in which the number of E-CCEs constituting the second PDCCH is small, and in the case of transmitting DCI of a large number of bits, the base station apparatus 3 uses an E-CCE aggregation number in which the number of E-CCEs constituting the second PDCCH is large.

In FIG. 18, shaded elements are second PDCCH candidates. The second PDCCH candidates (E-PDCCH candidates) are targets on which the mobile station apparatus 5 performs decoding and detection of a second PDCCH. Second PDCCH candidates are independently configured for individual E-CCE aggregation numbers. Each of the second PDCCH candidates configured for individual E-CCE aggregation numbers is made up of one or more different E-CCEs. The number of second PDCCH candidates is independently set for each E-CCE aggregation number. The second PDCCH candidates configured for each E-CCE aggregation number are made up of E-CCEs having consecutive numbers or inconsecutive numbers. The mobile station apparatus 5 performs decoding and detection of a second PDCCH on the second PDCCH candidates the number of which is set for each E-CCE aggregation number. In a case where the mobile station apparatus 5 determines that a second PDCCH for the mobile station apparatus 5 has been detected, the mobile station apparatus 5 does not have to perform (may stop) decoding and detection of a second PDCCH on some of the configured second PDCCH candidates.

The number of E-CCEs configured in a second PDCCH region depends on the number of DL PRB pairs constituting the second PDCCH region. For example, the amount of resources (the number of resource elements) corresponding to one E-CCE is substantially equal to a quarter of resources that can be used for a signal on a second PDCCH within one DL PRB pair (except resource elements used for a downlink reference signal and a first PDCCH). One second PDCCH region may be made up of only one slot of a downlink subframe, and may be made up of a plurality of PRBs. Alternatively, the second PDCCH region may be independently made up of the first slot and the second slot in a downlink subframe. In the embodiment of the present invention, a description will be mainly given of a case where a second PDCCH region is made up of a plurality of DL PRB pairs in a downlink subframe for simplifying the description, but the present invention is not limited to such a case.

Figure 19:
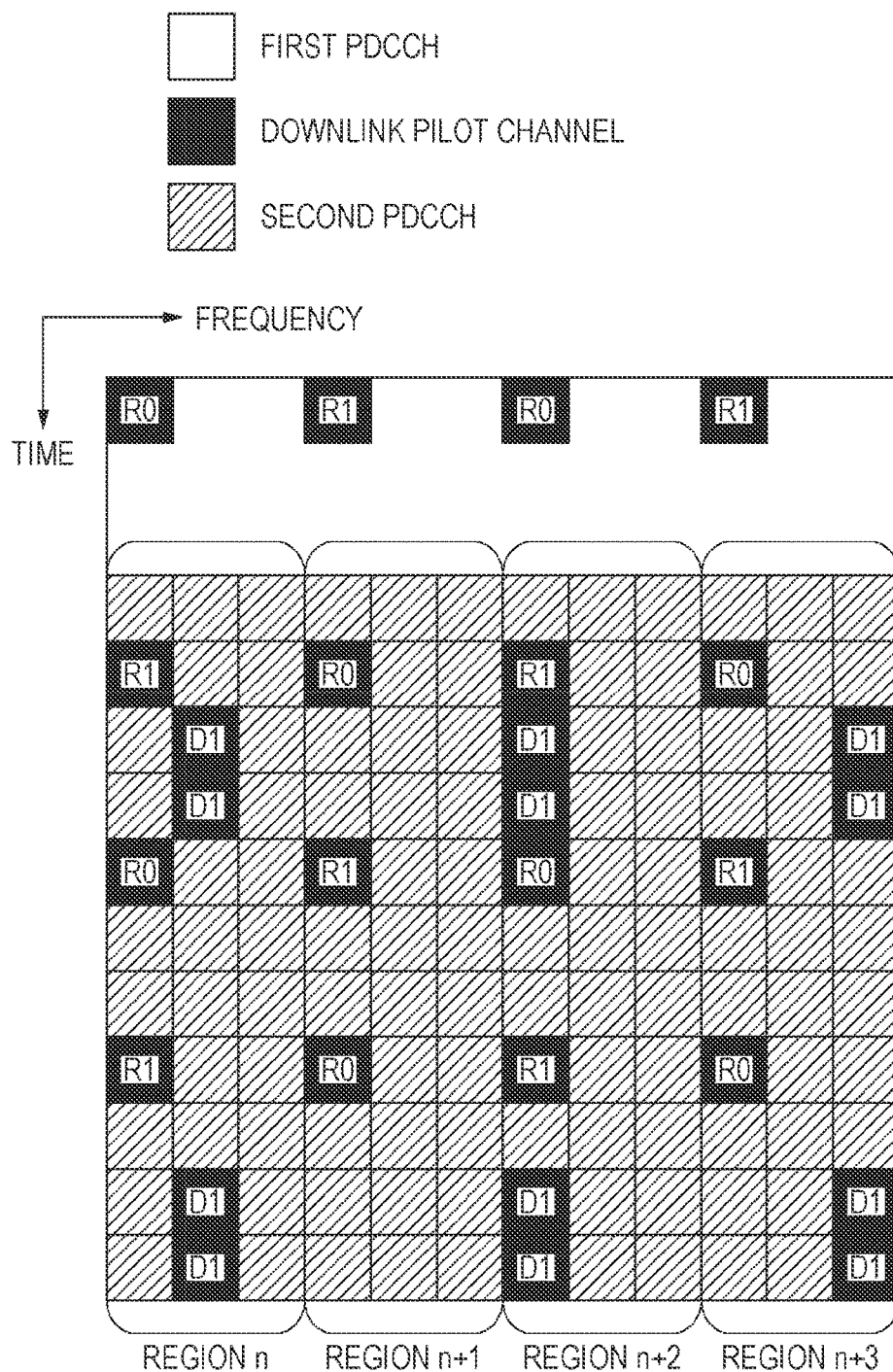
FIG. 19 is a diagram illustrating an example of the configuration of E-CCEs according to the embodiment of the present invention.

FIG. 19 is a diagram illustrating an example of the configuration of regions (resources) according to the embodiment of the present invention. Here, the resources constituting regions are illustrated, and the illustration and description of non-related parts (PDSCH and first PDCCH) are omitted. Here, one DL PRB pair is illustrated. Here, a description will be given of a case where a second PDCCH is made up of the fourth to fourteenth OFDM symbols of the first slot of a downlink subframe, and where CRSs (R0, R1) for two transmit antennas (antenna port 0, antenna port 1) and a UE-specific RS (D1) for one or two transmit antennas (antenna port 7, antenna port 8, not illustrated) are mapped. In FIG. 19, the vertical axis represents the frequency domain and the horizontal axis represents the time domain. A quarter of resources that can be used for a second PDCCH in a DL PRB pair is configured as one region. For example, a quarter of resources of a DL PRB pair in the frequency domain is configured as one region. Specifically, a resource corresponding to three subcarriers in a DL PRB pair is configured as one region. For example, the E-CCEs in the DL PRB pair are given numbers in ascending order from the E-CCE including a low subcarrier in the frequency domain.

Figure 20:
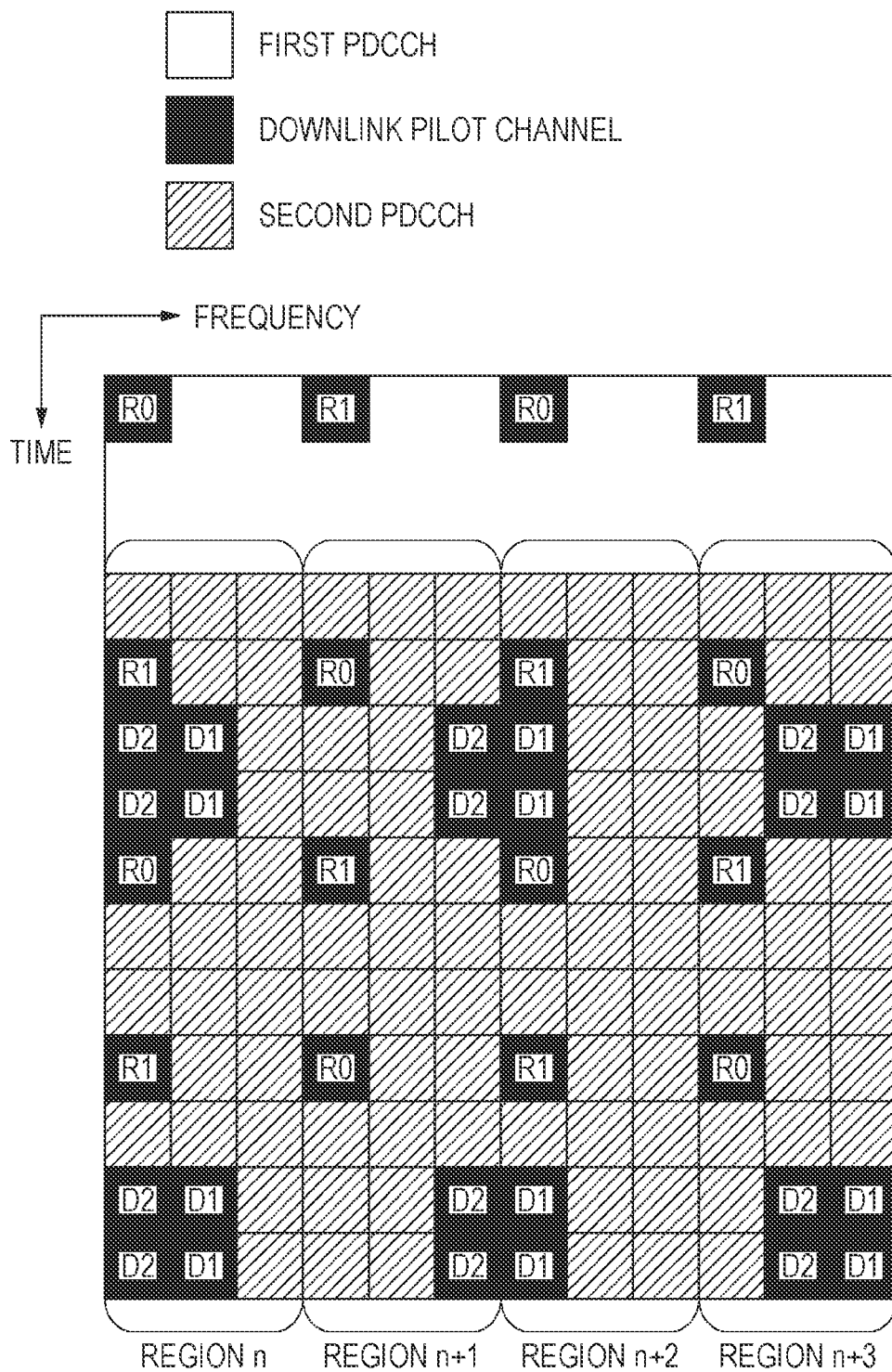
FIG. 20 is a diagram illustrating an example of the configuration of E-CCEs according to the embodiment of the present invention.

FIG. 20 is a diagram illustrating an example of the configuration of regions according to the embodiment of the present invention. Compared to the example illustrated in FIG. 19, the number of antenna ports for UE-specific RSs is different. FIG. 20 illustrates a case where UE-specific RSs (D1, D2) for three or four transmit antennas (antenna port 7, antenna port 8, antenna port 9, antenna port 10, not illustrated) are mapped.

Different types of physical resource mapping (first physical resource mapping, second physical resource mapping) are applied to second PDCCH regions. Specifically, the configuration of E-CCEs constituting one second PDCCH (aggregation method) differs. For example, a second PDCCH to which the first physical resource mapping is applied is referred to as "Localized E-PDCCH". For example, a second PDCCH to which the second physical resource mapping is applied is referred to as "Distributed E-PDCCH". For example, the Localized E-PDCCH is made up of one E-CCE (E-CCE aggregation 1), or is made up of two E-CCEs (E-CCE aggregation 2), or is made up of four E-CCEs (E-CCE aggregation 4). The Localized E-PDCCH in which the E-CCE aggregation number is 2 or more is made up of a plurality of E-CCEs having consecutive E-CCE numbers (consecutive in the frequency domain). For example, the Distributed E-PDCCH is made up of four E-CCEs (E-CCE aggregation 4) or is made up of eight E-CCEs (E-CCE aggregation 8). The Distributed E-PDCCH is made up of a plurality of E-CCEs associated with non-contiguous regions in the frequency domain. For example, the four E-CCEs constituting the Distributed E-PDCCH of E-CCE aggregation 4 are made up of regions in different DL PRB pairs. The eight E-CCEs constituting the Distributed E-PDCCH of E-CCE aggregation 6 may be made up of regions in different DL PRB pairs, and some of the plurality of E-CCEs may be made up of regions in the same DL PRB pair. For example, a plurality of E-CCEs that are used for one Localized E-PDCCH are made up of regions in one DL PRB pair, and a plurality of E-CCEs that are used for one Distributed E-PDCCH are made up of regions in a plurality of DL PRB pairs.

Figure 21:
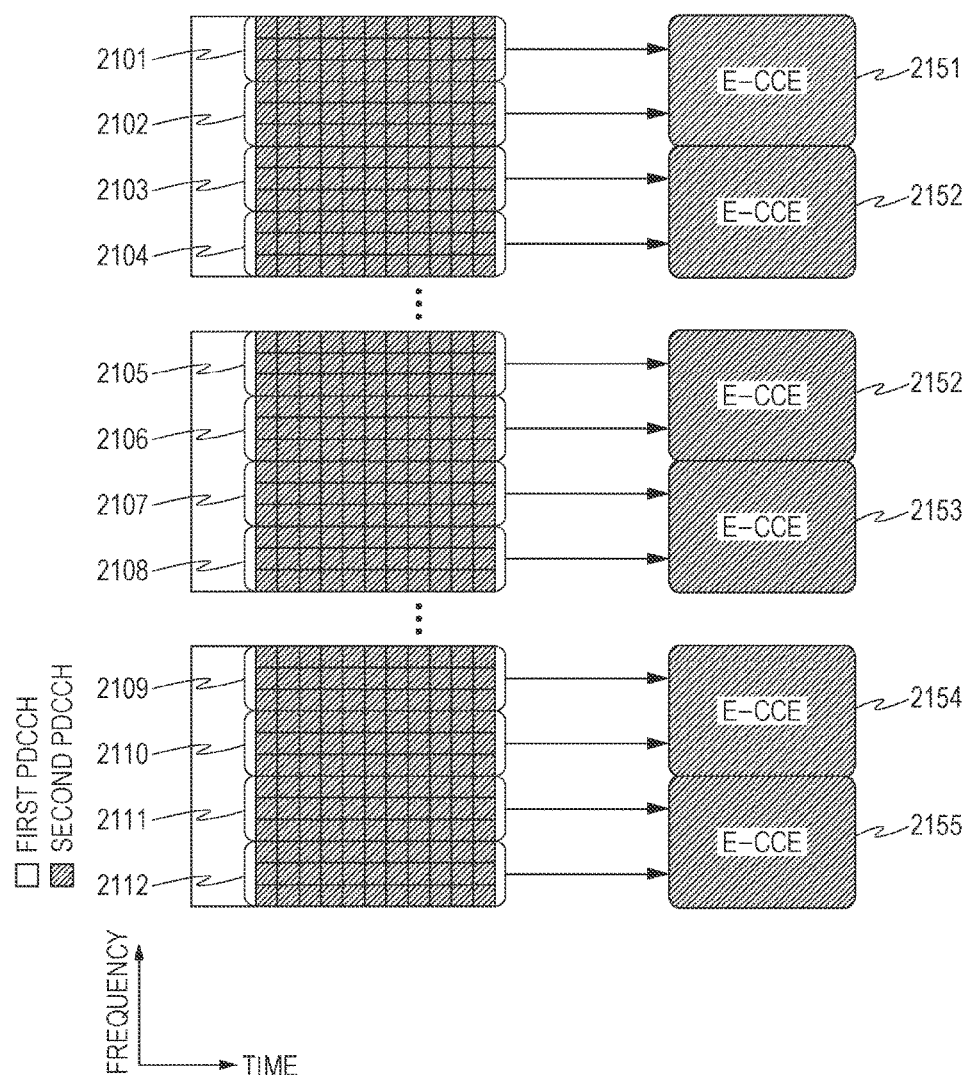
FIG. 21 is a diagram illustrating an example of the configuration of E-CCEs, regions, and Localized E-PDCCH.

FIG. 21 is a diagram illustrating an example of the configuration of E-CCEs and Localized E-PDCCHs. FIG. 21 illustrates a case where a second PDCCH is made up of the fourth to fourteenth OFDM symbols of a downlink subframe. In FIG. 21, the vertical axis represents the frequency domain, and the horizontal axis represents the time domain. For example, a certain E-CCE is made up of two E-CCEs having a small number (low in the frequency domain) among the regions (resources) in a certain DL PRB pair (for example, an E-CCE 2151 is made up of regions 2101 and 2102, in other words, the E-CCE 2151 is associated with the regions 2101 and 2102). Also, a certain E-CCE is made up of two E-CCEs having a large number (high in the frequency domain) among the regions in a certain DL PRB pair (for example, an E-CCE 2152 is made up of regions 2103 and 2104).

Figure 22:
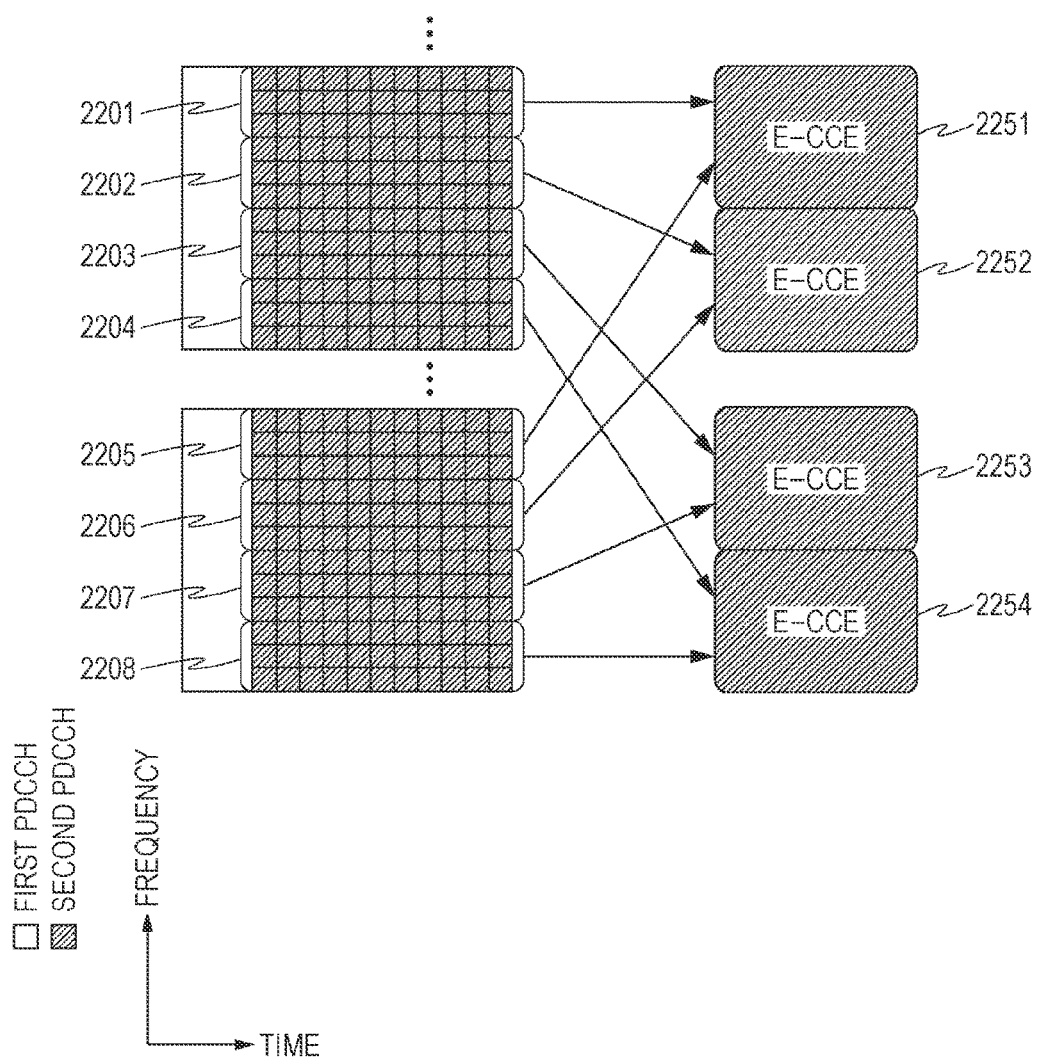
FIG. 22 is a diagram illustrating an example of the configuration of E-CCEs, regions, and Distributed E-PDCCH.

FIG. 22 is a diagram illustrating an example of the configuration of E-CCEs and Distributed E-PDCCHs. FIG. 22 illustrates a case where a second PDCCH is made up of the fourth to fourteenth OFDM symbols of a downlink subframe. In FIG. 22, the vertical axis represents the frequency domain, and the horizontal axis represents the time domain. For example, in a certain E-CCE, two regions are made up of regions in different DL PRB pairs. For example, a certain E-CCE is made up of E-CCEs having the smallest number (lowest in the frequency domain) among the regions in individual DL PRB pairs (for example, an E-CCE 2251 is made up of regions 2201 and 2205, in other words, the E-CCE 2251 is associated with the regions 2201 and 2205). For example, a certain E-CCE is made up of regions having the second smallest number (second lowest in the frequency domain) among the regions in individual DL PRB pairs (for example, an E-CCE 2252 is made up of regions 2202 and 2206). For example, a certain E-CCE is made up of regions having the third smallest number (third lowest in the frequency domain) among the regions in individual DL PRB pairs (for example, an E-CCE 2253 is made up of regions 2203 and 2207). For example, a certain E-CCE is made up of regions having the largest number (highest in the frequency domain) among the regions in individual DL PRB pairs (for example, an E-CCE 2254 is made up of regions 2204 and 2208).

Figure 23:
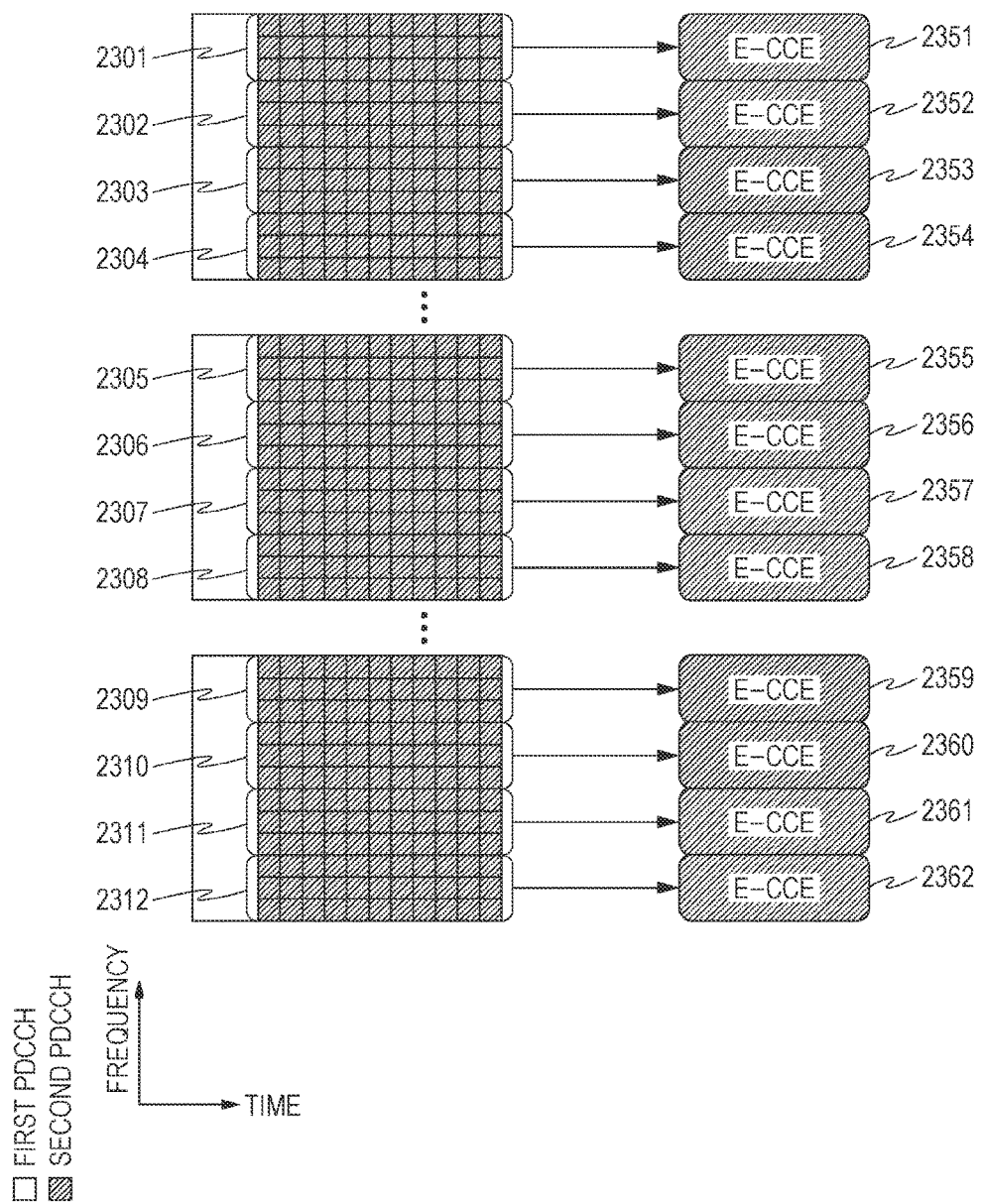
FIG. 23 is a diagram illustrating an example of the configuration of E-CCEs, regions, and Localized E-PDCCH.

FIG. 23 is a diagram illustrating an example of the configuration of E-CCEs and Localized E-PDCCHs. FIG. 23 illustrates a case where a second PDCCH is made up of the fourth to fourteenth OFDM symbols of a downlink subframe. In FIG. 23, the vertical axis represents the frequency domain, and the horizontal axis represents the time domain. For example, a certain E-CCE is made up of one region in a certain DL PRB pair (for example, an E-CCE 2351 is made up of a region 2301, in other words, the E-CCE 2351 is associated with the region 2301). Another certain E-CCE is made up of a certain region in a certain DL PRB pair (for example, an E-CCE 2152 is made up of regions 2103 and 2104, in other words, the E-CCE 2152 is associated with the regions 2103 and 2104). In this way, a certain E-CCE may be made up of (or associated with) one region as illustrated in FIG. 23, unlike in FIGS. 21 and 22, in which a certain E-CCE is made up of (or associated with) two regions. FIG. 23 illustrates an example of the configuration of Localized E-PDCCHs. In the configuration of Distributed E-PDCCHs, an E-CCE may be made up of (or associated with) one region. Although not illustrated, a certain E-CCE may be made up of (or associated with) three or more regions. The number of regions included in an E-CCE (that is, the correspondence between an E-CCE and regions) may be reported from the base station apparatus 3, and configuration may be performed accordingly in the mobile station apparatus 5. For example, the information may be reported using RRC (Radio Resource Control) signaling. The report may be performed for each mobile station apparatus 5, or may be associated with other information. For example, the report may be associated with the value of CFI (Control Format Indicator), which is the number of OFDM symbols of a first PDCCH included in DL PRB pairs, a DCI Format, the number of ports of CRS, or the like. Alternatively, a possible set of E-CCE aggregation number may be explicitly signaled from a base station to a terminal (for example, RRC signaling). For example, in the case of being associated with the value of CFI, two regions may constitute (or may be associated with) one E-CCE as illustrated in FIGS. 21 and 22 if the value of CFI is 2 or 3, and one region may constitute (or may be associated with) one E-CCE as illustrated in FIG. 23 if the value of CFI is 0. In another example, in the case of DCI Formats 2, 2A, 2B, and 2C (for example, when a system bandwidth is 10 MHz, these are formats having a bit number of 56 bits or more. From another point of view, these are formats used for MIMO transmission, and two MCS (Modulation and Coding Scheme) values corresponding to two codewords can be reported. Also, a DCI Format 4 including two MCSs may be included), two regions may constitute one E-CCE as illustrated in FIGS. 21 and 22. In the case of DCI Formats 0, 1A, 1C, 3, and 3A (for example, when a system bandwidth is 10 MHz, these are formats having a bit number of 44 bits or less. From another point of view, these are formats used for single-antenna transmission or transmission diversity, and one MCS (Modulation and Coding Scheme) value corresponding to one codeword can be reported), one region may constitute one E-CCE as illustrated in FIG. 23. In another example, two regions may constitute one E-CCE as illustrated in FIGS. 21 and 22 in a case where two or more ports (for example, antenna ports 0 and 1 or antenna ports 0, 1, 2, and 3) are configured for a CRS, and one region may constitute one E-CCE as illustrated in FIG. 23 in a case where one port or less (for example, only an antenna port 0) is configured for a CRS. In a case where the correspondence between a region and an E-CCE is set in association with the above-described information (that is, CFI, the number of CRS ports, etc.), a threshold may be reported from the base station apparatus 3 using RRC (Radio Resource Control) signaling. For example, in a case where a CFI is associated, it may be reported that CFI is 2 or more and two regions constitute (or are associated with) one E-CCE, or that CFI is 1 or more and two regions constitute (or are associated with) one E-CCE. Also, it may be reported whether one region constitutes one E-CCE as illustrated in FIG. 23 in a case where one port or less (for example, only an antenna port 0) is configured for a CRS, or whether one region constitutes one E-CCE as illustrated in FIG. 23 in a case where a port is not configured for a CRS (CRS is not transmitted).

Figure 24:
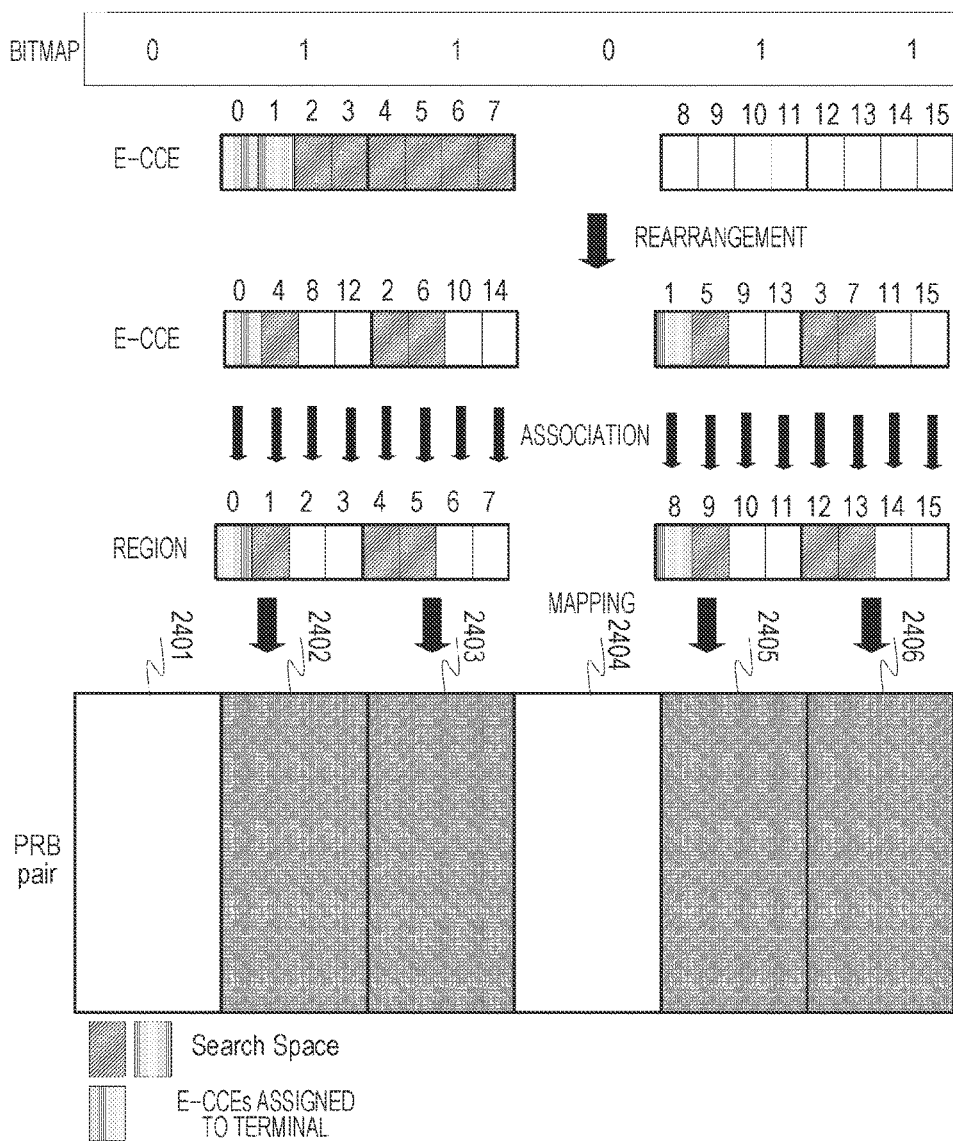
FIG. 24 is a diagram illustrating an example of the configuration of E-CCEs, regions, a bitmap, PRB pairs, and Distributed E-PDCCH (the base station apparatus side).
Figure 26:
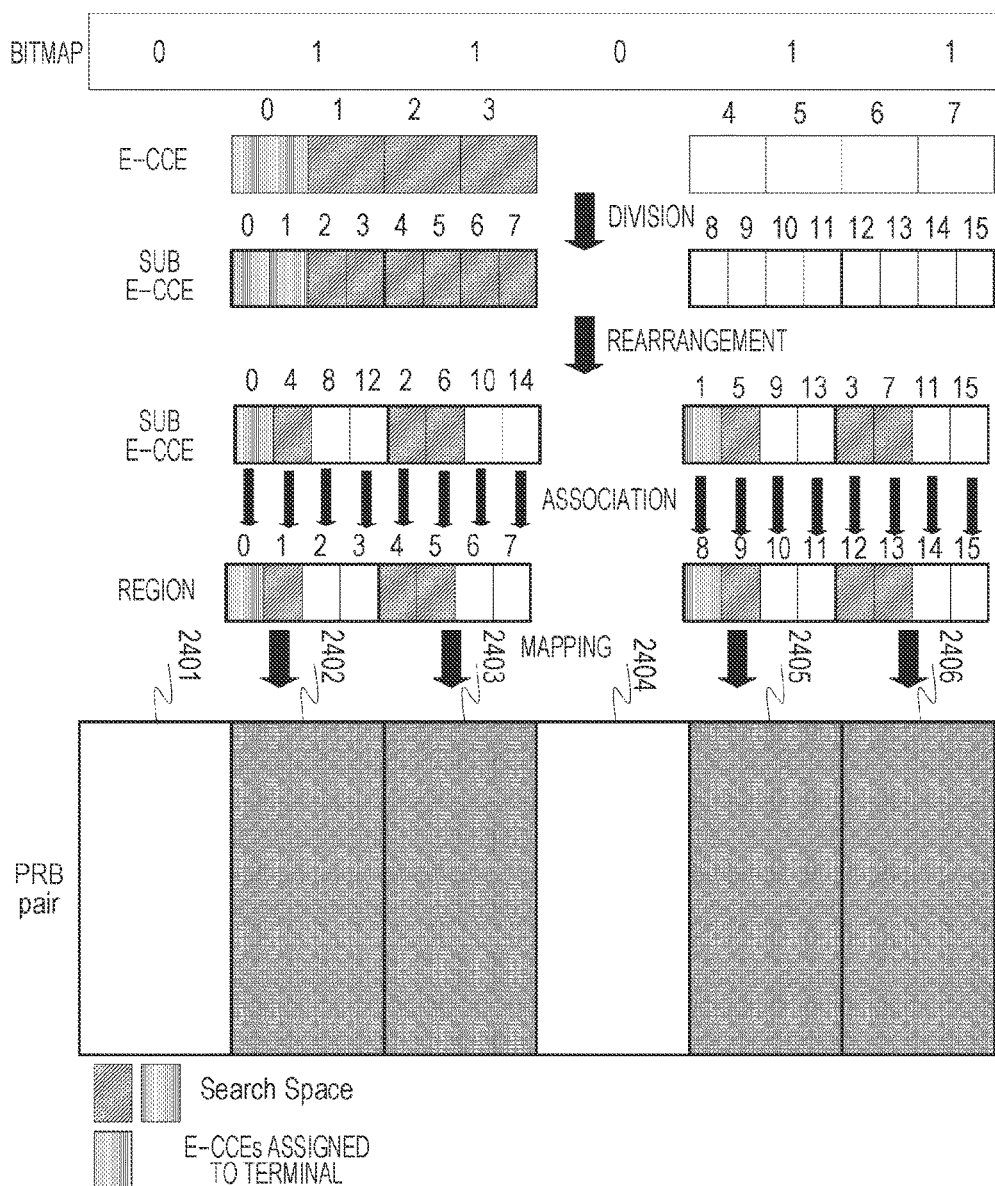
FIG. 26 is a diagram illustrating an example of the configuration of E-CCEs, regions, a bitmap, PRB pairs, and Distributed E-PDCCH (the base station apparatus side).
Figure 27:
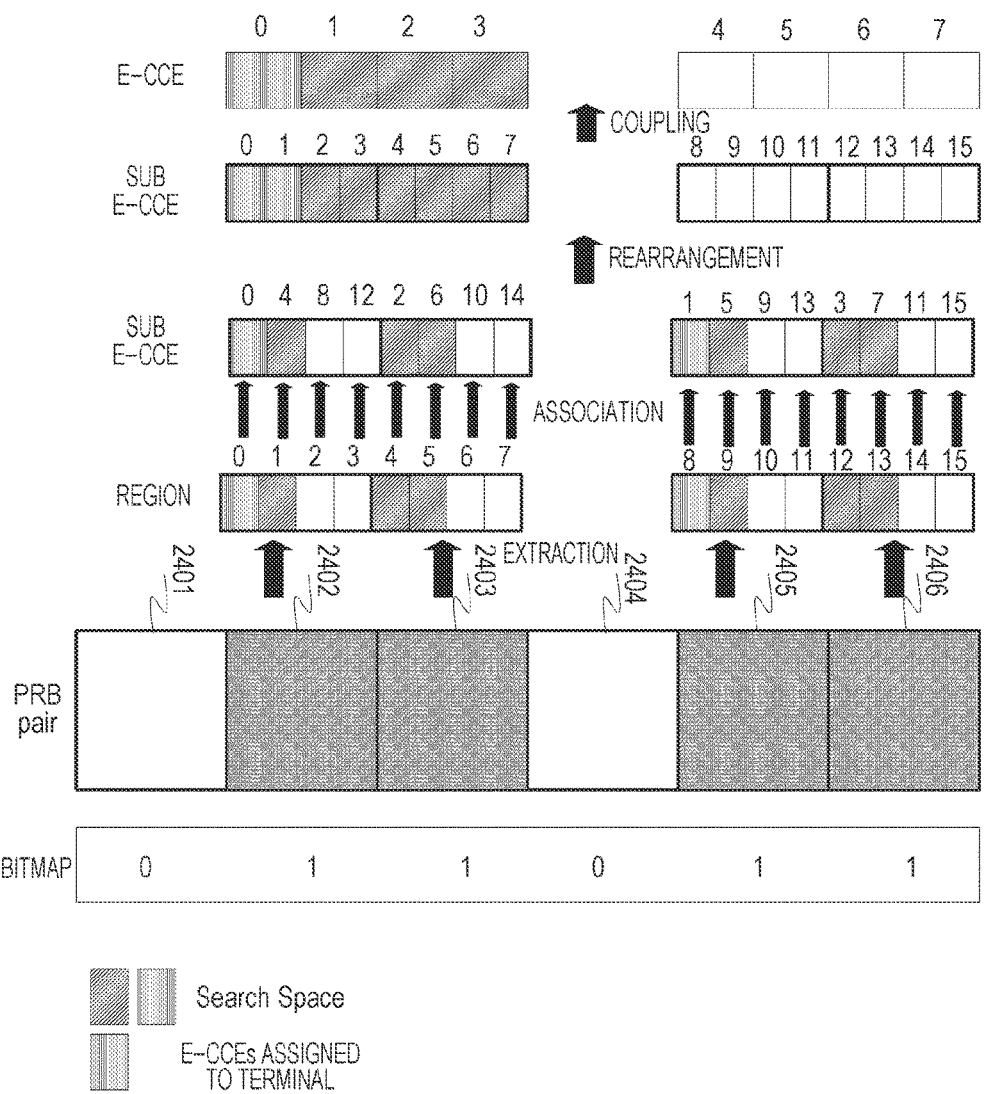
FIG. 27 is a diagram illustrating an example of the configuration of E-CCEs, regions, a bitmap, PRB pairs, and Distributed E-PDCCH (the mobile station apparatus side).

FIG. 24 illustrates an example in which E-CCEs are mapped to regions from a viewpoint of the base station apparatus 3. Here, one E-CCE is made up of one region as in the case of FIG. 23, but one E-CCE may be made up of two regions as in the cases of FIGS. 21 and 22. FIG. 24 also illustrates an example of the configuration of Distributed E-PDCCH. First, the base station apparatus 3 notifies each mobile station apparatus 5 of a bit map using RRC (Radio Resource Control) signaling. Here, a bit map may indicate a PRB pair to which a second PDCCH is possibly mapped, and the number of resources of E-CCEs and the number of resources of regions at the time of mapping of the E-CCEs and regions. A search space (SS) indicating an E-CCE to which a downlink control channel is possibly assigned, a signal generated from DCI addressed to the mobile station apparatus 5 being mapped to the downlink control channel, is possibly reported separately. In accordance with the reported bit map, the base station apparatus 3 determines the number of resources of E-CCEs (the number of resources of E-CCEs is 16 in FIG. 24. Four PRB pairs are selected by the bit map and the individual PRB pairs are associated with four E-CCEs, and thus the number of resources of the E-CCEs is 16). In the case of Distributed E-PDCCH, the E-CCEs are rearranged, and the E-CCEs (after rearrangement) are obtained. Subsequently, the E-CCEs (after rearrangement) are associated with corresponding regions. For example, in FIG. 24, the E-CCEs (after rearrangement) #0, #4, #8, #12, #2, #6, #10, #14, #1, #5, #9, #13, #3, #7, #11, and #15 are respectively associated with the regions #0, #1, #2, #3, #4, #5, #6, #7, #8, #9, #10, #11, #12, #13, #14, #15, and #16 in order. Subsequently, in FIG. 24, the regions #1 to #3 are mapped to a PRB pair 2402, the regions #4 to #7 are mapped to a PRB pair 2403, the regions #8 to #11 are mapped to a PRB pair 2405, and the regions #12 to #15 are mapped to a PRB pair 2406. That is, in the example illustrated in FIG. 24, it is understood that four regions are assigned to the PRB pair 2402 through the above-described process, and the individual assigned regions are associated with the E-CCEs #0, #4, #8, and #12. An example of Distributed E-PDCCH is described here. In this case, the base station apparatus 3 notifies each mobile station apparatus 5 of a common bit map, and accordingly the plurality of mobile station apparatuses 5 are capable of using common mapping for rearrangement used for E-CCEs and E-CCEs (after rearrangement). Here, one E-CCE is made up of one region as in the case of FIG. 23, but one E-CCE may be made up of two regions as in the cases of FIGS. 21 and 22. In this case, there is a possibility that an E-CCE number (E-CCE index) is associated with a sub E-CCE number (sub E-CCE index) (As illustrated in FIGS. 26 and 27, for example, the E-CCE #0 is associated with sub E-CCEs #0 and #1, and the E-CCE #1 is associated with sub E-CCEs #2 and #3. Also, sub E-CCE indices are associated with regions as illustrated in FIG. 26. For example, a PRB pair 2602 is associated with the sub E-CCEs #0, #4, #8, and #12.) The search space may include a common search space that is commonly configured for the plurality of mobile station apparatuses 5 and a terminal-specific search space that is individually configured for the plurality of mobile station apparatuses 5. The common search space may be configured, with a specific E-CCE number being a start point. For example, the E-CCE #0 may always be configured as a start point of a common search space, and another specific E-CCE number may be a start point of the common search space. Also, the start point of a terminal-specific search space may be explicitly configured for the mobile station apparatus 5 by the base station apparatus 3. For example, different start points may be configured for the individual mobile station apparatuses 5. Accordingly, even in a case where a common bit map is reported to the plurality of mobile station apparatuses 5, and the mobile station apparatuses 5 receive a second PDCCH using the same resource blocks pair, different terminal-specific search spaces can be configured for the individual mobile station apparatuses 5.

Figure 25:
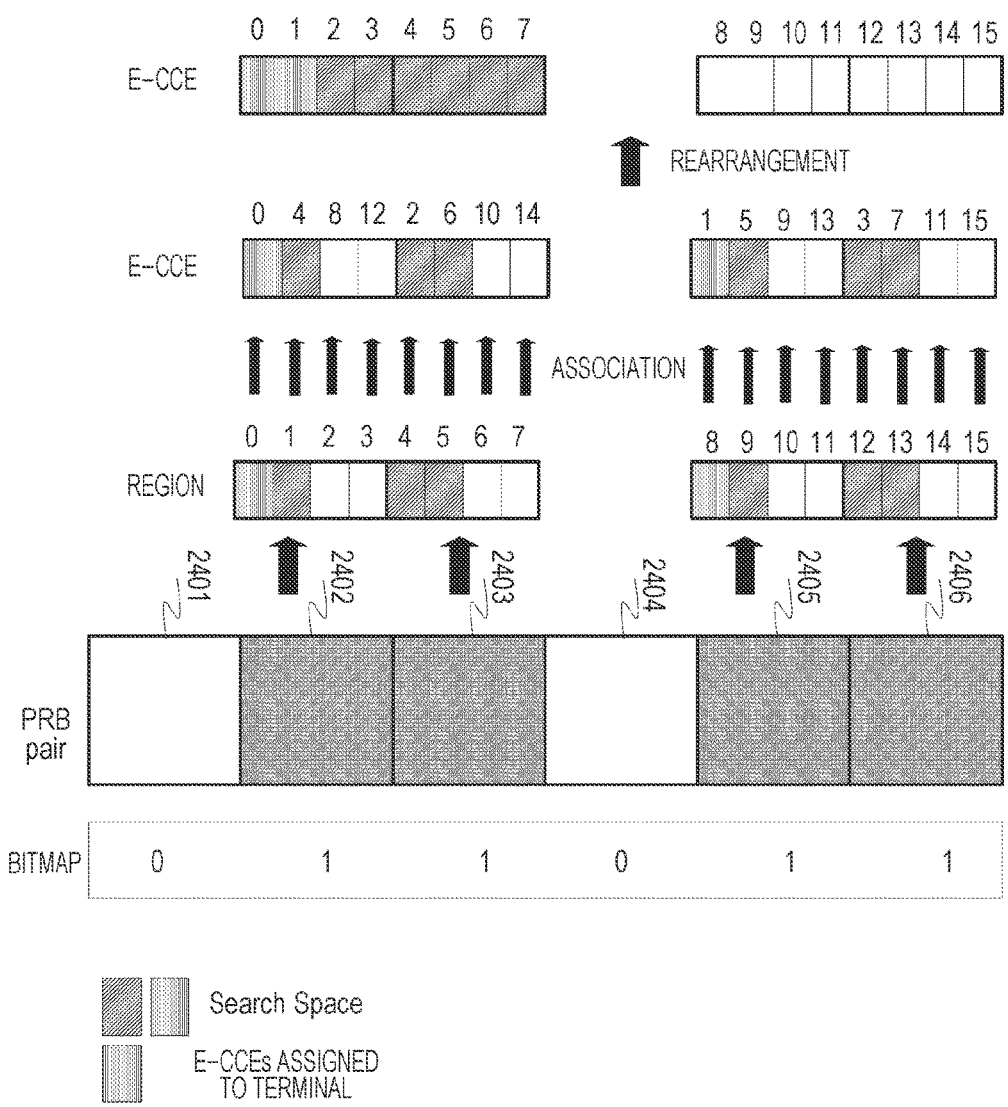
FIG. 25 is a diagram illustrating an example of the configuration of E-CCEs, regions, a bitmap, PRB pairs, and Distributed E-PDCCH (the mobile station apparatus side).

FIG. 25 illustrates an example in which regions are mapped to E-CCEs from a viewpoint of the mobile station apparatus 5. The correspondence between E-CCEs and regions illustrated in FIG. 25 is completely the same as that in FIG. 24. Here, one E-CCE is made up of one region as in the case of FIG. 23, but one E-CCE may be made up of two regions as in the cases of FIGS. 21 and 22. FIG. 25 also illustrates an example of the configuration of Distributed E-PDCCH. First, the mobile station apparatus 5 is notified of, by the base station apparatus 3, a bit map using RRC (Radio Resource Control) signaling. Here, a bit map may indicate a PRB pair to which a second PDCCH is possibly mapped, and the number of resources of E-CCEs and the number of resources of regions at the time of mapping of the E-CCEs and regions. A search space (SS) indicating an E-CCE to which a downlink control channel is possibly assigned, a signal generated from DCI addressed to the mobile station apparatus 5 being mapped to the downlink control channel, is possibly reported separately. The mobile station apparatus 3 extracts regions on the basis of the reported bit map. In the example illustrated in FIG. 24, for example, four regions are assigned to a PRB pair 2502, and the individual assigned regions are #0, #1, #2, and 3. More specifically, the regions #0 to 15 associated with PRB pairs 2502, 2503, 2505, and 2506 are extracted. Subsequently, the regions #0 to #15 are associated with the rearranged E-CCEs #0 to #15 on the basis of the order illustrated in FIG. 25. After that, the rearranged E-CCEs are rearranged to E-CCEs. In accordance with this procedure, the mobile station apparatus 3 rearranges E-CCEs using the received signal and bit map, and demodulates a second PDCCH. The search space includes a common search space (CSS) monitored (for example, demodulated) by a plurality of mobile station apparatuses 5, and a UE specific search space (USS) monitored (for example, demodulated) by only a specific mobile station apparatus 5. In the examples illustrated in FIGS. 24 and 25, specific E-CCE numbers (for example, E-CCE numbers #0 to 7, or a start position of a common search space is E-CCE number #0) may be set to a common search space. Separately from this, each mobile station apparatus 5 may be notified of a UE specific search space.

FIG. 26 illustrates an example in which E-CCEs are mapped to regions from a viewpoint of the base station apparatus 3. Here, an example is illustrated in which one E-CCE is made up of two regions as in the cases of FIGS. 21 and 22. FIG. 26 also illustrates an example of the configuration of Distributed E-PDCCH. First, the base station apparatus 3 notifies each mobile station apparatus 5 of a bit map using RRC (Radio Resource Control) signaling. Here, a bit map may indicate a PRB pair to which a second PDCCH is possibly mapped, and the number of resources of E-CCEs and the number of resources of regions at the time of mapping of the E-CCEs and regions. A search space (SS) indicating an E-CCE to which a downlink control channel is possibly assigned, a signal generated from DCI addressed to the mobile station apparatus 5 being mapped to the downlink control channel, is possibly reported separately. In accordance with the reported bit map, the base station apparatus 3 determines the number of resources of E-CCEs (the number of resources of E-CCEs is 8 in FIG. 26. Four PRB pairs are selected by the bit map and the individual PRB pairs are associated with two E-CCEs, and thus the number of resources of the E-CCEs is 8), and these are associated with sub E-CCEs (for example, E-CCE #0 is associated with sub E-CCEs #0 and 1, and E-CCE #1 is associated with sub E-CCEs #2 and 3). The sub E-CCEs are rearranged in the case of Distributed E-PDCCH, and become sub E-CCEs (after rearrangement). Subsequently, the sub E-CCEs (after rearrangement) are associated with corresponding regions. For example, in FIG. 26, the sub E-CCEs (after rearrangement) #0, #4, #8, #12, #2, #6, #10, #14, #1, #5, #9, #13, #3, #7, #11, and #15 are respectively associated with the regions #0, #1, #2, #3, #4, #5, #6, #7, #8, #9, #10, #11, #12, #13, #14, #15, and #16 in order. Subsequently, in FIG. 26, the regions #1 to #3 are mapped to a PRB pair 2402, the regions #4 to #7 are mapped to a PRB pair 2403, the regions #8 to #11 are mapped to a PRB pair 2405, and the regions #12 to #15 are mapped to a PRB pair 2406. That is, in the example illustrated in FIG. 26, it is understood that four regions are assigned to the PRB pair 2402 through the above-described process, and the individual assigned regions are associated with the sub E-CCEs #0, #4, #8, and #12 (from another viewpoint, E-CCEs #0, #2, #4, and #6). An example of Distributed E-PDCCH is described here. In this case, the base station apparatus 3 notifies each mobile station apparatus 5 of a common bit map, and accordingly the plurality of mobile station apparatuses 5 are capable of using common mapping for rearrangement used for E-CCEs and E-CCEs (after rearrangement). The search space includes a common search space (CSS) monitored (for example, demodulated) by a plurality of mobile station apparatuses 5, and a UE specific search space (USS) monitored (for example, demodulated) by only a specific mobile station apparatus 5. In the example illustrated in FIG. 24, specific E-CCE numbers (for example, E-CCE numbers #0 to 7, or a start position of a common search space is E-CCE number #0) may be set to a common search space. Separately from this, each mobile station apparatus 5 may be notified of a UE specific search space.

FIG. 27 illustrates an example in which regions are mapped to E-CCEs from a viewpoint of the mobile station apparatus 5. The correspondence between E-CCEs and regions illustrated in FIG. 27 is completely the same as that in FIG. 26. Here, one E-CCE is made up of two regions as in the cases of FIGS. 21 and 22. FIG. 25 also illustrates an example of the configuration of Distributed E-PDCCH. First, the mobile station apparatus 5 is notified of, by the base station apparatus 3, a bit map using RRC (Radio Resource Control) signaling. Here, a bit map may indicate a PRB pair to which a second PDCCH is possibly mapped, and the number of resources of E-CCEs and the number of resources of regions at the time of mapping of the E-CCEs and regions. A search space (SS) indicating an E-CCE to which a downlink control channel is possibly assigned, a signal generated from DCI addressed to the mobile station apparatus 5 being mapped to the downlink control channel, is possibly reported separately. The mobile station apparatus 3 extracts regions on the basis of the reported bit map. In the example illustrated in FIG. 27, for example, four regions are assigned to a PRB pair 2702, and the individual assigned regions are #0, #1, #2, and 3. More specifically, regions #0 to 15 associated with PRB pairs 2702, 2703, 2705, and 2706 are extracted. Subsequently, the regions #0 to #15 are associated with the rearranged sub E-CCEs #0 to #15 on the basis of the order illustrated in FIG. 27 (for example, the region 1 is associated with the sub E-CCE #4, and the region 2 is associated with the sub E-CCE #3). After that, the rearranged sub E-CCEs are rearranged to sub E-CCEs. Further, the sub E-CCEs are coupled to the E-CCEs (for example, the sub E-CCEs #0 and #1 are coupled to the E-CCE #0). In accordance with this procedure, the mobile station apparatus 3 rearranges E-CCEs using the received signal and bit map, and demodulates a second PDCCH. The search space includes a common search space (CSS) monitored (for example, demodulated) by a plurality of mobile station apparatuses 5, and a UE specific search space (USS) monitored (for example, demodulated) by a specific mobile station apparatus 5. In the examples illustrated in FIGS. 26 and 27, specific E-CCE numbers (for example, E-CCE numbers #0 to 7, or a start position of a common search space is E-CCE number #0) may be set to a common search space. Separately from this, each mobile station apparatus 5 may be notified of a UE specific search space.

Figure 28:
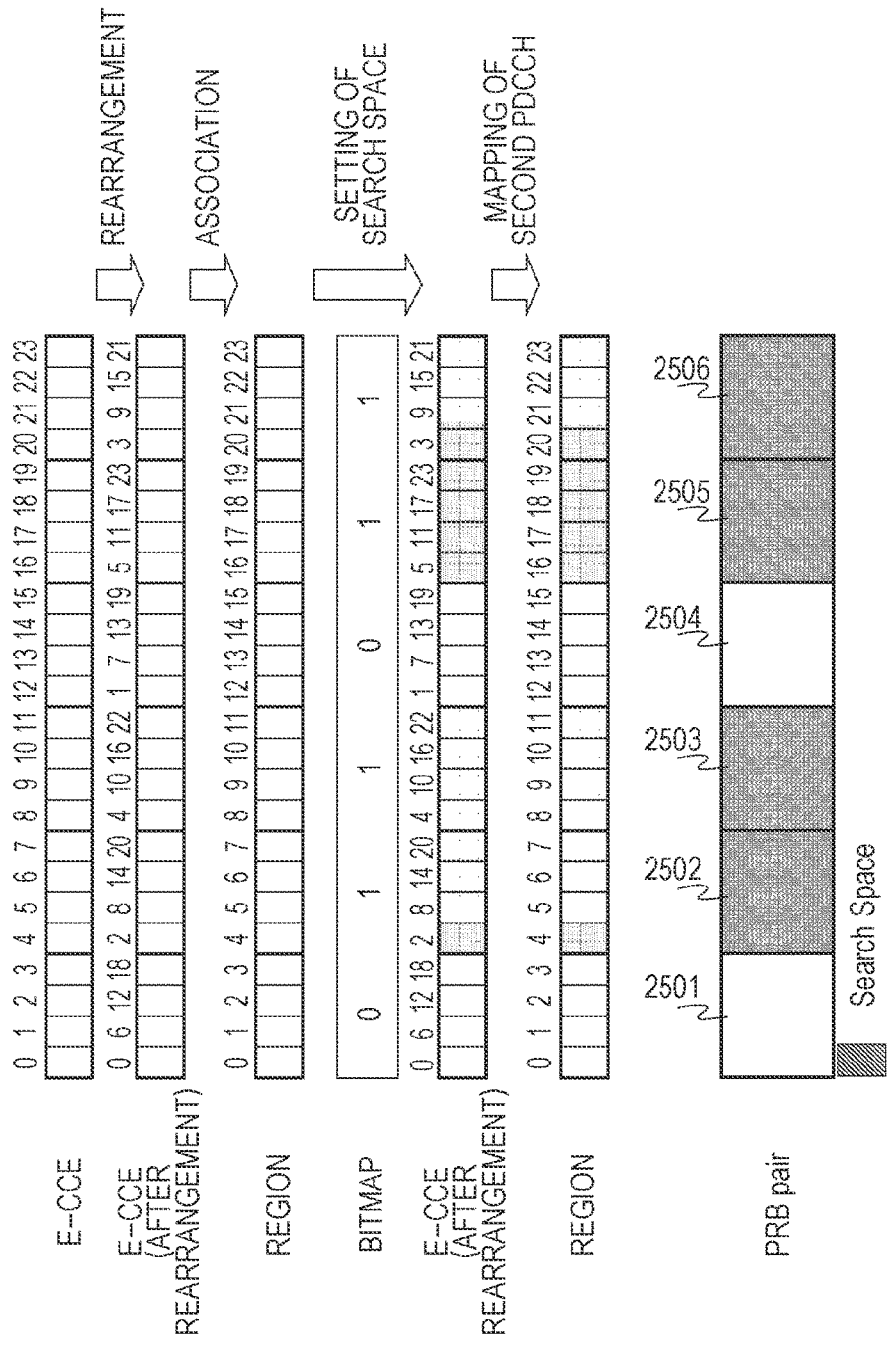
FIG. 28 is a diagram illustrating an example of the configuration of E-CCEs, regions, a bitmap, PRB pairs, and Distributed E-PDCCH (the base station apparatus side).

FIG. 28 illustrates another example in which E-CCEs are mapped to regions. Here, one E-CCE is made up of one region as in the case of FIG. 23, but one E-CCE may be made up of two regions as in the cases of FIGS. 21 and 22. FIG. 28 also illustrates an example of the configuration of Distributed E-PDCCH. First, the base station apparatus 3 notifies each mobile station apparatus 5 of a bit map using RRC (Radio Resource Control) signaling. Here, a bit map indicates a PRB pair to which a second PDCCH is possibly mapped, and a search space (SS) indicating an E-CCE (or region) to which DCI addressed to the mobile station apparatus 5 is possibly assigned. The number of resources of E-CCEs and the number of resources of regions at the time of mapping of the E-CCEs and regions are independent of the bit map, and is determined by, for example, a system bandwidth (in FIG. 28, the system bandwidth corresponds to 6 RBs (resource blocks) and it is assumed that each PRB pair is associated with four E-CCEs, and 24 E-CCEs are assumed). First, the base station apparatus 3 and the mobile station apparatus 5 set the number of E-CCEs on the basis of the system bandwidth. Subsequently, the base station apparatus 3 and the mobile station apparatus 5 rearrange the E-CCEs to generate rearranged E-CCEs. Here, the rearranged E-CCEs are associated with regions. In FIG. 28, the bit map is associated with the regions, and indicates regions to which a second PDCCH including DCI addressed to the mobile station apparatus 5 is possibly assigned. As a result of associating the regions indicated by the bit map with the E-CCEs (after rearrangement), the E-CCEs included in the search space become clear (the shaded part included in the E-CCEs (after rearrangement) in FIG. 28). On the other hand, there is a possibility that a second PDCCH is assigned to the corresponding regions (the shaded part included in the regions in FIG. 28). For example, in FIG. 28, four regions are assigned to a PRB pair 2802, and the individual regions are associated with E-CCEs #2, #8, #14, and #20. Likewise, PRB pairs 2803, 2805, and 2606 are assigned to the mobile station apparatus 5 by the bit map, and the E-CCEs #2 to #5, #8 to #11, #14 to #17, and #20 to #23 correspond to the search space for the mobile station apparatus 5). In this case, the base station apparatus 3 notifies the individual mobile station apparatuses 5 of different bit maps, and thereby different search spaces can be configured in the plurality of mobile station apparatuses 5. Here, one E-CCE is made up of one region as in the case of FIG. 23, but one E-CCE may be made up of two regions as in the cases of FIGS. 21 and 22. In this case, an E-CCE number (E-CCE index) is possibly associated with a sub E-CCE number (sub E-CCE index) (although not illustrated, for example, the E-CCE #0 is associated with sub E-CCEs #0 and #1, and the E-CCE #1 is associated with sub E-CCEs #2 and #3. Subsequently, the sub E-CCE indices are associated with regions as illustrated in FIG. 25. For example, the PRB pair 2502 is associated with sub E-CCEs #2, #8, #14, and #20.)

Examples in which the correspondence between E-CCEs and regions is set are illustrated in FIGS. 21, 22, and 23. Alternatively, the correspondence between E-CCEs and regions is always that illustrated in FIG. 23 (one E-CCE is associated with one region) or that illustrated in FIGS. 21 and 22 (one E-CCE is associated with two regions), whereas the E-CCE aggregation number constituting a second PDCCH may vary depending on a condition. For example, the E-CCE aggregation number may be associated with the value of CFI (Control Format Indicator), which is the number of OFDM symbols of a first PDCCH included in a DL PRB pair, DCI Format, the number of ports of CRS, or the like. For example, in the case of being associated with the value of CFI, two, four, eight, or sixteen E-CCEs may constitute one second PDCCH in a case where the value of CFI is 2 or 3, and one, two, four, or eight E-CCEs may constitute one second PDCCH in a case where the value of CFI is 0. In another example, in the case of DCI format 2, 2A, 2B, or 2C, two, four, eight, or sixteen E-CCEs may constitute a second PDCCH, and in the case of DCI format 0, 1A, 1C, 3, or 3A, one, two, four, or eight E-CCEs may constitute a second PDCCH. In another example, in a case where two or more ports (for example, antenna ports 0 and 1 or antenna ports 0, 1, 2, and 3) are configured for CRS, two, four, eight, or sixteen E-CCEs may constitute a second PDCCH, and in a case where one port or less (for example, only antenna port 0) is configured for CRS, one, two, four, or eight E-CCEs may constitute a second PDCCH. In a case where the correspondence between regions and E-CCEs is set in association with the above-described information, a threshold may be reported by the base station apparatus 3 using RRC (Radio Resource Control) signaling. For example, the E-CCE aggregation number constituting a second PDCCH is set by the base station apparatus 3 on the basis of the coding rate set for the second PDCCH and a bit number of DCI included in the second PDCCH. The aggregation made up of n E-CCEs is hereinafter referred to as "E-CCE aggregation n".

For example, the base station apparatus 3 configures a second PDCCH using one E-CCE (E-CCE aggregation 1), configures a second PDCCH using two E-CCEs (E-CCE aggregation 2), configures a second PDCCH using four E-CCEs (E-CCE aggregation 4), configures a second PDCCH using eight E-CCEs (E-CCE aggregation 8), or configures a second PDCCH using sixteen E-CCEs (E-CCE aggregation 16). For example, the base station apparatus 3 uses, for the mobile station apparatus 3 with good channel quality, an E-CCE aggregation number in which the number of E-CCEs constituting the second PDCCH is small, and uses, for the mobile station apparatus 3 with bad channel quality, an E-CCE aggregation number in which the number of E-CCEs constituting the second PDCCH is large. Further, for example, the base station apparatus 3 uses an E-CCE aggregation number in which the number of E-CCEs constituting the second PDCCH is small in the case of transmitting DCI of a small bit number, and uses an E-CCE aggregation number in which the number of E-CCEs constituting the second PDCCH is large in the case of transmitting DCI of a large bit number.

In another example, setting of the correspondence between E-CCEs and regions and setting of an E-CCE aggregation number constituting the second PDCCH may be used together. For example, in association with the value of CFI (Control Format Indicator), a DCI Format, the number of ports for CRS, or the like, the correspondence between E-CCEs and regions and the E-CCE aggregation number constituting the second PDCCH may be simultaneously set, or signaling (for example, RRC signaling) may be explicitly performed from the base station apparatus 3 to the mobile station apparatus 5. For example, in a case where one E-CCE is associated with one region (in the case of FIG. 23), the E-CCE aggregation number may be set to 1, 2, 4, or 8. In a case where one E-CCE is associated with two regions (in the cases of FIGS. 21 and 22), the E-CCE aggregation number may be set to 2, 4, 8, or 16. In another example, in a case where one E-CCE is associated with one region (in the case of FIG. 23), the E-CCE aggregation number may be set to 1, 2, 4, or 8. In a case where one E-CCE is associated with two regions (in the cases of FIGS. 21 and 22), the E-CCE aggregation number may be set to 2, 4, 8, or 12. In this way, E-CCE aggregation numbers are not required to have a relationship of multiples. At this time, as the number of second PDCCH candidates (E-PDCCH candidates) represented by shaded parts in FIG. 18, the number of second PDCCH candidates is independently set for each E-CCE aggregation number. The number of second PDCCH candidates may be set to a different value on the basis of setting of the correspondence between the E-CCEs and regions or setting of the E-CCE aggregation number constituting the second PDCCH. For example, in a case where one E-CCE is associated with one region (in the case of FIG. 23) and where the E-CCE aggregation number is set to 1, 2, 4, or 8, the number of second PDCCH candidates may be set to 4 in a case where E-CCE aggregation number=2. In a case where one E-CCE is associated with two regions (in the cases of FIGS. 21 and 22) and where the E-CCE aggregation number is set to 2, 4, 8, or 16, the number of second PDCCH candidates may be set to 6 in a case where E-CCE aggregation number=2. In this way, as a result of performing both setting of the correspondence between E-CCEs and regions and setting of the E-CCE aggregation number constituting the second PDCCH, the base station apparatus 3 is capable of controlling the quality of the second PDCCH more flexibly. That is, even in a situation where the number of CRS ports is variously set, the number of OFDM symbols can be operated while appropriately maintaining the quality of the second PDCCH, by appropriately setting the resources to be used for the second PDCCH using the above-described method.

Referring to FIGS. 24 to 27, in the second physical resource mapping, in the E-CCEs constituting one Distributed E-PDCCH, the Distributed E-PDCCH may be formed using E-CCEs whose positions in the individual DL PRB pairs (frequency positions) are different (for example, in FIG. 24, an E-PDCCH is made up of E-CCE #0 and E-CCE #1, and the leftmost region in the PRB pair 2402 and the leftmost region in the PRB pair 2405 are used, but the E-CCE #2 may use a region other than the leftmost region in the PRB pair 2405). For example, one Distributed E-PDCCH may be made up of the leftmost (the lowest in the frequency domain) region in a certain DL PRB pair, the second (the second lowest in the frequency) region from the left in a certain DL PRB pair, the third (the third lowest in the frequency) region from the left in a certain DL PRB pair, and the fourth (the fourth lowest in the frequency, the highest in the frequency region) region from the left in a certain DL PRB pair.

The present invention can also be applied to a case where one second PDCCH is made up of one or more DL PRBs. In other words, the present invention can also be applied to a case where one second PDCCH region is made up of a plurality of DL PRBs of only the first slot of a downlink subframe or a case where one second PDCCH region is made up of a plurality of DL PRBs of only the second slot of a downlink subframe. In a DL PRB pair configured in a second PDCCH region, all the resources except the first PDCCH and a downlink reference signal (downlink resource elements) are not used for a signal of a second PDCCH, and a null configuration may be adopted in which a signal is not mapped in some of the resources (downlink resource elements).

Basically, the first physical resource mapping can be applied in a second PDCCH region to which precoding processing is applied, and the second physical resource mapping can be applied in a second PDCCH region to which precoding processing is not applied. In the second physical resource mapping, one E-PDCCH is made up of noncontiguous resources in the frequency domain, and thus a frequency diversity effect can be obtained.

For the mobile station apparatus 5, one or more second PDCCH regions are configured by the base station apparatus 3. For example, for the mobile station apparatus 5, two second PDCCH regions, including a second PDCCH region to which the first physical resource mapping is applied and precoding processing is applied, and a second PDCCH region to which the second physical resource mapping is applied and precoding processing is not applied, are configured. For example, for the mobile station apparatus 5, only a second PDCCH region to which the second physical resource mapping is applied and precoding processing is not applied is configured. The mobile station apparatus 5 is specified (set, configured) to perform a process of detecting a second PDCCH in the second PDCCH region configured by the base station apparatus 3 (monitoring). Specification of monitoring of a second PDCCH may be automatically (implicitly) performed when a second PDCCH region is configured for the mobile station apparatus 5, or may be performed by signaling different from the signaling indicating the configuration of a second PDCCH region. The same second PDCCH region can be specified for a plurality of mobile station apparatuses 5 by the base station apparatus 3.

The information representing the configuration (specification, setting) of a second PDCCH region is transmitted and received between the base station apparatus 3 and the mobile station apparatus 5 before communication using a second PDCCH is started. For example, the information is transmitted and received using RRC (Radio Resource Control) signaling. Specifically, the mobile station apparatus 5 receives information representing the position (assignment) of a DL PRB pair of a second PDCCH region from the base station apparatus 3. Also, for individual second PDCCH regions, information representing the types of physical resource mapping (first physical resource mapping, second physical resource mapping) of the second PDCCHs is transmitted from the base station apparatus 3 to the mobile station apparatus 5. The information is not necessarily information that explicitly represents the types of physical resource mapping of second PDCCHs. Different information may be transmitted from the base station apparatus 3 to the mobile station apparatus 5, and the types of physical resource mapping of the second PDCCHs may be implicitly recognized by the mobile station apparatus 5 on the basis of the information. For example, information representing a transmission method for a second PDCCH in each second PDCCH region is transmitted from the base station apparatus 3 to the mobile station apparatus 5. In a case where a transmission method to which precoding processing is applied is presented, the mobile station apparatus 5 determines that the physical resource mapping in the second PDCCH region is the first physical resource mapping. In a case where a transmission method to which precoding processing is not applied is presented, the mobile station apparatus 5 determines that the physical resource mapping in the second PDCCH region is the second physical resource mapping. Alternatively, the physical resource mapping of any of second PDCCHs may be set as default in the second PDCCH region, and, only in a case where physical resource mapping different from the setting is to be used, information representing the situation may be transmitted from the base station apparatus 3 to the mobile station apparatus 5. The mobile station apparatus 5 demodulates a signal of a second PDCCH by using a UE-specific RS received in the second PDCCH region configured by the base station apparatus 3, and performs a process of detecting a second PDCCH addressed to the mobile station apparatus 5. For example, the mobile station apparatus 5 demodulates the signal of the second PDCCH by using a UE-specific RS in a DL PRB pair to which the resource performing demodulation belongs.

For the mobile station apparatus 5, candidates (a combination of candidates) (candidate set) of an E-CCE aggregation number for Localized E-PDCCH may be set (configured) by the base station apparatus 3 for the second PDCCH region to which the first physical resource mapping is applied. For example, for a certain mobile station apparatus 5, E-CCE aggregation 1, E-CCE aggregation 2, and E-CCE aggregation 4 may be configured as candidates of an E-CCE aggregation number for the Localized E-PDCCH for the second PDCCH region to which the first physical resource mapping is applied. For example, for a certain mobile station apparatus 5, E-CCE aggregation 2 and E-CCE aggregation 4 may be configured as candidates of an E-CCE aggregation number for the Localized E-PDCCH for the second PDCCH region to which the first physical resource mapping is applied.

Regarding the correspondence between individual E-CCEs in a DL PRB pair and the antenna ports (transmit antennas) corresponding to the individual E-CCEs, the individual E-CCEs in the DL PRB pair are transmitted from different antenna ports.

In the second PDCCH region in which a Localized E-PDCCH is mapped, as illustrated in FIG. 20, UE-specific RSs (D1 and D2) for four transmit antennas (antenna port 7, antenna port 8, antenna port 9, and antenna port 10) can be mapped. A plurality of combinations are used as a combination of individual E-CCEs in a DL PRB pair and corresponding antenna ports. In individual combinations, the antenna ports corresponding to individual E-CCEs in a DL PRB pair are different. Signals of individual E-CCEs in a DL PRB pair are transmitted from the corresponding antenna ports. The antenna ports used for the signals of E-CCEs are common to the antenna ports used for transmitting UE-specific RSs. For example, four types of combinations (first combination, second combination, third combination, and fourth combination; can be used as a combination of individual E-CCEs in a DL PRB pair and the corresponding antenna ports. In the first combination, in FIG. 20, a signal of the second PDCCH of E-CCE n is transmitted from the antenna port 7, a signal of the second PDCCH of E-CCE n+1 is transmitted from the antenna port 8, a signal of the second PDCCH of E-CCE n+2 is transmitted from the antenna port 9, and a signal of the second PDCCH of E-CCE n+3 is transmitted from the antenna port 10. In the second combination, in FIG. 20, a signal of the second PDCCH of E-CCE n is transmitted from the antenna port 8, a signal of the second PDCCH of E-CCE n+1 is transmitted from the antenna port 9, a signal of the second PDCCH of E-CCE n+2 is transmitted from the antenna port 10, and a signal of the second PDCCH of E-CCE n+3 is transmitted from the antenna port 11. In the third combination, in FIG. 20, a signal of the second PDCCH of E-CCE n is transmitted from the antenna port 9, a signal of the second PDCCH of E-CCE n+1 is transmitted from the antenna port 10, a signal of the second PDCCH of E-CCE n+2 is transmitted from the antenna port 7, and a signal of the second PDCCH of E-CCE n+3 is transmitted from the antenna port 8. In the fourth combination, in FIG. 20, a signal of the second PDCCH of E-CCE n is transmitted from the antenna port 10, a signal of the second PDCCH of E-CCE n+1 is transmitted from the antenna port 7, a signal of the second PDCCH of E-CCE n+2 is transmitted from the antenna port 8, and a signal of the second PDCCH of E-CCE n+3 is transmitted from the antenna port 9.

Any one of the combinations of individual E-CCEs in a DL PRB pair and corresponding antenna ports is set for each mobile station apparatus 5 by the base station apparatus 3. For example, the setting is performed using RRC signaling. The base station apparatus 3 transmits signals of the individual E-CCEs in the DL PRB pair from the corresponding transmit antennas. That is, the base station apparatus controls the antenna ports used for transmitting the signals of the individual E-CCEs on the basis of the mobile station apparatus 5 to which the signals of individual E-CCEs in the DL PRB pair are to be transmitted. The mobile station apparatus 5 demodulates the signals of the individual E-CCEs in the DL PRB pair by using UE-specific RSs transmitted from the corresponding transmit antennas.

For example, in a case where the base station apparatus 3 determines that the current state is suitable for MU-MIMO, the base station apparatus 3 sets, regarding combinations of individual E-CCEs in a DL PRB pair and corresponding antenna ports, different combinations to the second PDCCH regions for different mobile station apparatuses 5. The state suitable for MU-MIMO is, for example, a state in which the base station apparatus 3 can apply beamforming (precoding processing) to signals addressed to different mobile station apparatuses 5 without causing large interference, and there is a request for transmitting signals of the second PDCCHs to the plurality of mobile station apparatuses 5 that are geographically separated. For example, it is difficult to apply beamforming to signals addressed to a plurality of mobile station apparatuses 5 without causing large interference if the plurality of mobile station apparatuses 5 exist at geographically close positions. Thus, the base station apparatus 3 does not apply MU-MIMO to signals of the second PDCCHs addressed to such mobile station apparatuses 5. The beamforming (precoding) optimal to the performance of transmit/receive signals is common to the plurality of mobile station apparatuses 5 existing at geographically close positions. For example, in a case where the base station apparatus 3 determines that the current state is unsuitable for MU-MIMO, the base station apparatus 3 sets, regarding combinations of individual E-CCEs in a DL PRB pair and corresponding antenna ports, the same (common) combination to the second PDCCH regions for different mobile station apparatuses 5.

A description will be given of processing that is performed in a case where the base station apparatus 3 has determined that the current state is suitable for MU-MIMO. For example, a description will be given of a case where two mobile station apparatuses 5 exist at different positions (for example, area A and area B) in the area covered by the base station apparatus 3. For convenience of description, the mobile station apparatus 5 located in area A is referred to as a mobile station apparatus 5A-1, and the mobile station apparatus 5 located in area B is referred to as a mobile station apparatus 5B-1. The base station apparatus 3 sets the first combination for the second PDCCH region of the mobile station apparatus 5A-1, regarding combinations of individual E-CCEs in a DL PRB pair and corresponding antenna ports. The base station apparatus 3 sets the third combination for the second PDCCH region of the mobile station apparatus 5B-1, regarding combinations of individual E-CCEs in a DL PRB pair and corresponding antenna ports.

For example, the base station apparatus 3 transmits a signal of the second PDCCH to the mobile station apparatus 5A-1 from the antenna port 7 using the resource of the E-CCE n, and transmits a signal of the second PDCCH to the mobile station apparatus 5B-1 from the antenna port 9 using the resource of the E-CCE n. Here, the base station apparatus 3 performs precoding processing suitable for the mobile station apparatus 5A-1 on the signal of the second PDCCH to be transmitted from the antenna port 7 and a UE-specific RS, and performs precoding processing suitable for the mobile station apparatus 5B-1 on the signal of the second PDCCH to be transmitted from the antenna port 9 and a UE-specific RS. The mobile station apparatus 5A-1 demodulates the signal of the second PDCCH in the resource of the E-CCE n by using the UE-specific RS corresponding to the antenna port 7. The mobile station apparatus 5B-1 demodulates the signal of the second PDCCH in the resource of the E-CCE n by using the UE-specific RS corresponding to the antenna port 9. Here, the mobile station apparatus 5A-1 and the mobile station apparatus 5B-1 are sufficiently geographically separated from each other, and thus the base station apparatus 3 can apply beamforming (precoding processing) to the signals of the second PDCCHs for both the mobile station apparatuses 5 without causing large interference. MU-MIMO is realized in the above-described manner.

For example, the base station apparatus 3 transmits a signal of the second PDCCH to the mobile station apparatus 5A-1 from the antenna port 7 using the resource of the E-CCE n, transmits a signal of the second PDCCH to the mobile station apparatus 5A-1 from the antenna port 8 using the resource of the E-CCE n+1, transmits a signal of the second PDCCH to the mobile station apparatus 5B-1 from the antenna port 9 using the resource of the E-CCE n, and transmits a signal of the second PDCCH to the mobile station apparatus 5B-1 from the antenna port 10 using the resource of the E-CCE n+1. Here, the base station apparatus 3 performs precoding processing suitable for the mobile station apparatus 5A-1 on the signals of the second PDCCHs to be transmitted from the antenna port 7 and the antenna port 8 and UE-specific RSs, and performs precoding processing suitable for the mobile station apparatus 5B-1 on the signals of the second PDCCHs to be transmitted from the antenna port 9 and the antenna port 10 and UE-specific RSs. The mobile station apparatus 5A-1 demodulates the signal of the second PDCCH in the resource of the E-CCE n by using the UE-specific RS corresponding to the antenna port 7, and demodulates the signal of the second PDCCH in the resource of the E-CCE n+1 by using the UE-specific RS corresponding to the antenna port 8. The mobile station apparatus 5B-1 demodulates the signal of the second PDCCH in the resource of the E-CCE n by using the UE-specific RS corresponding to the antenna port 9, and demodulates the signal of the second PDCCH in the resource of the E-CCE n+1 by using the UE-specific RS corresponding to the antenna port 10. Here, the mobile station apparatus 5A-1 and the mobile station apparatus 5B-1 are sufficiently geographically separated from each other, and thus the base station apparatus 3 can apply beamforming (precoding processing) to the signals of the second PDCCHs for both the mobile station apparatuses 5 without causing large interference. MU-MIMO is realized in the above-described manner.

A description will be given of a case where a mobile station apparatus 5 (mobile station apparatus 5A-2) different from the mobile station apparatus 5A-1 further exists in area A and a mobile station apparatus 5 (mobile station apparatus 5B-2) different from the mobile station apparatus 5B-1 further exists in area B, for example. The base station apparatus 3 sets the first combination for the second PDCCH region of the mobile station apparatus 5A-1, regarding combinations of individual E-CCEs in a DL PRB pair and corresponding antenna ports. The base station apparatus 3 sets the third combination for the second PDCCH region of the mobile station apparatus 5A-2, regarding combinations of individual E-CCEs in a DL PRB pair and corresponding antenna ports. The base station apparatus 3 sets the third combination for the second PDCCH region of the mobile station apparatus 5B-1, regarding combinations of individual E-CCEs in a DL PRB pair and corresponding antenna ports. The base station apparatus 3 sets the first combination for the second PDCCH region of the mobile station apparatus 5B-2, regarding combinations of individual E-CCEs in a DL PRB pair and corresponding antenna ports.

For example, the base station apparatus 3 transmits a signal of the second PDCCH to the mobile station apparatus 5A-1 from the antenna port 7 using the resource of the E-CCE n, and transmits a signal of the second PDCCH to the mobile station apparatus 5B-1 from the antenna port 9 using the resource of the E-CCE n. The base station apparatus 3 transmits a signal of the second PDCCH to the mobile station apparatus 5A-2 from the antenna port 8 using the resource of the E-CCE n+3, and transmits a signal of the second PDCCH to the mobile station apparatus 5B-2 from the antenna port 10 using the resource of the E-CCE n+3. Here, the base station apparatus 3 performs precoding processing suitable for the mobile station apparatus 5A-1 on the signal of the second PDCCH to be transmitted from the antenna port 7 and a UE-specific RS, performs precoding processing suitable for the mobile station apparatus 5A-2 on the signal of the second PDCCH to be transmitted from the antenna port 8 and a UE-specific RS, performs precoding processing suitable for the mobile station apparatus 5B-1 on the signal of the second PDCCH to be transmitted from the antenna port 9 and a UE-specific RS, and performs precoding processing suitable for the mobile station apparatus 5B-2 on the signal of the second PDCCH to be transmitted from the antenna port 10 and a UE-specific RS. The mobile station apparatus 5A-1 demodulates the signal of the second PDCCH in the resource of the E-CCE n by using the UE-specific RS corresponding to the antenna port 7. The mobile station apparatus 5A-2 demodulates the signal of the second PDCCH in the resource of the E-CCE n+3 by using the UE-specific RS corresponding to the antenna port 8. The mobile station apparatus 5B-1 demodulates the signal of the second PDCCH in the resource of the E-CCE n by using the UE-specific RS corresponding to the antenna port 9. The mobile station apparatus 5B-2 demodulates the signal of the second PDCCH in the resource of the E-CCE n+3 by using the UE-specific RS corresponding to antenna port 10. Here, the mobile station apparatus 5A-1 and the mobile station apparatus 5B-1 are sufficiently geographically separated from each other, and thus the base station apparatus 3 can apply beamforming (precoding processing) to the signals of the second PDCCHs for both the mobile station apparatuses 5 without causing large interference. Also, the mobile station apparatus 5A-2 and the mobile station apparatus 5B-2 are sufficiently geographically separated from each other, and thus the base station apparatus 3 can apply beamforming (precoding processing) to the signals of the second PDCCHs for both the mobile station apparatuses 5 without causing large interference. MU-MIMO is realized in the above-described manner.

For example, the base station apparatus 3 transmits a signal of the second PDCCH to the mobile station apparatus 5A-1 from the antenna port 7 using the resource of the E-CCE n, transmits a signal of the second PDCCH to the mobile station apparatus 5A-1 from the antenna port 8 using the resource of the E-CCE n+1, transmits a signal of the second PDCCH to the mobile station apparatus 5A-2 from the antenna port 7 using the resource of the E-CCE n+2, transmits a signal of the second PDCCH to the mobile station apparatus 5A-2 from the antenna port 8 using the resource of the E-CCE n+3, transmits a signal of the second PDCCH to the mobile station apparatus 5B-1 from the antenna port 9 using the resource of the E-CCE n, transmits a signal of the second PDCCH to the mobile station apparatus 5B-1 from the antenna port 10 using the resource of the E-CCE n+1, transmits a signal of the second PDCCH to the mobile station apparatus 5B-2 from the antenna port 9 using the resource of the E-CCE n+2, and transmits a signal of the second PDCCH to the mobile station apparatus 5B-2 from the antenna port 10 using the resource of the E-CCE n+3. Here, the base station apparatus 3 performs precoding processing suitable for the mobile station apparatus 5A-1 and the mobile station apparatus 5A-2 on the signals of the second PDCCHs to be transmitted from the antenna port 7 and the antenna port 8 and UE-specific RSs, and performs precoding processing suitable for the mobile station apparatus 5B-1 and the mobile station apparatus 5B-2 on the signals of the second PDCCHs to be transmitted from the antenna port 9 and the antenna port 10 and UE-specific RSs. The mobile station apparatus 5A-1 demodulates the signal of the second PDCCH in the resource of the E-CCE n by using the UE-specific RS corresponding to the antenna port 7, and demodulates the signal of the second PDCCH in the resource of the E-CCE n+1 by using the UE-specific RS corresponding to the antenna port 8. The mobile station apparatus 5A-2 demodulates the signal of the second PDCCH in the resource of the E-CCE n+2 by using the UE-specific RS corresponding to the antenna port 7, and demodulates the signal of the second PDCCH in the resource of the E-CCE n+3 by using the UE-specific RS corresponding to the antenna port 8. The mobile station apparatus 5B-1 demodulates the signal of the second PDCCH in the resource of the E-CCE n by using the UE-specific RS corresponding to the antenna port 9, and demodulates the signal of the second PDCCH in the resource of the E-CCE n+1 by using the UE-specific RS corresponding to the antenna port 10. The mobile station apparatus 5B-2 demodulates the signal of the second PDCCH in the resource of the E-CCE n+2 by using the UE-specific RS corresponding to the antenna port 9, and demodulates the signal of the second PDCCH in the resource of the E-CCE n+3 by using the UE-specific RS corresponding to the antenna port 10. Here, the mobile station apparatus 5A-1 and the mobile station apparatus 5A-2 are sufficiently geographically separated from the mobile station apparatus 5B-1 and the mobile station apparatus 5B-2, and thus the base station apparatus 3 can apply beamforming (precoding processing) to the signals of the second PDCCHs for the mobile station apparatuses 5 located in the different areas without causing large interference. Further, the mobile station apparatus 5A-1 and the mobile station apparatus 5A-2 are sufficiently geographically close to each other (in area A), and thus suitable beamforming (precoding processing) is common thereto. Thus, the base station apparatus 3 can efficiently transmit the signals of the second PDCCHs to both the mobile station apparatus 5A-1 and the mobile station apparatus 5A-2 using the same antenna ports (antenna port 7 and antenna port 8). Also, the mobile station apparatus 5B-1 and the mobile station apparatus 5B-2 are sufficiently geographically close to each other (in area 3B), and thus suitable beamforming (precoding processing) is common thereto. Thus, the base station apparatus 3 can efficiently transmit the signals of the second PDCCHs to both the mobile station apparatus 5B-1 and the mobile station apparatus 5B-2 using the same antenna ports (antenna port 9 and antenna port 10). MU-MIMO is realized in the above-described manner.

A description will be given of processing that is performed in a case where the base station apparatus 3 has determined that the current state is not suitable for MU-MIMO. For example, a description will be given of a case where four mobile station apparatuses 5 exist at different positions (for example, area C, area D, area E, and area F) within the area covered by the base station apparatus 3. For convenience of description, the mobile station apparatus 5 located in area C is referred to as a mobile station apparatus 5C-1, the mobile station apparatus 5 located in area D is referred to as a mobile station apparatus 5D-1, the mobile station apparatus 5 located in area E is referred to as a mobile station apparatus 5E-1, and the mobile station apparatus 5 located in area F is referred to as a mobile station apparatus 5F-1. Here, a description will be given of a case where area C, area D, area E, and area F are not sufficiently separated from one another, it is difficult to apply beamforming (precoding processing) to signals of the second PDCCHs for the mobile station apparatuses 5 located in the individual areas without causing large interference, and it is difficult to apply MU-MIMO. Also, a description will be given of a case where area C, area D, area E, and area F are not very close to one another, and beamforming (precoding processing) suitable for the signals of the second PDCCHs for the mobile station apparatuses 5 located in the individual areas varies. The base station apparatus 3 sets the first combination to the second PDCCH region for the mobile station apparatus 5C-1, the second PDCCH region for the mobile station apparatus 5D-1, the second PDCCH region for the mobile station apparatus 5E-1, and the second PDCCH region for the mobile station apparatus 5F-1, regarding combinations of individual E-CCEs in a DL PRB pair and corresponding antenna ports.

For example, the base station apparatus 3 transmits a signal of the second PDCCH to the mobile station apparatus 5C-1 from the antenna port 7 using the resource of the E-CCE n, transmits a signal of the second PDCCH to the mobile station apparatus 5D-1 from the antenna port 8 using the resource of the E-CCE n+1, transmits a signal of the second PDCCH to the mobile station apparatus 5E-1 from the antenna port 9 using the resource of the E-CCE n+2, and transmits a signal of the second PDCCH to the mobile station apparatus 5F-1 from the antenna port 10 using the resource of the E-CCE n. Here, the base station apparatus 3 performs precoding processing suitable for the mobile station apparatus 5C-1 on the signal of the second PDCCH to be transmitted from the antenna port 7 and a UE-specific RS, performs precoding processing suitable for the mobile station apparatus 5D-1 on the signal of the second PDCCH to be transmitted from the antenna port 8 and a UE-specific RS, performs precoding processing suitable for the mobile station apparatus 5E-1 on the signal of the second PDCCH to be transmitted from the antenna port 9 and a UE-specific RS, and performs precoding processing suitable for the mobile station apparatus 5F-1 on the signal of the second PDCCH to be transmitted from the antenna port 10 and a UE-specific RS. The mobile station apparatus 5C-1 demodulates the signal of the second PDCCH in the resource of the E-CCE n by using the UE-specific RS corresponding to the antenna port 7. The mobile station apparatus 5D-1 demodulates the signal of the second PDCCH in the resource of the E-CCE n+1 by using the UE-specific RS corresponding to the antenna port 8. The mobile station apparatus 5E-1 demodulates the signal of the second PDCCH in the resource of the E-CCE n+2 by using the UE-specific RS corresponding to the antenna port 9. The mobile station apparatus 5F-1 demodulates the signal of the second PDCCH in the resource of the E-CCE n+3 by using the UE-specific RS corresponding to the antenna port 10. As described above, the base station apparatus 3 can independently perform suitable beamforming (precoding processing) on the individual signals of the second PDCCHs for the mobile station apparatuses 5 located in the individual areas. Accordingly, requirements can be fulfilled regarding the performance of the signals of the second PDCCHs for the mobile station apparatuses 5 located in the individual areas.

In a case where area C, area D, area E, and area F are separated from one another, beamforming (precoding processing) can be applied to the signals of the second PDCCHs for the mobile station apparatuses 5 located in the individual areas without causing large interference, and MU-MIMO can be applied, the base station apparatus 3 may set the first combination for the second PDCCH region of the mobile station apparatus 5C-1, the second combination for second PDCCH region of the mobile station apparatus 5D-1, the third combination for the second PDCCH region of the mobile station apparatus 5E-1, and the fourth combination for the second PDCCH region of the mobile station apparatus 5F-1, regarding combinations of individual E-CCEs in a DL PRB pair and corresponding antenna ports.

Hereinafter, a control signal mapped to a second PDCCH will be described. A control signal mapped to a second PDCCH is processed for each piece of control information regarding one mobile station apparatus 5, and can be subjected to scramble processing, modulation processing, layer mapping processing, preceding processing, and so forth, like a data signal. Here, layer mapping processing means part of MIMO signal processing, which is performed in a case where multi-antenna transmission is applied to a second PDCCH. For example, layer mapping processing is performed on the second PDCCH to which precoding processing is applied, and the second PDCCH to which precoding processing is not applied but transmission diversity is applied. Further, a control signal mapped to a second PDCCH can be subjected to common precoding processing together with a UE-specific RS. At this time, it is preferable that precoding processing be performed with favorable preceding weights in units of mobile station apparatuses 5.

A UE-specific RS is multiplexed, by the base station apparatus 3, with a DL PRB pair to which a second PDCCH is mapped. The mobile station apparatus 5 demodulates the signal of the second PDCCH by using the UE-specific RS. For the UE-specific RS used to demodulate the second PDCCH, different combinations can be set in individual second PDCCH regions regarding combinations of individual E-CCEs in a DL PRB pair and corresponding antenna ports. That is, different combinations can be set for individual mobile station apparatuses 5 regarding combinations of individual E-CCEs in the DL PRB pair in the second PDCCH region and corresponding antenna ports. In the second PDCCH region to which the first physical resource mapping is applied, UE-specific RSs for a plurality of transmit antennas (antenna port 7, antenna port 8, antenna port 9, and antenna port 10) are mapped. In the second PDCCH region to which the second physical resource mapping is applied, a UE-specific RS for one transmit antenna (antenna port 7) is mapped. In the second PDCCH region to which the second physical resource mapping is applied, in a case where transmission diversity such as SFBC (Space Frequency Block Coding) is applied to Distributed E-PDCCH, UE-specific RSs for two transmit antennas (antenna port 7 and antenna port 8) may be mapped.

In the second PDCCH region to which the first physical resource mapping is applied, individual E-CCEs in a DL PRB pair correspond to different transmit antennas, and signals are transmitted from the corresponding transmit antennas. In the second PDCCH region to which the second physical resource mapping is applied, individual E-CCEs in a DL PRB pair correspond to the same (common) transmit antennas, and signals are transmitted from the corresponding transmit antennas.

For example, in the second PDCCH region to which the first physical resource mapping is applied, the first combination, the second combination, the third combination, or the fourth combination can be used regarding combinations of individual E-CCEs in a DL PRB pair and corresponding antenna ports. That is, any one of the plurality of combinations is set (configured) for each mobile station apparatus 5. In the first combination, in FIG. 20, a signal of the second PDCCH of the E-CCE n is transmitted from the antenna port 7, a signal of the second PDCCH of the E-CCE n+1 is transmitted from the antenna port 8, a signal of the second PDCCH of the E-CCE n+2 is transmitted from the antenna port 9, and a signal of the second PDCCH of the E-CCE n+3 is transmitted from the antenna port 10. In the second combination, in FIG. 20, a signal of the second PDCCH of the E-CCE n is transmitted from the antenna port 8, a signal of the second PDCCH of the E-CCE n+1 is transmitted from the antenna port 9, a signal of the second PDCCH of the E-CCE n+2 is transmitted from the antenna port 10, and a signal of the second PDCCH of the E-CCE n+3 is transmitted from the antenna port 11. In the third combination, in FIG. 20, a signal of the second PDCCH of the E-CCE n is transmitted from the antenna port 9, a signal of the second PDCCH of the E-CCE n+1 is transmitted from the antenna port 10, a signal of the second PDCCH of the E-CCE n+2 is transmitted from the antenna port 7, and a signal of the second PDCCH of the E-CCE n+3 is transmitted from the antenna port 8. In the fourth combination, in FIG. 20, a signal of the second PDCCH of E-CCE n is transmitted from the antenna port 10, a signal of the second PDCCH of the E-CCE n+1 is transmitted from the antenna port 7, a signal of the second PDCCH of the E-CCE n+2 is transmitted from the antenna port 8, and a signal of the second PDCCH of the E-CCE n+3 is transmitted from the antenna port 9.

Here, the relationship among the first combination, the second combination, the third combination, and the fourth combination may be referred to as a relationship in which the antenna ports corresponding to individual E-CCEs in a DL PRB pair are shifted. A description will be given of the relationship between the first combination and the third combination. A plurality of E-CCEs in a DL PRB pair can be grouped into a plurality of groups (sets), for example, two groups (group A and group B). The relationship between the first combination and the third combination may be referred to as a relationship in which a set of antenna ports corresponding to individual E-CCEs in a group is switched between groups. More specifically, the antenna port set (antenna port 7 and antenna port 8) corresponding to group A of the first combination (E-CCE n and E-CCE n+1 in FIG. 20) is the same as the antenna port set (antenna port 7 and antenna port 8) corresponding to group B of the third combination (E-CCE n+2 and E-CCE n+3 in FIG. 20), and the antenna port set (antenna port 9 and antenna port 10) corresponding to group B of the first combination (E-CCE n+2 and E-CCE n+3 in FIG. 20) is the same as the antenna port set (antenna port 9 and antenna port 10) corresponding to group A of the third combination (E-CCE n and E-CCE n+1 in FIG. 20). The relationship between the second combination and the fourth combination is the same as the relationship between the first combination and the third combination.

A predetermined scramble ID may be used to generate a UE-specific RS to be mapped in a second PDCCH region. For example, as a scramble ID used for a UE-specific RS, a value of any one of 0 to 3 may be specified.

Figure 29:
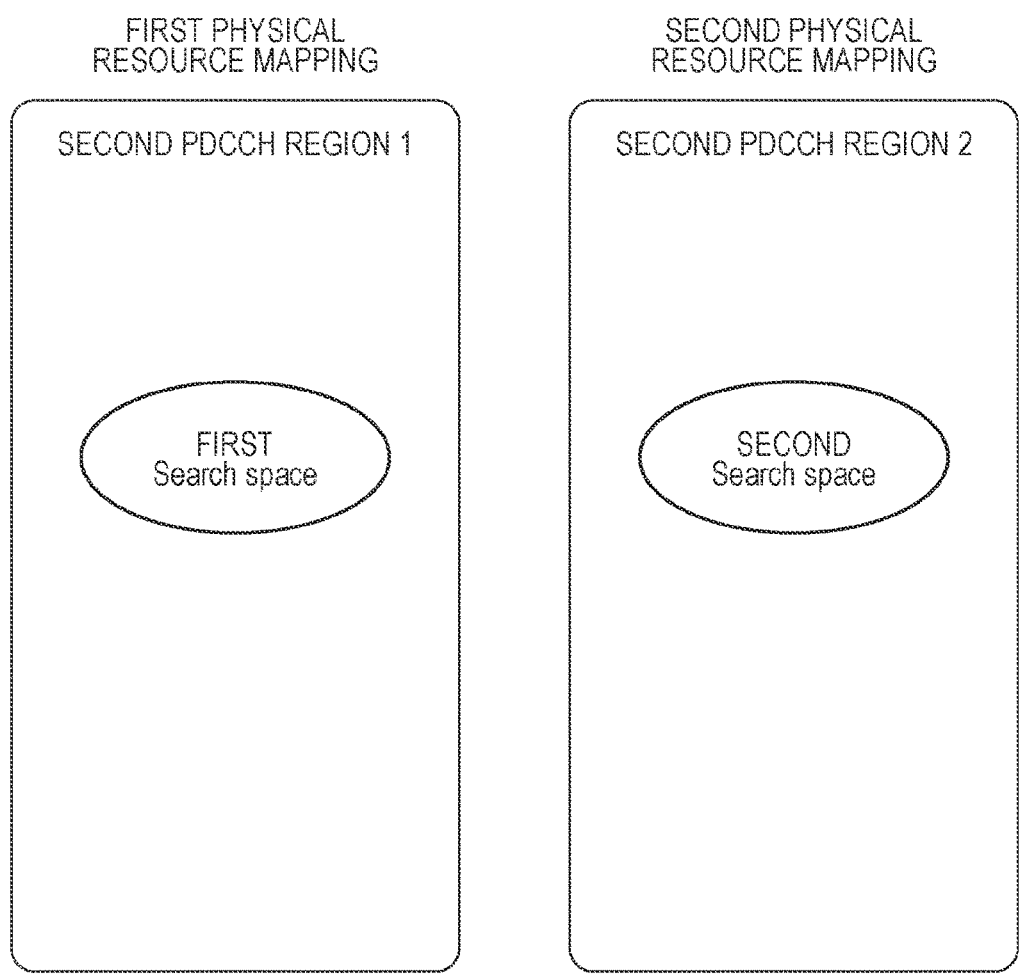
FIG. 29 is a diagram illustrating monitoring of second PDCCHs in the mobile station apparatus 5 according to the embodiment of the present invention.

FIG. 29 is a diagram illustrating monitoring of second PDCCHs of the mobile station apparatus 5 according to the embodiment of the present invention. A plurality of second PDCCH regions (second PDCCH region 1 and second PDCCH region 2) are configured for the mobile station apparatus 5. For the mobile station apparatus 5, a search space is configured in each of the second PDCCH regions. The search space means a logical region in which the mobile station apparatus 5 performs decoding and detection of a second PDCCH in a second PDCCH region. The search space is made up of a plurality of second PDCCH candidates. The second PDCCH candidates are targets on which the mobile station apparatus 5 performs decoding and detection of a second PDCCH. For each E-CCE aggregation number, different second PDCCH candidates are made up of different E-CCEs (including one E-CCE and a plurality of E-CCEs). The E-CCEs constituting a plurality of second PDCCH candidates of a search space that is configured in the second PDCCH region to which the first physical resource mapping is applied are a plurality of E-CCEs made up of contiguous regions. The E-CCEs constituting a plurality of second PDCCH candidates of a search space that is configured in the second PDCCH region to which the second physical resource mapping is applied are a plurality of E-CCEs made up of noncontiguous regions. The first E-CCE number used for a search space in the second PDCCH region is set for each mobile station apparatus 5. For example, with a random function using an identifier assigned to the mobile station apparatus 5 (mobile station identifier), the first E-CCE number used for a search space is set. For example, the base station apparatus 3 notifies the mobile station apparatus 5 of the first E-CCE number used for a search space by using RRC signaling.

A plurality of search spaces (first search space and second search space) are configured for the mobile station apparatus 5 for which a plurality of second PDCCH regions are configured. The first physical resource mapping is applied to part of a plurality of second PDCCH regions (second PDCCH region 1) configured for the mobile station apparatus 5, and the second physical resource mapping is applied to another part of the plurality of second PDCCH regions (second PDCCH region 2).

The number of second PDCCH candidates in the first search space can be different from the number of second PDCCH candidates in the second search space. For example, in order to perform control so that a second PDCCH to which precoding processing is applied is basically used, and a second PDCCH to which precoding processing is not applied and which has a frequency diversity effect is used in a case where it is difficult in the base station apparatus 3 to realize appropriate precoding processing due to a certain situation, the number of second PDCCH candidates in the first search space may be set to be larger than the number of second PDCCH candidates in the second search space.

In a certain E-CCE aggregation number, the number of second PDCCH candidates in the first search space can be the same as the number of second PDCCH candidates in the second search space. In another E-CCE aggregation number, the number of second PDCCH candidates in the first search space can be different from the number of second PDCCH candidates in the second search space. In a certain E-CCE aggregation number, the number of second PDCCH candidates in the first search space can be larger than the number of second PDCCH candidates in the second search space. In another E-CCE aggregation number, the number of second PDCCH candidates in the first search space can be smaller than the number of second PDCCH candidates in the second search space.

Further, second PDCCH candidates of a certain E-CCE aggregation number may be set to the search space of one of the second PDCCH regions, and may not be set to the search space of another one of the second PDCCH regions.

The number of second PDCCH candidates in the search space in one second PDCCH region can be changed on the basis of the number of second PDCCH regions configured for the mobile station apparatus 5. For example, as the number of second PDCCH regions configured for the mobile station apparatus 5 increases, the number of second PDCCH candidates in the search space in one second PDCCH region is decreased.

<Overall Configuration of Base Station Apparatus 3>

Figure 1:
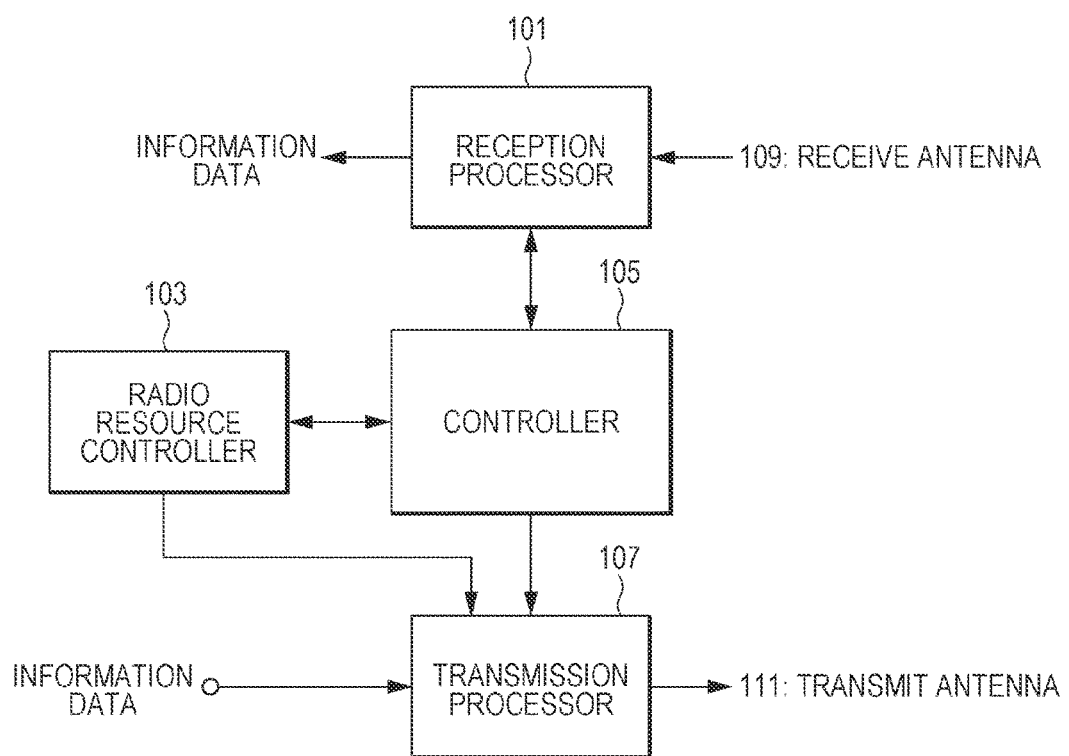
FIG. 1 is a schematic block diagram illustrating the configuration of a base station apparatus 3 according to an embodiment of the present invention.

The configuration of the base station apparatus 3 according to the embodiment will be described with reference to FIGS. 1, 2, and 3. FIG. 1 is a schematic block diagram illustrating the configuration of the base station apparatus 3 according to the embodiment of the present invention. As illustrated in FIG. 1, the base station apparatus 3 includes a reception processor (second reception processor) 101, a radio resource controller (second radio resource controller) 103, a controller (second controller) 105, and a transmission processor (second transmission processor) 107.

The reception processor 101 demodulates, using a UL RS, receive signals on the PUCCH and PUSCH received by a receive antenna 109 from the mobile station apparatus 5, decodes the signal, and extracts control information and information data, in response to an instruction from the controller 105. The reception processor 101 performs a process of extracting UCI on the uplink subframe and UL PRB in which the base station apparatus 3 assigns the resource of the PUCCH to the mobile station apparatus 5. The reception processor 101 receives, from the controller 105, an instruction indicating which process is to be performed on which uplink subframe and which UL PRB. For example, the reception processor 101 receives, from the controller 105, an instruction to perform a detection process in which multiplication and combining of code sequences in the time domain and multiplication and combining of code sequences in the frequency domain are performed on a signal on the PUCCH for an ACK/NACK (PUCCH format 1a, PUCCH format 1b). Also, the reception processor 101 receives, from the controller 105, a code sequence in the frequency domain and/or a code sequence in the time domain to be used for a process of detecting UCI from the PUCCH. The reception processor 101 outputs the extracted UCI to the controller 105, and outputs information data to a higher layer. The details of the reception processor 101 will be described below.

Also, the reception processor 101 detects (receives) a preamble sequence from a receive signal on the PRACH received by the receive antenna 109 from the mobile station apparatus 5, in response to an instruction from the controller 105. Further, the reception processor 101 performs estimation of arrival timing (reception timing) together with detection of the preamble sequence. The reception processor 101 performs a process of detecting a preamble sequence on the uplink subframe and UL PRB pair to which the base station apparatus 3 has allocated the resource of the PRACH. The reception processor 101 outputs information regarding the estimated arrival timing to the controller 105.

Further, the reception processor 101 measures the channel quality of one or more UL PRBs (UL PRB pairs) by using the SRS received from the mobile station apparatus 5. Also, the reception processor 101 detects (calculates, measures) an out-of-synchronization state in the uplink by using the SRS received from the mobile station apparatus 5. The reception processor 101 receives, from the controller 105, an instruction indicating which process is to be performed on which uplink subframe and which UL PRB (UL PRB pair). The reception processor 101 outputs information regarding the measured channel quality and the detected out-of-synchronization state of the uplink to the controller 105. The details of the reception processor 101 will be described below.

The radio resource controller 103 sets assignment of resources to the PDCCHs (first PDCCH, second PDCCH), assignment of resources to the PUCCH, assignment of a DL PRB pair to the PDSCH, assignment of a UL PRB pair to the PUSCH, assignment of resources to the PRACH, assignment of resources to the SRS, various channel modulation schemes/coding rates/transmit power control values/phase rotation amounts (weighting values) to be used in precoding processing, phase rotation amounts (weighting values) to be used in precoding processing of a UE-specific RS, and so forth. The radio resource controller 103 also sets a code sequence in the frequency domain and a code sequence in the time domain for the PUCCH and so forth. Also, the radio resource controller 103 sets a plurality of second PDCCH regions, and sets DL PRB pairs to be used for the individual second PDCCH regions. Also, the radio resource controller 103 sets the physical resource mapping of the individual second PDCCH regions. Also, the radio resource controller 103 sets, for the second PDCCH region, a combination of individual E-CCEs in a DL PRB pair and corresponding antenna ports. Specifically, the radio resource controller 103 sets the transmit antennas for transmitting signals on the individual E-CCEs in the DL PRB pair. Part of the information set by the radio resource controller 103 is reported to the mobile station apparatus 5 via the transmission processor 107, for example, information representing a DL PRB pair in a second PDCCH region, information representing the physical resource mapping in the second PDCCH region (information representing first physical resource mapping or second physical resource mapping), information representing a combination of individual E-CCEs in the DL PRB pair and corresponding antenna ports (first combination, second combination, third combination, or fourth combination), and information representing a resource block pair that is possibly used for the second PDCCH (for example, a bit map), are reported to the mobile station apparatus 5.

Further, the radio resource controller 103 sets assignment of radio resources of the PDSCH on the basis of the UCI that has been obtained by the reception processor 101 using the PUCCH and that has been input via the controller 105. For example, in a case where an ACK/NACK obtained using the PUCCH is input, the radio resource controller 103 performs, for the mobile station apparatus 5, assignment of resources of the PDSCH in which a NACK is indicated by the ACK/NACK.

The radio resource controller 103 outputs various control signals to the controller 105. Examples of the control signals include a control signal representing the physical resource mapping of a second PDCCH region, a control signal representing transmit antennas for transmitting signals on individual E-CCEs in the DL PRB pair in the second PDCCH region, a control signal representing assignment of resources of the second PDCCH, and a control signal representing a phase rotation amount to be used for precoding processing.

The controller 105 performs, for the transmission processor 107, control for assignment of a DL PRB pair to a PDSCH, assignment of resources to a PDCCH, setting of a modulation scheme for the PDSCH, setting of coding rates for the PDSCH and PDCCH (E-CCE aggregation number of the second PDCCH), setting of a UE-specific RS in a second PDCCH region, setting of a transmit antenna for transmitting a signal on an E-CCE, setting of precoding processing to the PDSCH, PDCCH, and a UE-specific RS, and so forth on the basis of a control signal received from the radio resource controller 103. Also, the controller 105 generates DCI to be transmitted using the PDCCH and outputs it to the transmission processor 107, on the basis of a control signal received from the radio resource controller 103. The DCI transmitted using the PDCCH may be a downlink assignment or an uplink grant. Also, the controller 105 performs control so as to transmit, to the mobile station apparatus 5 via the transmission processor 107 using the PDSCH, information representing a second PDCCH region, information representing physical resource mapping of the second PDCCH region, information representing a combination of individual E-CCEs in the DL PRB pair and corresponding antenna ports (first combination, second combination, third combination, or fourth combination), a bit map indicating resource block pairs that are possibly used for the second control channel, and so forth.

The controller 105 performs, for the reception processor 101, control for assignment of a UL PRB pair to a PUSCH, assignment of resources to a PUCCH, setting of modulation schemes of the PUSCH and PUCCH, setting of the coding rate of the PUSCH, a detection process for the PUCCH, setting of a code sequence for the PUCCH, assignment of resources to the PRACH, assignment of resources to the SRS, and so forth, on the basis of a control signal received from the radio resource controller 103. Also, the controller 105 receives, from the reception processor 101, UCI transmitted from the mobile station apparatus 5 using the PUCCH, and outputs the received UCI to the radio resource controller 103.

Also, the controller 105 receives, from the reception processor 101, information representing the arrival timing of a detected preamble sequence and information representing an out-of-synchronization state of the uplink detected from the received SRS, and calculates an adjustment value of transmission timing in the uplink (TA: Timing Advance, Timing Adjustment, Timing Alignment) (TA value). Information representing the calculated adjustment value of the transmission timing in the uplink (TA command) is reported to the mobile station apparatus 5 via the transmission processor 107.

The transmission processor 107 generates signals to be transmitted using the PDCCH and PDSCH on the basis of a control signal received from the controller 105, and transmits the signals via the transmit antenna 111. The transmission processor 107 transmits, to the mobile station apparatus 5, information representing a second PDCCH region, information representing the physical resource mapping of the second PDCCH region, information representing a combination of individual E-CCEs in a DL PRB pair and corresponding antenna ports (first combination, second combination, third combination, or fourth combination), information data received from a higher layer, and so forth received from the radio resource controller 103, by using the PDSCH. Also, the transmission processor 107 transmits the DCI received from the controller 105 to the mobile station apparatus 5 by using the PDCCH (first PDCCH, second PDCCH). Also, the transmission processor 107 transmits a CRS, a UE-specific RS, and a CSI-RS. To simplify the description, hereinafter it is assumed that information data includes information regarding several types of control. The details of the transmission processor 107 will be described below.

<Configuration of Transmission Processor 107 of Base Station Apparatus 3>

Hereinafter, the details of the transmission processor 107 of the base station apparatus 3 will be described. FIG. 2 is a schematic block diagram illustrating the configuration of the transmission processor 107 of the base station apparatus 3 according to the embodiment of the present invention. As illustrated in FIG. 2, the transmission processor 107 includes a plurality of physical downlink shared channel processors 201-1 to 201-M (hereinafter the physical downlink shared channel processors 201-1 to 201-M are collectively referred to as physical downlink shared channel processors 201), a plurality of physical downlink control channel processors 203-1 to 203-M (hereinafter the physical downlink control channel processors 203-1 to 203-M are collectively referred to as physical downlink control channel processors 203), a downlink pilot channel processor 205, a precoding processor 231, a multiplexer 207, an IFFT (Inverse Fast Fourier Transform) unit 209, a GI (Guard Interval) insertion unit 211, a D/A (Digital/Analog converter) unit 213, a transmission RF (Radio Frequency) unit 215, and the transmit antenna 111. The individual physical downlink shared channel processors 201 and the individual physical downlink control channel processors 203 have the same configuration and function, and thus one of them will be described. To simplify the description, it is assumed that the transmit antenna 111 includes a plurality of antenna ports (antenna ports 0 to 22).

Figure 2:
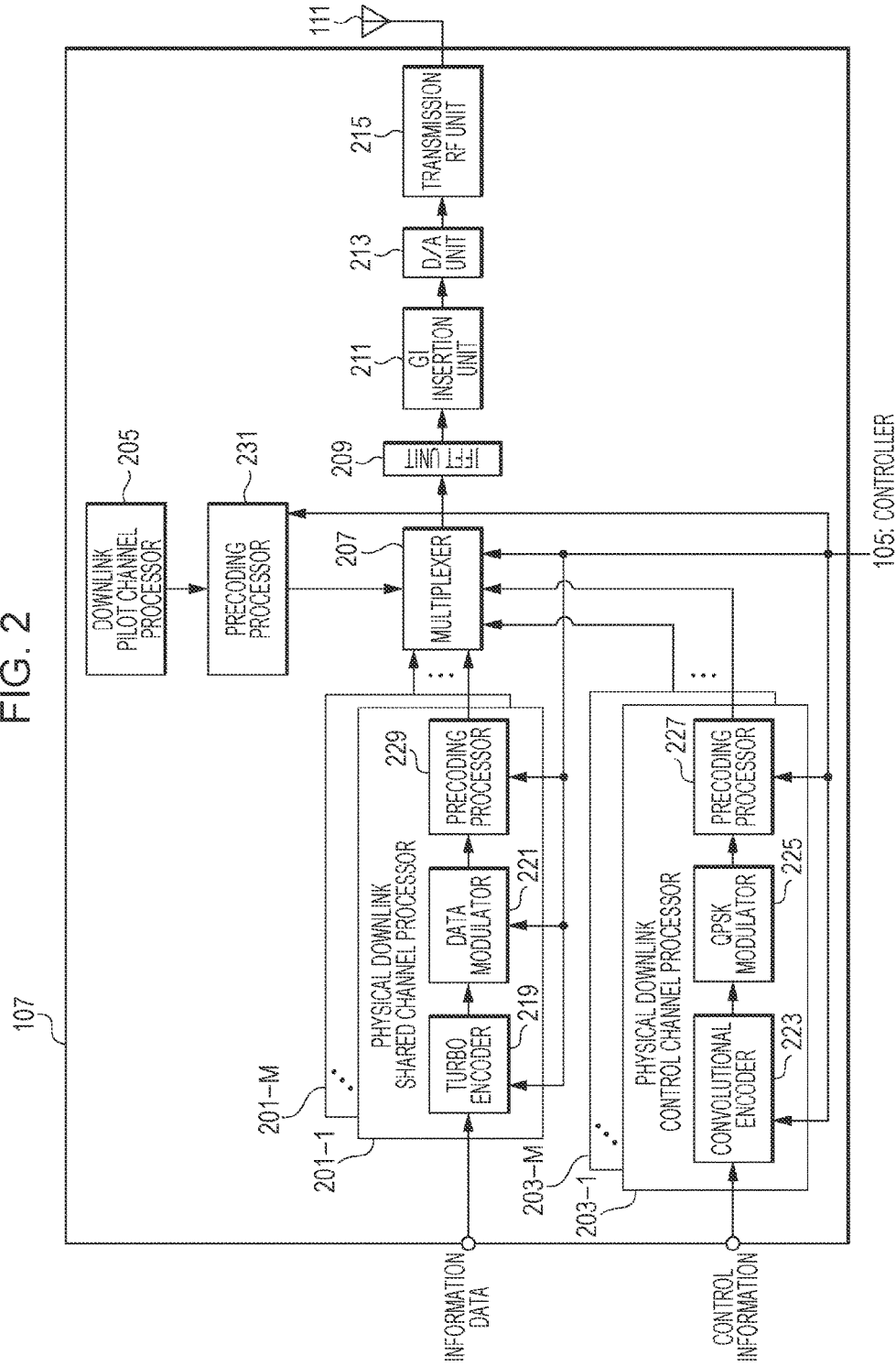
FIG. 2 is a schematic block diagram illustrating the configuration of a transmission processor 107 of the base station apparatus 3 according to the embodiment of the present invention.
Figure 3:
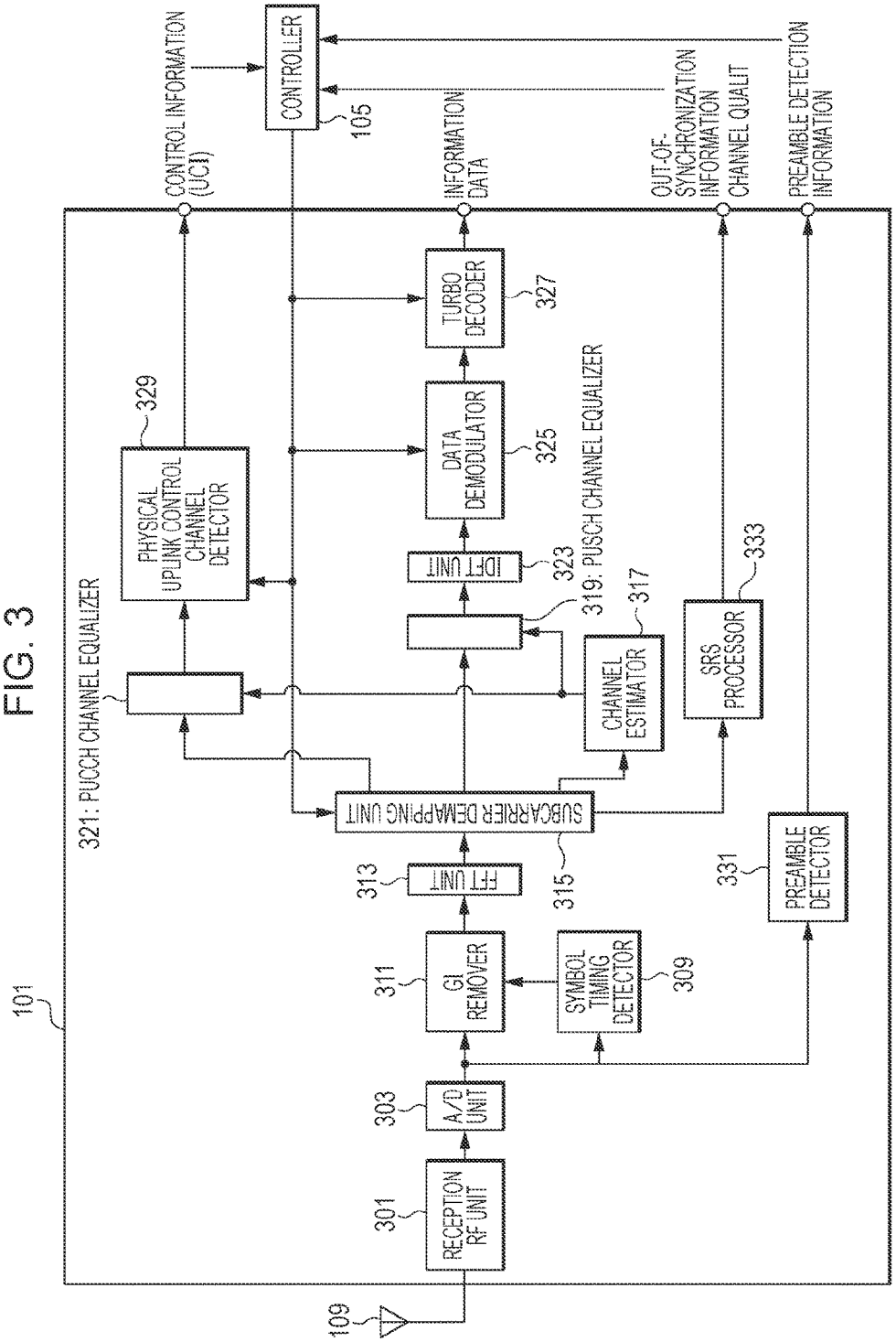
FIG. 3 is a schematic block diagram illustrating the configuration of a reception processor 101 of the base station apparatus 3 according to the embodiment of the present invention.

As illustrated in FIG. 2, each of the physical downlink shared channel processors 201 includes a turbo encoder 219, a data modulator 221, and a precoding processor 229. Also, as illustrated in FIG. 2, each of the physical downlink control channel processors 203 includes a convolutional encoder 223, a QPSK modulator 225, and a precoding processor 227. The physical downlink shared channel processor 201 performs baseband signal processing to transmit information data to the mobile station apparatus 5 using the OFDM scheme. The turbo encoder 219 performs, on the information data input thereto, turbo coding to increase the error resilience of the data at the coding rate received from the controller 105, and outputs the information data to the data modulator 221. The data modulator 221 modulates the data coded by the turbo encoder 219 by using the modulation scheme received from the controller 105, for example, QPSK (Quadrature Phase Shift Keying), 16QAM (16

Quadrature Amplitude Modulation), and 64QAM (64 Quadrature Amplitude Modulation), and generates a signal sequence of modulation symbols. The data modulator 221 outputs the generated signal sequence to the precoding processor 229. The precoding processor 229 performs precoding processing (beamforming processing) on the signal received from the data modulator 221, and outputs the signal to the multiplexer 207. Here, in the precoding processing, it is preferable that phase rotation or the like be performed on a signal to be generated so that the mobile station apparatus 5 can efficiently receive the signal (for example, so that the receive power is maximized and interference is minimized). In the case of not performing precoding processing on a signal received from the data modulator 221, the precoding processor 229 outputs the signal received from the data modulator 221 to the multiplexer 207 without performing any processing.

The physical downlink control channel processor 203 performs baseband signal processing so as to transmit DCI received from the controller 105 using the OFDM scheme. The convolutional encoder 223 performs convolutional coding to increase the error resilience of the DCI on the basis of the coding rate received from the controller 105. Here, the DCI is controlled in units of bits. The coding rate of the DCI transmitted on the second PDCCH relates to an E-CCE aggregation number that is set. Also, the convolutional encoder 223 performs, on the basis of the coding rate received from the controller 105, rate matching to adjust the number of output bits with respect to the bits on which processing of convolutional coding has been performed. The convolutional encoder 223 outputs the encoded DCI to the QPSK modulator 225. The QPSK modulator 225 modulates the DCI encoded by the convolutional encoder 223 by using the QPSK modulation scheme, and outputs a signal sequence of the modulated modulation symbols to the precoding processor 227. The precoding processor 227 performs precoding processing on the signal received from the QPSK modulator 225 and outputs the signal to the multiplexer 207. The precoding processor 227 may output the signal received from the QPSK modulator 225 to the multiplexer 207 without performing precoding processing thereon.

The downlink pilot channel processor 205 generates downlink reference signals (CRS, UE-specific RS, CSI-RS) which are signals known in the mobile station apparatus 5, and outputs them to the precoding processor 231. The precoding processor 231 does not perform precoding processing on the CRS, CSI-RS, and part of UE-specific RS received from the downlink pilot channel processor 205, and outputs them to the multiplexer 207. For example, a UE-specific RS on which precoding processing is not performed by the precoding processor 231 is a UE-specific RS in a DL PRB pair used for a second PDCCH in the second PDCCH region of the second physical resource mapping. The precoding processor 231 performs precoding processing on the part of the UE-specific RS received from the downlink pilot channel processor 205, and outputs it to the multiplexer 207. For example, a UE-specific RS on which precoding processing is performed by the precoding processor 231 is a UE-specific RS in a DL PRB pair used for a second PDCCH in the second PDCCH region of the first physical resource mapping. The precoding processor 231 performs, on part of the UE-specific RS, a process similar to the process performed on the PDSCH in the precoding processor 229 and/or the processing performed on the second PDCCH in the precoding processor 227. More specifically, the precoding processor 231 performs precoding processing on a signal on a certain E-CCE, and also performs similar precoding processing on the UE-specific RS whose antenna port corresponds to the E-CCE. Thus, in the case of demodulating a signal of the second PDCCH to which precoding processing is applied in the mobile station apparatus 5, the UE-specific RS can be used to estimate an equalization channel in which channel variations in the downlink is combined with phase rotation by the precoding processor 227. That is, the base station apparatus 3 need not notify the mobile station apparatus 5 of information about the precoding processing (the amount of phase rotation) by the precoding processor 227, and the mobile station apparatus 5 is capable of demodulating the signal subjected to the precoding processing.

In a case where precoding processing is not used for the PDSCH and second PDCCH on which demodulation processing such as channel compensation is performed using a UE-specific RS, the precoding processor 231 outputs the UE-specific RS to the multiplexer 207 without performing precoding processing on the UE-specific RS.

The multiplexer 207 multiplexes a signal received from the downlink pilot channel processor 205, signals received from the individual physical downlink shared channel processors 201, and signals received from the individual physical downlink control channel processors 203 on a downlink subframe in response to an instruction from the controller 105. Control signals regarding assignment of a DL PRB pair to the PDSCH set by the radio resource controller 103, assignment of resources to PDCCHs (first PDCCH, second PDCCH), and physical resource mapping in the second PDCCH region are input to the controller 105, and the controller 105 controls the processing in the multiplexer 207 on the basis of the control signals. For example, the multiplexer 207 multiplexes a signal of the second PDCCH on a downlink resource using the E-CCE aggregation number set by the radio resource controller 103. The multiplexer 207 outputs the multiplexed signal to the IFFT unit 209.

The IFFT unit 209 performs inverse fast Fourier transform on the multiplexed signal generated by the multiplexer 207, performs modulation thereon using the OFDM scheme, and outputs it to the GI insertion unit 211. The GI insertion unit 211 adds guard interval to the signal modulated in the OFDM scheme by the IFFT unit 209, thereby generating a baseband digital signal made up of symbols in the OFDM scheme. As is known, guard interval is generated by duplicating part of the head or end of the OFDM symbols to be transmitted. The GI insertion unit 211 outputs the generated baseband digital signal to the D/A unit 213. The D/A unit 213 converts the baseband digital signal received from the GI insertion unit 211 into an analog signal, and outputs the analog signal to the transmission RF unit 215. The transmission RF unit 215 generates in-phase components and orthogonal components of an intermediate frequency from the analog signal received from the D/A unit 213, and removes extra frequency components for the intermediate frequency band. Subsequently, the transmission RF unit 215 converts (up-converts) the intermediate-frequency signal into a high-frequency signal, removes extra frequency components, amplifies the power, and transmits the signal to the mobile station apparatus 5 via the transmit antenna 111.

<Configuration of Reception Processor 101 of Base Station Apparatus 3>

Hereinafter, the reception processor 101 of the base station apparatus 3 will be described in detail. FIG. 3 is a schematic block diagram illustrating the configuration of the reception processor 101 of the base station apparatus 3 according to the embodiment of the present invention. As illustrated in FIG. 3, the reception processor 101 includes a reception RF unit 301, an A/D (Analog/Digital converter) unit 303, a symbol timing detector 309, a GI remover 311, an FFT unit 313, a subcarrier demapping unit 315, a channel estimator 317, a PUSCH channel equalizer 319, a PUCCH channel equalizer 321, an IDFT unit 323, a data demodulator 325, a turbo decoder 327, a physical uplink control channel detector 329, a preamble detector 331, and an SRS processor 333.

The reception RF unit 301 appropriately amplifies a signal received by the receive antenna 109, converts (down-converts) the signal into an intermediate frequency, removes unnecessary frequency components, controls the amplification level so that the signal level is appropriately kept, and performs orthogonal demodulation on the basis of the in-phase components and orthogonal components of the received signal. The reception RF unit 301 outputs the analog signal subjected to orthogonal demodulation to the A/D unit 303. The A/D unit 303 converts the analog signal subjected to the orthogonal demodulation in the reception RF unit 301 into a digital signal, and outputs the digital signal resulting from the conversion to the symbol timing detector 309 and the GI remover 311.

The symbol timing detector 309 detects the timing of a symbol on the basis of a signal received from the A/D unit 303, and outputs a control signal representing the detected timing of a symbol boundary to the GI remover 311. The GI remover 311 removes a part corresponding to guard interval from the signal received from the A/D unit 303 on the basis of a control signal from the symbol timing detector 309, and outputs the remaining signal to the FFT unit 313. The FFT unit 313 performs fast Fourier transform on the signal received from the GI remover 311, performs demodulation in the DFT-Spread-OFDM scheme, and outputs the signal to the subcarrier demapping unit 315. The number of points of the FFT unit 313 is equal to the number of points of an IFFT unit in the mobile station apparatus 5 described below.

The subcarrier demapping unit 315 demaps the signal demodulated by the FFT unit 313 into a DM RS, an SRS, a PUSCH signal, and a PUCCH signal on the basis of a control signal received from the controller 105. The subcarrier demapping unit 315 outputs the DM RS resulting from the demapping to the channel estimator 317, outputs the SRS resulting from the demapping to the SRS processor 333, outputs the PUSCH signal resulting from the demapping to the PUSCH channel equalizer 319, and outputs the PUCCH signal resulting from the demapping to the PUCCH channel equalizer 321.

The channel estimator 317 estimates channel variations by using the DM RS resulting from the demapping in the subcarrier demapping unit 315 and a known signal. The channel estimator 317 outputs a channel estimation value to the PUSCH channel equalizer 319 and the PUCCH channel equalizer 321. The PUSCH channel equalizer 319 equalizes the amplitude and phase of the PUSCH signal resulting from the demapping in the subcarrier demapping unit 315 on the basis of the channel estimation value received from the channel estimator 317. Here, equalization means a process of restoring channel variations experienced by a signal during radio communication. The PUSCH channel equalizer 319 outputs the adjusted signal to the IDFT unit 323.

The IDFT unit 323 performs inverse discrete Fourier transform on the signal received from the PUSCH channel equalizer 319 and outputs the signal to the data demodulator 325. The data demodulator 325 demodulates the PUSCH signal subjected to the transform in the IDFT unit 323, and outputs the demodulated PUSCH signal to the turbo decoder 327. The demodulation here corresponds to the modulation scheme used in a data modulator of the mobile station apparatus 5, and the modulation scheme is received from the controller 105. The turbo decoder 327 decodes information data from the PUSCH signal that is demodulated by and received from the data demodulator 325. The coding rate is received from the controller 105.

The PUCCH channel equalizer 321 equalizes the amplitude and phase of the PUCCH signal resulting from the demapping in the subcarrier demapping unit 315 on the basis of the channel estimation value received from the channel estimator 317. The PUCCH channel equalizer 321 outputs the equalized signal to the physical uplink control channel detector 329.

The physical uplink control channel detector 329 demodulates and decodes the signal received from the PUCCH channel equalizer 321, and detects UCI. The physical uplink control channel detector 329 performs a process of demultiplexing a signal subjected to code multiplexing in the frequency domain and/or the time domain. The physical uplink control channel detector 329 performs a process of detecting an ACK/NACK, an SR, and a CQI from the PUCCH signal subjected to code multiplexing in the frequency domain and/or the time domain by using a code sequence used on the transmission side. Specifically, as a detection process using a code sequence in the frequency domain, that is, as a process of demultiplexing a signal subjected to code multiplexing in the frequency domain, the physical uplink control channel detector 329 multiplies the signal for each subcarrier of the PUCCH by each code in the code sequence, and then combines the signals resulting from multiplication by each code. Specifically, as a detection process using a code sequence in the time domain, that is, as a process of demultiplexing the signal subjected to code multiplexing in the time domain, the physical uplink control channel detector 329 multiplies a signal for each SC-FDMA symbol of PUCCH by each code in the code sequence, and then combines the signals resulting from multiplication by each code. The physical uplink control channel detector 329 sets a detection process for the PUCCH signal on the basis of a control signal from the controller 105.

The SRS processor 333 measures the channel quality by using the SRS received from the subcarrier demapping unit 315, and outputs a measurement result of the channel quality of the UL PRB (UL PRB pair) to the controller 105. The SRS processor 333 receives, from the controller 105, an instruction indicating the uplink subframe and the UL PRB (UL PRB pair) for which the measurement of channel quality of the mobile station apparatus 5 is to be performed for the signal. Also, the SRS processor 333 detects an out-of-synchronization state on the uplink by using the SRS received from the subcarrier demapping unit 315, and outputs information representing the out-of-synchronization state on the uplink (out-of-synchronization information) to the controller 105. The SRS processor 333 may perform a process of detecting an out-of-synchronization state on the uplink from a receive signal in the time domain. Specifically, the SRS processor 333 may perform a process equivalent to the process performed in the preamble detector 331 described below.

The preamble detector 331 performs a process of detecting (receiving) a preamble transmitted for a receive signal corresponding to the PRACH on the basis of a signal received from the A/D unit 303. Specifically, the preamble detector 331 performs a correlation process between a replica signal that is possibly transmitted and is generated by using each preamble sequence, and receive signals at various timings in guard time. For example, if a correlation value is higher than a preset threshold, the preamble detector 331 determines that the same signal as the preamble sequence used to generate the replica signal used in the correlation process has been transmitted from the mobile station apparatus 5. The preamble detector 331 determines the timing with the highest correlation value to be arrival timing of the preamble sequence. The preamble detector 331 generates preamble detection information at least including information indicating the detected preamble sequence and information indicating the arrival timing, and outputs the preamble detection information to the controller 105.

The controller 105 controls the subcarrier demapping unit 315, the data demodulator 325, the turbo decoder 327, the channel estimator 317, and the physical uplink control channel detector 329 on the basis of control information (DCI) transmitted from the base station apparatus 3 to the mobile station apparatus 5 by using the PDCCH and control information (RRC signaling) transmitted from the base station apparatus 3 to the mobile station apparatus 5 by using the PDSCH. Also, the controller 105 grasps the resources (uplink subframe, UL PRB (UL PRB pair), code sequence in the frequency domain, code sequence in the time domain) constituting the PRACH, PUSCH, PUCCH, and SRS that have been transmitted (may have been transmitted) from each mobile station apparatus 5, on the basis of the control information transmitted from the base station apparatus 3 to the mobile station apparatus 5.

<Overall Configuration of Mobile Station Apparatus 5>

Figure 4:
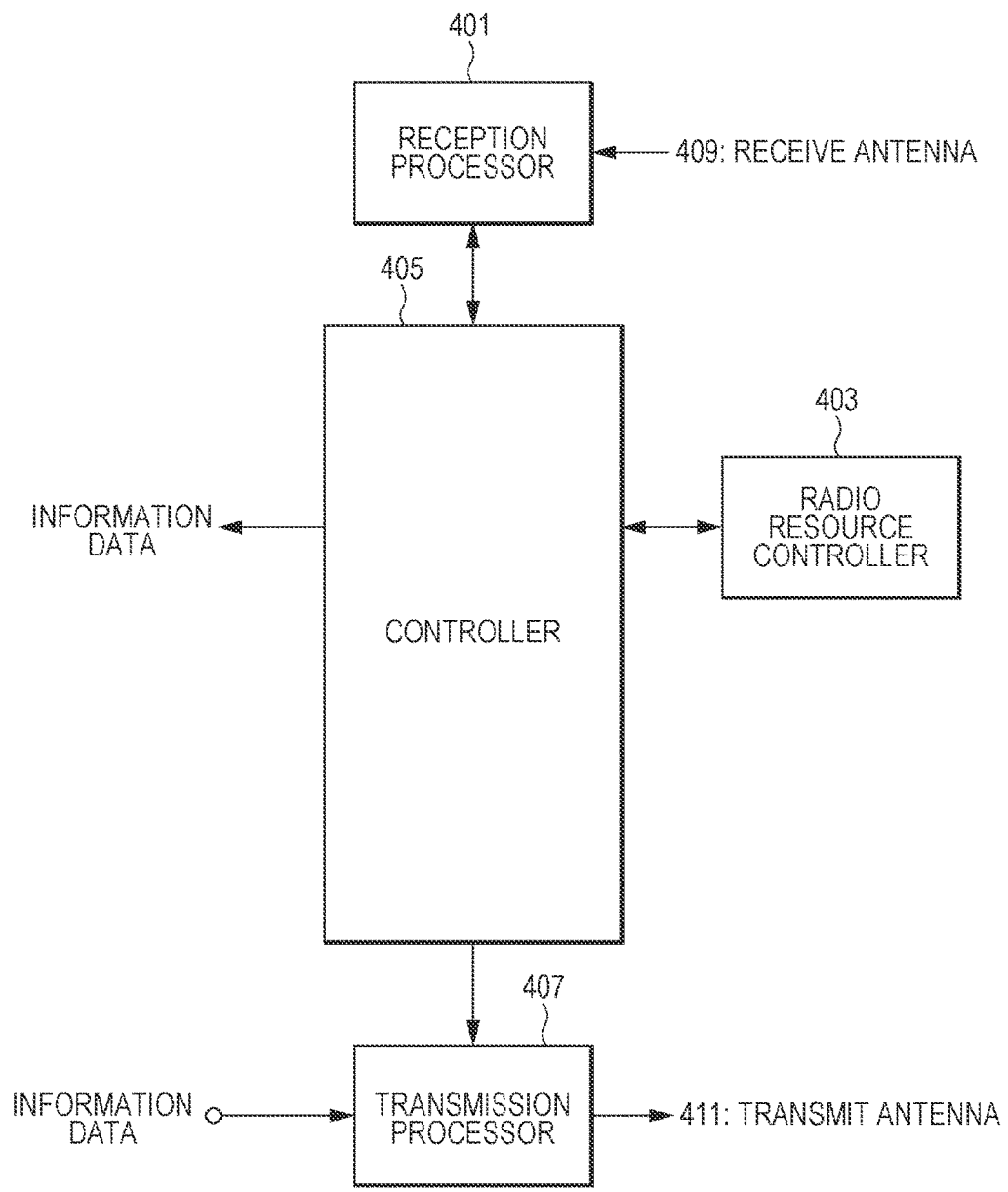
FIG. 4 is a schematic block diagram illustrating the configuration of a mobile station apparatus 5 according to the embodiment of the present invention.
Figure 5:
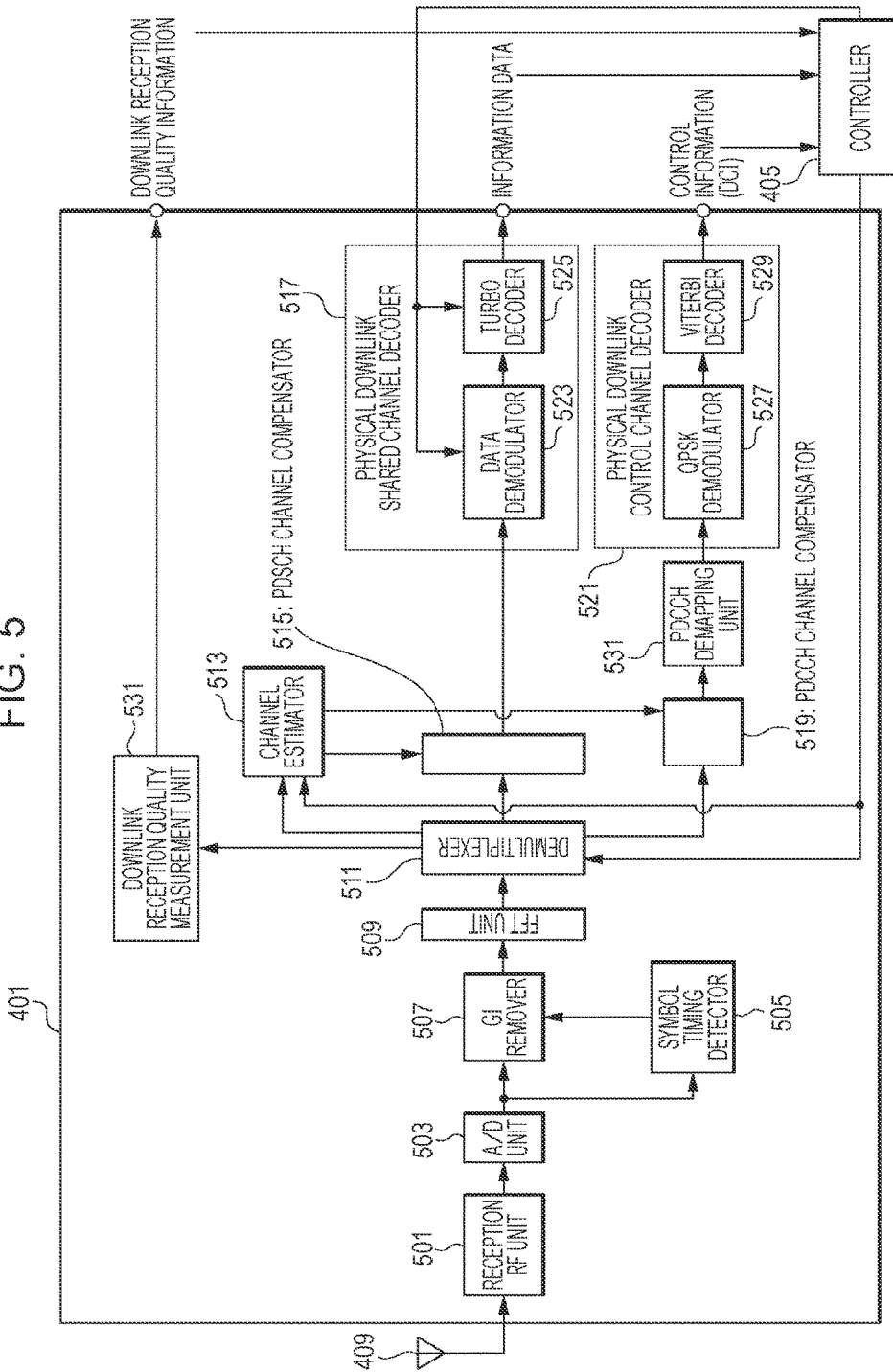
FIG. 5 is a schematic block diagram illustrating the configuration of a reception processor 401 of the mobile station apparatus 5 according to the embodiment of the present invention.

The configuration of the mobile station apparatus 5 according to the embodiment will be described below with reference to FIGS. 4, 5, and 6. FIG. 4 is a schematic block diagram illustrating the configuration of the mobile station apparatus 5 according to the embodiment of the present invention. As illustrated in FIG. 4, the mobile station apparatus 5 includes a reception processor (first reception processor) 401, a radio resource controller (first radio resource controller) 403, a controller (first controller) 405, and a transmission processor (first transmission processor) 407.

The reception processor 401 receives a signal from the base station apparatus 3, and demodulates and decodes the received signal in response to an instruction from the controller 405. In the case of detecting a signal on a PDCCH (first PDCCH, second PDCCH) for the mobile station apparatus 5, the reception processor 401 outputs DCI obtained by decoding the signal on the PDCCH to the controller 405. For example, the reception processor 401 performs a process of detecting a second PDCCH for the mobile station apparatus 5 in the search space in the second PDCCH region specified by the base station apparatus 3. For example, the reception processor 401 sets a search space for candidates of the E-CCE aggregation number, and performs a process of detecting the second PDCCH for the mobile station apparatus 5. For example, the reception processor 401 performs a process of estimating a channel by using a UE-specific RS in the second PDCCH region specified by the base station apparatus 3, demodulating a signal on the second PDCCH, and detecting a signal including control information for the mobile station apparatus 5. For example, the reception processor 401 performs a process of identifying transmit antennas (antenna ports) corresponding to UE-specific RSs used to demodulate signals on individual E-CCEs in a DL PRB pair in the second PDCCH region on the basis of a combination of individual E-CCEs in the DL PRB pair in the second PDCCH region and corresponding antenna ports reported from the base station apparatus 3, and detecting a signal including control information addressed to the mobile station apparatus 5.

Also, the reception processor 401 outputs information data that has been obtained by decoding the PDSCH for the mobile station apparatus 5 to a higher layer via the controller 405 in response to an instruction from the controller 405 after the DCI included in the PDCCH has been output to the controller 405. A downlink assignment in the DCI included in the PDCCH includes information representing the assignment of resources of the PDSCH. Also, the reception processor 401 outputs the control information that is obtained by decoding the PDSCH and generated by the radio resource controller 103 of the base station apparatus 3 to the controller 405, and also to the radio resource controller 403 of the mobile station apparatus 5 via the controller 405. For example, the control information generated by the radio resource controller 103 of the base station apparatus 3 includes information representing a DL PRB pair in a second PDCCH region, information representing the physical resource mapping in the second PDCCH region (information representing first physical resource mapping or second physical resource mapping), and information representing a combination of individual E-CCEs in the DL PRB pair and corresponding antenna ports (first combination, second combination, third combination, or fourth combination).

Further, the reception processor 401 outputs a cyclic redundancy check (CRC) code included in the PDSCH to the controller 405. The transmission processor 107 of the base station apparatus 3 generates a CRC code from information data and transmits the information data and the CRC code on the PDSCH, although this is omitted in the description of the base station apparatus 3. The CRC code is used to determine whether or not the data included in the PDSCH is wrong. For example, in a case where the information generated from data by using a predetermined generator polynomial in the mobile station apparatus 5 is the same as the CRC code that is generated in the base station apparatus 3 and transmitted on the PDSCH, it is determined that the data is not wrong. In a case where the information generated from data by using the predetermined generator polynomial in the mobile station apparatus 5 is different from the CRC code that is generated in the base station apparatus 3 and transmitted on the PDSCH, it is determined that the data is wrong.

Also, the reception processor 401 measures the downlink reception quality (RSRP: Reference Signal Received Power) and outputs a measurement result to the controller 405. The reception processor 401 measures (calculates) the RSRP from the CRS or CSI-RS in response to an instruction from the controller 405. The reception processor 401 will be described in detail below.

The controller 405 checks the data that is transmitted from the base station apparatus 3 using the PDSCH and is received from the reception processor 401, outputs information data in the data to a higher layer, and controls the reception processor 401 and the transmission processor 407 on the basis of control information that is included in the data and is generated by the radio resource controller 103 of the base station apparatus 3. Also, the controller 405 controls the reception processor 401 and the transmission processor 407 in response to an instruction from the radio resource controller 403. For example, the controller 405 controls the reception processor 401 to perform a process of detecting a second PDCCH on a signal in a DL PRB pair in the second PDCCH region specified by the radio resource controller 403. For example, the controller 405 controls the reception processor 401 so as to perform demapping of physical resources in the second PDCCH region on the basis of information representing the physical resource mapping in the second PDCCH region specified by the radio resource controller 403. Here, demapping of physical resources in the second PDCCH region means, for example, as illustrated in FIGS. 21 and 22, a process of configuring (forming, constructing, creating) second PDCCH candidates for performing a detection process from a signal in the second PDCCH region. Also, the controller 405 controls, for the reception processor 401, a region in which a process of detecting a second PDCCH in the second PDCCH region is performed. Specifically, for each second PDCCH region, the controller 405 indicates (sets), to the reception processor 401, an E-CCE aggregation number for which a search space is set, the number of the first E-CCE in which a process of detecting a second PDCCH in the second PDCCH region is performed, and the number of second PDCCH candidates, for each E-CCE aggregation number. Also, the controller 405 controls the reception processor 401 so as to use the UE-specific RSs for the transmit antennas (antenna ports) corresponding to demodulation of signals on individual E-CCEs, on the basis of a combination of individual E-CCEs in the DL PRB pair and corresponding antenna ports specified by the radio resource controller 403 (the correspondence between individual E-CCEs in the DL PRB pair and corresponding transmit antennas for UE-specific RSs).

Further, the controller 405 controls the reception processor 401 and the transmission processor 407 on the basis of DCI that is transmitted from the base station apparatus 3 using the PDCCH and is received from the reception processor 401. Specifically, the controller 405 controls the reception processor 401 mainly on the basis of a detected downlink assignment, and controls the transmission processor 407 mainly on the basis of a detected uplink grant. Also, the controller 405 controls the transmission processor 407 on the basis of control information representing a transmit power control command of the PUCCH included in the downlink assignment. The controller 405 compares the information generated using a predetermined generator polynomial from the data received from the reception processor 401 with the CRC code received from the reception processor 401, determines whether or not the data is wrong, and generates an ACK/NACK. Also, the controller 405 generates an SR and a CQI in response to an instruction from the radio resource controller 403. Also, the controller 405 controls the transmission timing of a signal from the transmission processor 407 on the basis of an adjustment value or the like of the transmission timing on the uplink reported from the base station apparatus 3. Also, the controller 405 controls the transmission processor 407 to transmit information representing the reception quality (RSRP) of the downlink received from the reception processor 401. The base station apparatus 3 may set, for the mobile station apparatus 5, candidates of an E-CCE aggregation number on the basis of the reception quality (RSRP) on the downlink reported from the mobile station apparatus 5, although this is omitted in the description of the base station apparatus 3. For example, the base station apparatus 3 may set, for the mobile station apparatus 5 having good reception quality in the downlink (the mobile station apparatus near the center of the cell), E-CCE aggregation 1, E-CCE aggregation 2, and E-CCE aggregation 4 as candidates of an E-CCE aggregation number of Localized E-PDCCH. For example, the base station apparatus 3 may set, for the mobile station apparatus 5 having unfavorable reception quality in the downlink (the mobile station apparatus near the edge of the cell), E-CCE aggregation 2 and E-CCE aggregation 4 as candidates of an E-CCE aggregation number of Localized E-PDCCH.

The radio resource controller 403 stores and holds the control information generated by the radio resource controller 103 of the base station apparatus 3 and reported from the base station apparatus 3, and controls the reception processor 401 and the transmission processor 407 via the controller 405. That is, the radio resource controller 403 has a function of a memory for holding various parameters and the like. For example, the radio resource controller 403 holds information regarding a DL PRB pair in the second PDCCH region, information regarding the physical resource mapping in the second PDCCH region, and information regarding a combination of individual E-CCEs in the DL PRB pair in the second PDCCH region and corresponding antenna ports (first combination, second combination, third combination, or fourth combination), and outputs various control signals to the controller 405. The radio resource controller 403 holds parameters related to transmit powers of the PUSCH, PUCCH, SRS, and PRACH, and outputs a control signal to the controller 405 so that the parameters reported from the base station apparatus 3 are used.

The radio resource controller 403 sets values of parameters related to the transmit powers of the PUCCH, PUSCH, SRS, PRACH, and so forth. The values of the transmit powers set by the radio resource controller 403 are output to the transmission processor 407 by the controller 405. For a DM RS constituted by the resource in the same UL PRB as the PUCCH, the same transmit power control as that for the PUCCH is performed. For a DM RS constituted by the resource in the same UL PRB as the PUSCH, the same transmit power control as that for the PUSCH is performed. The radio resource controller 403 sets, for the PUSCH, the values of a parameter based on the number of UL PRB pairs assigned to the PUSCH, a parameter specific to a cell reported in advance from the base station apparatus 3, a parameter specific to a mobile station apparatus reported in advance from the base station apparatus 3, a parameter based on the modulation scheme used for the PUSCH, a parameter based on the value of estimated path loss, a parameter based on a transmit power control command reported from the base station apparatus 3, and so forth. The radio resource controller 403 sets, for the PUCCH, the values of a parameter based on the signal configuration of the PUCCH, a parameter specific to a cell reported in advance from the base station apparatus 3, a parameter specific to a mobile station apparatus reported in advance from the base station apparatus 3, a parameter based on the value of estimated path loss, a parameter based on a reported transmit power control command, and so forth.

As a parameter related to transmit power, a parameter specific to a cell and a parameter specific to a mobile station apparatus are reported from the base station apparatus 3 using the PDSCH, and a transmit power control command is reported from the base station apparatus 3 using the PDCCH. The transmit power control command for the PUSCH is included in an uplink grant, and the transmit power control command for the PUCCH is included in a downlink assignment. The various parameters that are related to transmit powers and that are reported from the base station apparatus 3 are appropriately stored in the radio resource controller 403, and the stored values are input to the controller 405.

The transmission processor 407 transmits a signal that is obtained by encoding and modulating information data and UCI to the base station apparatus 3 via a transmit antenna 411 by using the resources of the PUSCH and PUCCH in response to an instruction from the controller 405. Also, the transmission processor 407 sets the transmit powers of the PUSCH, PUCCH, SRS, DM RS, and PRACH in response to an instruction from the controller 405. The transmission processor 407 will be described in detail below.

<Reception Processor 401 of Mobile Station Apparatus 5>

Hereinafter, the reception processor 401 of the mobile station apparatus 5 will be described in detail. FIG. 5 is a schematic block diagram illustrating the configuration of the reception processor 401 of the mobile station apparatus 5 according to the embodiment of the present invention. As illustrated in FIG. 5, the reception processor 401 includes a reception RF unit 501, an A/D unit 503, a symbol timing detector 505, a GI remover 507, an FFT unit 509, a demultiplexer 511, a channel estimator 513, a PDSCH channel compensator 515, a physical downlink shared channel decoder 517, a PDCCH channel compensator 519, a physical downlink control channel decoder 521, a downlink reception quality measurement unit 531, and a PDCCH demapping unit 533. Also, as illustrated in FIG. 5, the physical downlink shared channel decoder 517 includes a data demodulator 523 and a turbo decoder 525. Also, as illustrated in FIG. 5, the physical downlink control channel decoder 521 includes a QPSK demodulator 527 and a Viterbi decoder 529.

The reception RF unit 501 appropriately amplifies a signal received by the receive antenna 409, converts (down-converts) the signal into an intermediate frequency, removes unnecessary frequency components, controls the amplification level so that the signal level is appropriately kept, and performs orthogonal demodulation on the basis of the in-phase components and orthogonal components of the received signal. The reception RF unit 501 outputs the analog signal subjected to orthogonal demodulation to the A/D unit 503.

The A/D unit 503 converts the analog signal subjected to the orthogonal demodulation in the reception RF unit 501 into a digital signal, and outputs the digital signal resulting from the conversion to the symbol timing detector 505 and the GI remover 507. The symbol timing detector 505 detects the timing of a symbol on the basis of the digital signal obtained from the A/D unit 503, and outputs a control signal representing the detected timing of a symbol boundary to the GI remover 507. The GI remover 507 removes a part corresponding to guard interval from the digital signal output from the A/D unit 503 on the basis of the control signal from the symbol timing detector 505, and outputs the remaining signal to the FFT unit 509. The FFT unit 509 performs fast Fourier transform on the signal received from the GI remover 507, performs demodulation in the OFDM scheme, and outputs the signal to the demultiplexer 511.

The demultiplexer 511 demultiplexes the signal demodulated by the FFT unit 509 into a signal of the PDCCH (first PDCCH, second PDCCH) and a signal of the PDSCH on the basis of a control signal received from the controller 405. The demultiplexer 511 outputs the signal of the PDSCH obtained through demultiplexing to the PDSCH channel compensator 515, and outputs the signal of the PDCCH obtained through demultiplexing to the PDCCH channel compensator 519. For example, the demultiplexer 511 outputs a signal on the second PDCCH in the second PDCCH region specified for the mobile station apparatus 5 to the PDCCH channel compensator 519. Also, the demultiplexer 511 demultiplexes the downlink resource elements to which downlink reference signals are mapped, and outputs the downlink reference signals (CRS, UE-specific RS) to the channel estimator 513. For example, the demultiplexer 511 outputs the UE-specific RS in the second PDCCH region specified for the mobile station apparatus 5 to the channel estimator 513. Also, the demultiplexer 511 outputs downlink reference signals (CRS, CSI-RS) to the downlink reception quality measurement unit 531.

The channel estimator 513 estimates channel variations by using the downlink reference signals obtained through demultiplexing performed by the demultiplexer 511 and a known signal, and outputs a channel compensation value for adjusting the amplitude and phase to the PDSCH channel compensator 515 and the PDCCH channel compensator 519 so as to compensate for channel variations. The channel estimator 513 independently estimates channel variations by using the CRS and the UE-specific RS, and outputs a channel compensation value. For example, the channel estimator 513 generates a channel compensation value from a channel estimation value estimated by using the UE-specific RSs mapped to a plurality of DL PRB pairs in the second PDCCH region specified for the mobile station apparatus 5, and outputs the channel compensation value to the PDCCH channel compensator 519. The channel estimator 513 performs channel estimation and generates a channel compensation value by using the UE-specific RSs for the individual transmit antennas (antenna ports) specified by the controller 405. For example, the channel estimator 513 generates a channel compensation value from a channel estimation value estimated by using the UE-specific RSs mapped to the plurality of DL PRB pairs assigned to the mobile station apparatus 5 and assigned to the PDSCH, and outputs the channel compensation value to the PDSCH channel compensator 515. For example, the channel estimator 513 generates a channel compensation value from a channel estimation value estimated by using a CRS, and outputs the channel compensation value to the PDCCH channel compensator 519. For example, the channel estimator 513 generates a channel compensation value from a channel estimation value estimated by using a CRS, and outputs the channel compensation value to the PDSCH channel compensator 515.

The PDSCH channel compensator 515 adjusts the amplitude and phase of the signal of the PDSCH obtained through demultiplexing performed by the demultiplexer 511 on the basis of the channel compensation value received from the channel estimator 513. For example, the PDSCH channel compensator 515 performs adjustment on a signal on a certain PDSCH on the basis of a channel compensation value generated by the channel estimator 513 on the basis of a UE-specific RS, and performs adjustment on a signal on another PDSCH on the basis of a channel compensation value generated by the channel estimator 513 on the basis of a CRS. The PDSCH channel compensator 515 outputs the signal for which the channel has been adjusted to the data demodulator 523 of the physical downlink shared channel decoder 517.

The physical downlink shared channel decoder 517 demodulates and decodes the PDSCH in response to an instruction from the controller 405, and detects information data. The data demodulator 523 demodulates the signal on the PDSCH received from the channel compensator 515, and outputs the demodulated signal on the PDSCH to the turbo decoder 525. The demodulation performed here is demodulation corresponding to the modulation scheme used in the data modulator 221 of the base station apparatus 3. The turbo decoder 525 decodes information data from the demodulated signal on the PDSCH received from the data demodulator 523, and outputs the information data to a higher layer via the controller 405. The control information and so forth that is transmitted using the PDSCH and that is generated by the radio resource controller 103 of the base station apparatus 3 is also output to the controller 405, and is also output to the radio resource controller 403 via the controller 405. The CRC code included in the PDSCH is also output to the controller 405.

The PDCCH channel compensator 519 adjusts the amplitude and phase of the signal of the PDCCH obtained through demultiplexing performed by the demultiplexer 511 on the basis of the channel compensation value received from the channel estimator 513. For example, the PDCCH channel compensator 519 performs adjustment on a signal on the second PDCCH on the basis of the channel compensation value generated by the channel estimator 513 on the basis of a UE-specific RS, and performs adjustment on a signal on the first PDCCH on the basis of the channel compensation value generated by the channel estimator 513 on the basis of a CRS. For example, the PDCCH channel compensator 519 adjusts the signals on individual E-CCEs in a DL PRB pair in the second PDCCH region on the basis of a channel compensation value generated on the basis of the UE-specific RSs for the transmit antennas (antenna ports) corresponding to the individual E-CCEs specified by the controller 405. The PDCCH channel compensator 519 outputs the adjusted signal to the PDCCH demapping unit 533.

The PDCCH demapping unit 533 performs demapping for the first PDCCH or demapping for the second PDCCH on the signal received from the PDCCH channel compensator 519. Further, the PDCCH demapping unit 533 performs demapping for the first physical resource mapping or demapping for the second physical resource mapping on the signal on the second PDCCH received from the PDCCH channel compensator 519. The PDCCH demapping unit 533 converts the received signal on the first PDCCH to a signal in units of CCEs as described above with reference to FIG. 16 so that processing is performed in units of CCEs illustrated in FIG. 15 on the received signal on the first PDCCH in the physical downlink control channel decoder 521. The PDCCH demapping unit 533 converts the received signal on the second PDCCH to a signal in units of E-CCEs so that processing is performed in units of E-CCEs illustrated in FIG. 18 on the received signal on the second PDCCH in the physical downlink control channel decoder 521. The PDCCH demapping unit 533 converts the received signal on the second PDCCH in the second PDCCH region to which the first physical resource mapping is applied to a signal in units of E-CCEs, as described above with reference to FIG. 21. The PDCCH demapping unit 533 converts the received signal on the second PDCCH in the second PDCCH region to which the second physical resource mapping is applied to a signal in units of E-CCEs, as described above with reference to FIG. 22. The PDCCH demapping unit 533 outputs the converted signal to the QPSK demodulator 527 of the physical downlink control channel decoder 521.

The physical downlink control channel decoder 521 demodulates and decodes the signal received from the PDCCH channel compensator 519 and detects control data as described below. The QPSK demodulator 527 performs QPSK demodulation on the signal on the PDCCH and outputs the signal to the Viterbi decoder 529. The Viterbi decoder 529 decodes the signal demodulated by the QPSK demodulator 527 and outputs DCI obtained through decoding to the controller 405. Here, this signal is expressed in units of bits, and the Viterbi decoder 529 also performs rate dematching to adjust the number of bits on which Viterbi decoding processing is to be performed for input bits.

First, a description will be given of a detection process for the first PDCCH. The mobile station apparatus 5 performs a process of detecting DCI addressed to the mobile station apparatus 5 under the assumption of a plurality of CCE aggregation numbers. The mobile station apparatus 5 performs a decoding process that differs every assumed CCE aggregation number (coding rate) on the signal on the first PDCCH, and obtains DCI included in the first PDCCH in which no error is detected in a CRC code added to the first PDCCH together with the DCI. Such a process is referred to as blind decoding. The mobile station apparatus 5 does not perform blind decoding on the signals (receive signals) of all the CCEs (REGs) in the downlink system band under the assumption of the first PDCCH, but performs blind decoding on only some of the CCEs. Some of the CCEs on which blind decoding is performed are referred to as a search space (search space for the first PDCCH). Further, different search spaces (search spaces for the first PDCCH) are defined for individual CCE aggregation numbers. In the communication system 1 according to the embodiment of the present invention, different search spaces (search spaces for the first PDCCH) are set for the first PDCCH in the mobile station apparatus 5. Here, the search spaces for the first PDCCHs of the individual mobile station apparatuses 5 (search spaces for the first PDCCHs) may be made up of CCEs totally different from one another, or may be made up of CCEs totally identical to one another, or may be made up of CCEs that partially overlap with one another.

Next, a description will be given of a detection process for the second PDCCH. The mobile station apparatus 5 performs a process of detecting DCI for the mobile station apparatus 5 under the assumption of a plurality of E-CCE aggregation numbers. The mobile station apparatus 5 performs a decoding process that differs every assumed E-CCE aggregation number (coding rate) on the signal on the second PDCCH, and obtains DCI included in the second PDCCH in which no error is detected in the CRC code added to the second PDCCH together with the DCI. Such a process is referred to as blind decoding. The mobile station apparatus 5 does not perform blind decoding on the signals (receive signals) on all the E-CCEs in the second PDCCH region configured by the base station apparatus 3 under the assumption of the second PDCCH, but may perform blind decoding on only some of the E-CCEs. Some of the E-CCEs on which blind decoding is performed are referred to as a search space (search space for the second PDCCH). Different search spaces (search spaces for the second PDCCH) are defined for the individual E-CCE aggregation numbers. For the mobile station apparatus 5 for which a plurality of second PDCCH regions are configured, a search space is set (configured, defined) to each of the second PDCCH regions. For the mobile station apparatus 5, a search space is set for each of the second PDCCH region to which the first physical resource mapping is applied and the second PDCCH region to which the second physical resource mapping is applied. For the mobile station apparatus 5 for which a plurality of second PDCCH regions are configured, a plurality of search spaces are simultaneously set in a certain downlink subframe.

In the communication system 1 according to the embodiment of the present invention, different search spaces (search spaces for the second PDCCH) are set for the second PDCCH in the mobile station apparatus 5. Here, the search spaces for the second PDCCHs of the individual mobile station apparatuses 5 for which the same second PDCCH region is configured (search spaces for the second PDCCHs) may be made up of E-CCEs totally different from one another, or may be made up E-CCEs totally identical to one another, or may be made up of E-CCEs that partially overlap with one another.

For the mobile station apparatus 5 for which a plurality of second PDCCH regions are configured, a search space (search space for the second PDCCH) is set in each second PDCCH region. A search space (search space for the second PDCCH) means a logical region in which the mobile station apparatus 5 performs decoding and detection of the second PDCCH in the second PDCCH region. The search space (search space for the second PDCCH) is made up of a plurality of second PDCCH candidates. The second PDCCH candidates are targets on which the mobile station apparatus 5 performs decoding and detection of the second PDCCH. For each E-CCE aggregation number, different second PDCCH candidates are made up of different E-CCEs (including one E-CCE and a plurality of E-CCEs). The E-CCEs constituting a plurality of second PDCCH candidates of the search space (search space for the second PDCCH) in the second PDCCH region to which the first physical resource mapping is applied are made up of a plurality of E-CCEs in contiguous regions. The first E-CCE number that is used for the search space (search space for the second PDCCH) in the second PDCCH region is set for each mobile station apparatus 5. The E-CCEs constituting a plurality of second PDCCH candidates of the search space (search space for the second PDCCH) in the second PDCCH region to which the second physical resource mapping is applied are made up of a plurality of noncontiguous regions. The first E-CCE number that is used for the search space (search space for the second PDCCH) in the second PDCCH region is set for each mobile station apparatus 5 in each second PDCCH region. For example, with a random function using an identifier (mobile station identifier) assigned to the mobile station apparatus 5, the first E-CCE number that is used for the search space (search space for the second PDCCH) is set. For example, the base station apparatus 3 notifies the mobile station apparatus 5 of the first E-CCE number that is used in the search space (search space for the second PDCCH; by using RRC signaling.

The number of second PDCCH candidates may be different among the individual search spaces (search spaces for the second PDCCH) in a plurality of second PDCCH regions. The number of second PDCCH candidates in the search space (search space for the second PDCCH) in the second PDCCH region to which the first physical resource mapping is applied may be larger than the number of second PDCCH candidates in the search space (search space for the second PDCCH) in the second PDCCH region to which the second physical resource mapping is applied.

In a certain E-CCE aggregation number, the number of second PDCCH candidates in the search space (search space for the second PDCCH) in the second PDCCH region to which the first physical resource mapping is applied may be the same as the number of second PDCCH candidates in the search space (search space for the second PDCCH) in the second PDCCH region to which the second physical resource mapping is applied. In a different E-CCE aggregation number, the number of second PDCCH candidates in the search space (search space for the second PDCCH) in the second PDCCH region to which the first physical resource mapping is applied may be different from the number of second PDCCH candidates in the search space (search space for the second PDCCH) in the second PDCCH region to which the second physical resource mapping is applied.

The second PDCCH candidates of a certain E-CCE aggregation number may be configured for the search space (search space for the second PDCCH) in one second PDCCH region, and may not be configured for the search space (search space for the second PDCCH) in another second PDCCH region.

The number of second PDCCH candidates in the search space (search space for the second PDCCH) in one second PDCCH region may be changed on the basis of the number of second PDCCH regions configured for the mobile station apparatus 5. For example, as the number of second PDCCH regions configured for the mobile station apparatus 5 increases, the number of second PDCCH candidates in the search space (search space for the second PDCCH) in one second PDCCH region may be decreased.

The mobile station apparatus 5 configures the search space corresponding to the candidates of the E-CCE aggregation number to the second PDCCH region to which the first physical resource mapping is applied. The mobile station apparatus 5 identifies the transmit antennas (antenna ports) to be used for transmitting signals on individual E-CCEs in a DL PRB pair in the second PDCCH region on the basis of a combination of individual E-CCEs in the DL PRB pair and corresponding antenna ports reported from the base station apparatus 3 (the correspondence between the individual E-CCEs in the DL PRB pair in the second PDCCH region and antenna ports (transmit antenna) corresponding to the individual E-CCEs).

The controller 405 determines whether the DCI received from the Viterbi decoder 529 is correct DCI for the mobile station apparatus 5. In the case of determining that the DCI is correct DCI for the mobile station apparatus 5, the controller 405 controls the demultiplexer 511, the data demodulator 523, the turbo decoder 525, and the transmission processor 407 on the basis of the DCI. For example, in a case where the DCI is a downlink assignment, the controller 405 controls the reception processor 401 to decode the signal on the PDSCH. In the PDCCH, as in the PDSCH, a CRC code is included, and the controller 405 determines whether or not the DCI of the PDCCH is wrong by using the CRC code.

The downlink reception quality measurement unit 531 measures the reception quality (RSRP) in the downlink of the cell by using downlink reference signals (CRS, CSI-RS), and outputs downlink reception quality information obtained through the measurement to the controller 405. Also, the downlink reception quality measurement unit 531 measures instantaneous channel quality for generating a CQI to be reported from the mobile station apparatus 5 to the base station apparatus 3. The downlink reception quality measurement unit 531 outputs information on RSRP and so forth obtained through the measurement to the controller 405.

<Transmission Processor 407 of Mobile Station Apparatus 5>

Figure 6:
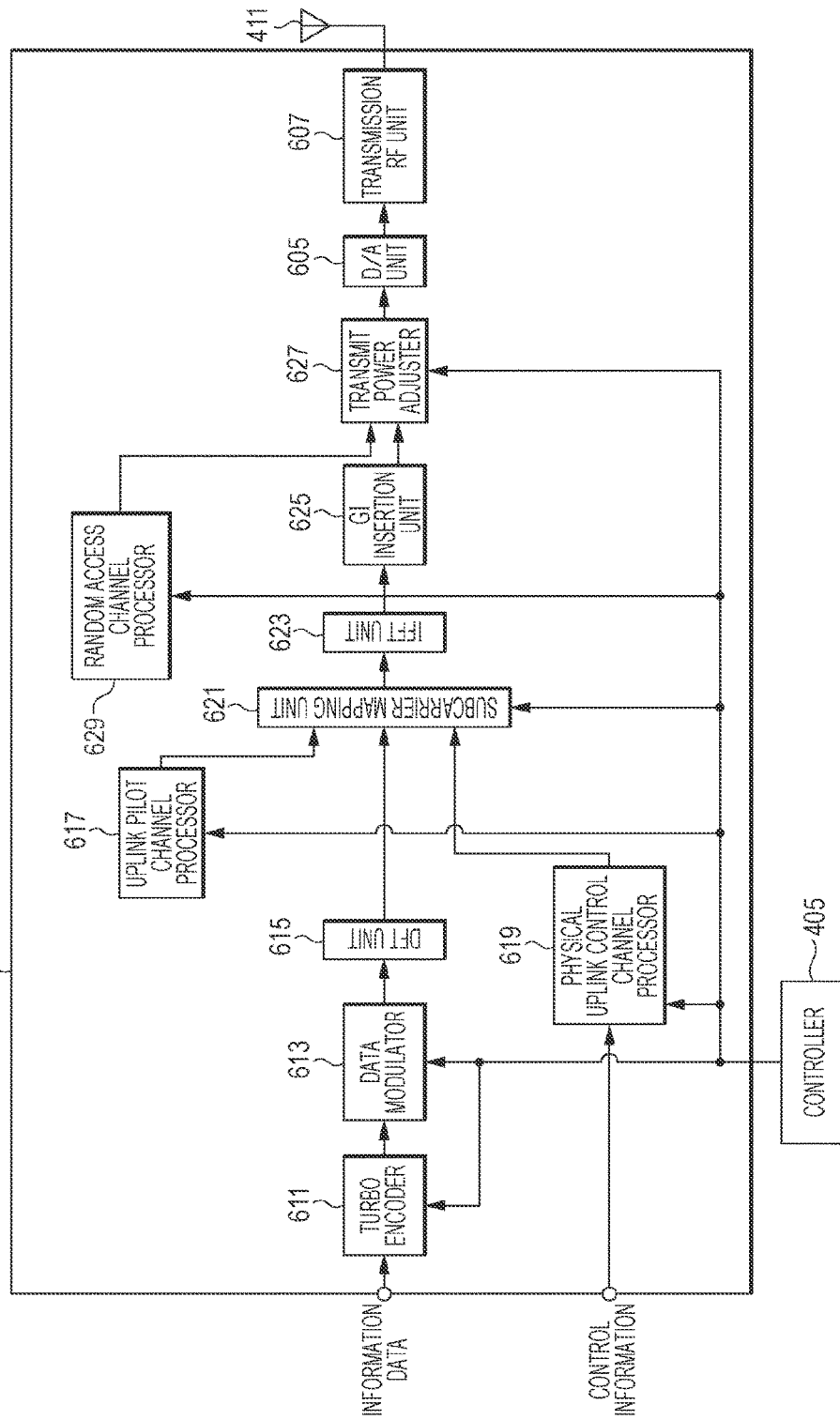
FIG. 6 is a schematic block diagram illustrating the configuration of a transmission processor 407 of the mobile station apparatus 5 according to the embodiment of the present invention.

FIG. 6 is a schematic block diagram illustrating the configuration of the transmission processor 407 of the mobile station apparatus 5 according to the embodiment of the present invention. As illustrated in FIG. 6, the transmission processor 407 includes a turbo encoder 611, a data modulator 613, a DFT unit 615, an uplink pilot channel processor 617, a physical uplink control channel processor 619, a subcarrier mapping unit 621, an IFFT unit 623, a GI insertion unit 625, a transmit power adjuster 627, a random access channel processor 629, a D/A unit 605, a transmission RF unit 607, and the transmit antenna 411. The transmission processor 407 encodes and modulates information data and UCI, generates signals to be transmitted using the PUSCH and PUCCH, and adjusts the transmit power of the PUSCH and PUCCH. The transmission processor 407 generates a signal to be transmitted using the PRACH, and adjusts the transmit power of the PRACH. The transmission processor 407 generates a DM RS and an SRS, and adjusts the transmit power of the DM RS and the SRS.

The turbo encoder 611 performs, on information data input thereto, turbo coding to enhance the error resilience of the data at a coding rate specified by the controller 405, and outputs the information data to the data modulator 613. The data modulator 613 modulates the encoded data obtained through encoding performed by the turbo encoder 611 by using a modulation scheme specified by the controller 405, for example, a modulation scheme such as QPSK, 16QAM, and 64QAM, and generates a signal sequence of modulation symbols. The data modulator 613 outputs the generated signal sequence of modulation symbols to the DFT unit 615. The DFT unit 615 performs discrete Fourier transform on the signal output from the data modulator 613, and outputs the signal to the subcarrier mapping unit 621.

The physical uplink control channel processor 619 performs baseband signal processing for transmitting the UCI received from the controller 405. The UCI input to the physical uplink control channel processor 619 is an ACK/NACK, an SR, or a CQI. The physical uplink control channel processor 619 performs baseband signal processing, and outputs a signal generated thereby to the subcarrier mapping unit 621. The physical uplink control channel processor 619 encodes the information bits of the UCI to generate a signal.

Also, the physical uplink control channel processor 619 performs signal processing relating to code multiplexing in the frequency domain and/or code multiplexing in the time domain on the signal generated from the UCI. The physical uplink control channel processor 619 multiplies a signal on the PUCCH generated from the information bit of an ACK/NACK, or the information bit of an SR, or the information bit of a CQI, by a code sequence specified by the controller 405 in order to realize code multiplexing in the frequency domain. The physical uplink control channel processor 619 multiplies a signal on the PUCCH generated from the information bit of an ACK/NACK, or the information bit of an SR, by a code sequence specified by the controller 405 in order to realize code multiplexing in the time domain.

The uplink pilot channel processor 617 generates an SRS and a DM RS, which are known signals in the base station apparatus 3, in response to an instruction from the controller 405, and outputs them to the subcarrier mapping unit 621.

The subcarrier mapping unit 621 maps the signal received from the uplink pilot channel processor 617, the signal received from the DFT unit 615, and the signal received from the physical uplink control channel processor 619 to a subcarrier in response to an instruction from the controller 405, and outputs the signals to the IFFT unit 623.

The IFFT unit 623 performs inverse fast Fourier transform on the signals output from the subcarrier mapping unit 621, and outputs the signals to the GI insertion unit 625. Here, the number of points of the IFFT unit 623 is larger than the number of points of the DFT unit 615. The mobile station apparatus 5 modulates, using the DFT-Spread-OFDM scheme, on the signal to be transmitted using the PUSCH, by using the DFT unit 615, the subcarrier mapping unit 621, and the IFFT unit 623. The GI insertion unit 625 adds guard interval to the signals received from the IFFT unit 623, and outputs the signals to the transmit power adjuster 627.

The random access channel processor 629 generates a signal to be transmitted using the PRACH by using a preamble sequence specified by the controller 405, and outputs the generated signal to the transmit power adjuster 627.

The transmit power adjuster 627 adjusts the transmit power of the signal received from the GI insertion unit 625 or the signal received from the random access channel processor 629 on the basis of a control signal from the controller 405, and outputs the signal to the D/A unit 605. In the transmit power adjuster 627, the average transmit powers of the PUSCH, PUCCH, DMRS, SRS, and PRACH are controlled for each uplink subframe.

The D/A unit 605 converts the baseband digital signal received from the transmit power adjuster 627 to an analog signal, and outputs the analog signal to the transmission RF unit 607. The transmission RF unit 607 generates in-phase components and orthogonal components of an intermediate frequency from the analog signal received from the D/A unit 605, and removes extra frequency components for the intermediate frequency band. Subsequently, the transmission RF unit 607 converts (up-converts) the intermediate-frequency signal into a high-frequency signal, removes extra frequency components, amplifies the power, and transmits the signal to the base station apparatus 3 via the transmit antenna 411.

Figure 7:
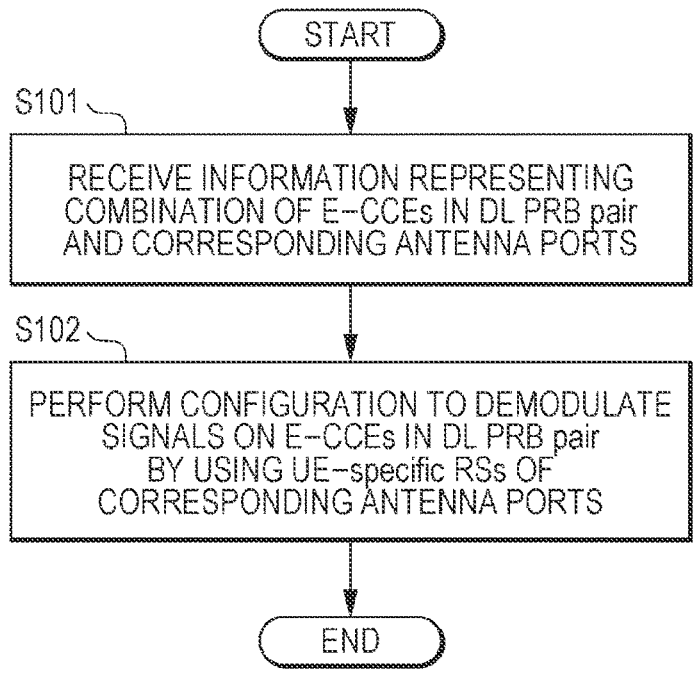
FIG. 7 is a flowchart illustrating an example of a process related to setting of UE-specific RSs used to demodulate individual E-CCEs in a DL PRB pair in a second PDCCH region in the mobile station apparatus 5 according to the embodiment of the present invention.

FIG. 7 is a flowchart illustrating an example of a process related to configuration of a UE-specific RS used to demodulate individual E-CCEs in the DL PRB pair in the second PDCCH region, performed by the mobile station apparatus 5 according to the embodiment of the present invention. Here, a description will be given of an example of a process performed in the second PDCCH region to which the first physical resource mapping is applied.

The mobile station apparatus 5 receives, from the base station apparatus 3, information representing a combination of individual E-CCEs in the DL PRB pair and corresponding antenna ports by using RRC signaling (step S101). Subsequently, on the basis of the information received from the base station apparatus 3, the mobile station apparatus 5 performs configuration to demodulate the signals on the individual E-CCEs in the DL PRB pair by using UE-specific RSs of the corresponding antenna ports (step S102).

Figure 8:
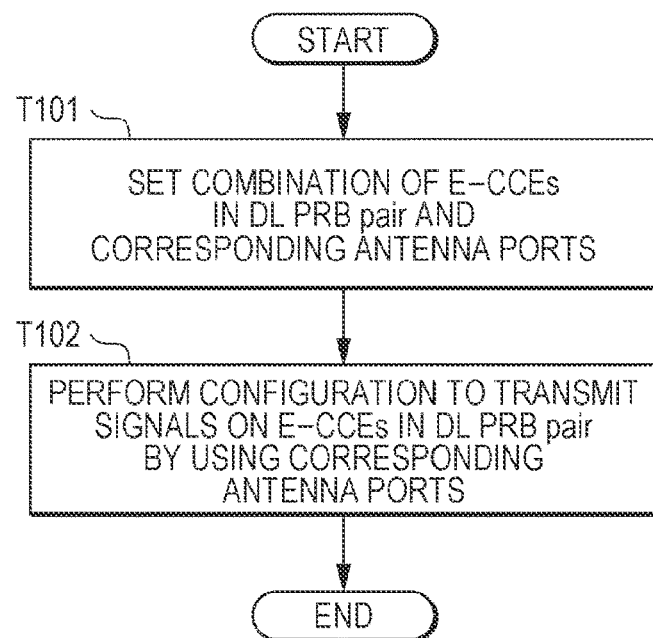
FIG. 8 is a flowchart illustrating an example of a process related to setting of transmit antennas (antenna ports) used to transmit individual E-CCEs in a DL PRB pair in a second PDCCH region in the base station apparatus 3 according to the embodiment of the present invention.

FIG. 8 is a flowchart illustrating an example of a process related to configuration of transmit antennas (antenna ports) to be used to transmit individual E-CCEs in the DL PRB pair in the second PDCCH region, performed by the base station apparatus 3 according to the embodiment of the present invention. Here, a description will be given of an example of a process performed in the second PDCCH region to which the first physical resource mapping is applied.

The base station apparatus 3 sets, for a certain mobile station apparatus 5, a combination of individual E-CCEs in the DL PRB pair and corresponding antenna ports, on the basis of the arrangement state of mobile station apparatuses 5 in the cell (on the basis of a determination result about application of MU-MIMO) (step T101). Subsequently, the base station apparatus 2 performs configuration to transmit the signals on the individual E-CCEs in the DL PRB pair by using the corresponding antenna ports (step T102).

A description will be given below of the embodiment from another point of view. A base station apparatus includes a transmission unit (transmission RF unit) that transmits a signal obtained by frequency multiplexing a PDSCH (physical shared channel or shared channel) for carrying data addressed to a terminal apparatus and an E-PDCCH (physical control channel or control channel) for carrying control information addressed to the terminal apparatus by using L resource block pairs (L is an integer of 2 or more) arranged in the frequency direction within a system bandwidth; a mapping unit (multiplexer) that maps M E-CCEs (first elements, control information elements) constituting one E-PDCCH (M represents an E-CCE aggregation number and is a natural number), to any K resource elements (K is a natural number) in the L×N regions (second elements) that are obtained by dividing each of the L resource blocks into N regions (N is a natural number); and a notification unit (radio resource controller) that notifies the terminal apparatus of information specifying the N or K and/or information specifying a possible set of the M.

On the other hand, the terminal apparatus includes a reception unit (reception RF unit) that receives a signal obtained by frequency multiplexing a physical shared channel for carrying data addressed to the terminal apparatus and a physical control channel for carrying control information addressed to the terminal apparatus by using L resource block pairs (L is an integer of 2 or more) arranged in the frequency direction within a system bandwidth; a monitoring unit (PDCCH demapping unit and physical downlink control channel decoder) that configures one physical control channel by combining M (natural number) control information elements mapped to any K resource elements (K is a natural number) in the L×N regions that are obtained by dividing each of the L resource blocks into N regions (N is a natural number); and an obtaining unit (radio resource controller) that obtains information specifying the N or K and/or information specifying a possible set of the M.

Here, for example, N=4 in FIG. 21 (or FIG. 22) and FIG. 23, whereas K=2 in FIG. 21 (or FIG. 22), and K=1 in FIG. 23. In this way, in the case of changing K by fixing N, the base station apparatus notifies the terminal apparatus of K, and the terminal apparatus obtains K. Accordingly, the number of resource elements included in one E-CCE can be limited. Alternatively, N may be changed by fixing K. For example, N is fixed to 1, and switching is performed between K=2 and K=1. In a case where N=2 and K=1, a resource element is divided into two regions, and one E-CCE is mapped to each of the regions, which is substantially the same as the assignment illustrated in FIG. 21. N=1 and K=1 is illustrated in FIG. 23. In this way, in the case of changing N by fixing K, the base station apparatus notifies the terminal apparatus of N, and the terminal apparatus obtains N. Accordingly, the number of resource elements included in one E-CCE can be limited. FIGS. 21 to 23 illustrate the cases where a resource block pair is divided along the frequency axis, but the embodiment is not limited to these cases. For example, in a case where a resource block pair is divided into i regions along the frequency axis and j regions along the time axis, the resource block pair is divided into i×j regions along the frequency axis and time axis (i and j are natural numbers).

Alternatively, N and K may be fixed, a possible set of M may be changed, the base station apparatus may notify the terminal apparatus of M, and the terminal apparatus may obtain M. For example, N=1 and K=1, and a possible set of M (a set of possible values of M) is switched between a first set {1, 2, 4, 8} and a second set {2, 4, 8, 16}. The terminal performs blind decoding (attempts configuration and decoding of E-PDCCH) on reported candidates of E-CCE aggregation number. Accordingly, the number of resource elements included in one E-PDCCH can be limited. Here, it is preferable that the second set include a value larger than any values included in the first set (in this case 16). Accordingly, the maximum number of resource elements included in an E-PDCCH can be changed. Preferably, the first set and the second set include the same number of values (in this case 4). Accordingly, the number of candidates is the same in the first set and the second set, and the number of blind decoding (the number of attempts of configuration and decoding of E-PDCCH) is constant.

As described above, in the embodiment of the present invention, in the communication system 1, a plurality of physical resource block pairs (PBB pairs) are configured as a control channel region (second PDCCH region) (second PDCCH region to which first physical resource mapping is applied), which is a region where a control channel (second PDCCH) is possibly mapped, a first element (E-CCE) is made up of resources obtained by dividing one physical resource block pair (PRB pair), and the control channel (second PDCCH) is made up of an aggregation of one or more first elements (E-CCEs) (E-CCE aggregation). The system includes a plurality of mobile station apparatuses 5 and a base station apparatus 3 that communicates with the plurality of mobile station apparatuses 5 by using a control channel (second PDCCH). The base station apparatus 3 sets, for each mobile station apparatus 5, any one of a plurality of combinations regarding the correspondence between a plurality of first elements (E-CCEs) in a physical resource block pair (PRB pair) and a plurality of antenna ports used to transmit the signals on the individual first elements (E-CCEs). On the basis of the combination set by the base station apparatus 3, the mobile station apparatus 5 configures the antenna ports corresponding to reference signals (UE-specific RSs) used to demodulate the signals on the individual first elements (E-CCEs) in the physical resource block pair (PRB pair). Accordingly, the base station apparatus 3 is capable of efficiently performing control to increase the capacity of the entire control channel, by increasing the capacity of the entire control channel by performing spatial multiplexing of the second PDCCH in application of MU-MIMO and by improving the performance of the second PDCCH in application of beamforming, not MU-MIMO.

In the embodiment of the present invention, to simplify the description, the region of resources in which a second PDCCH is possibly mapped is defined as a second PDCCH region. It is clear that the present invention is applicable to a region defined by another term as long as the term has a similar meaning.

The mobile station apparatus 5 is not limited to a mobile terminal, and the present invention may be realized by installing the function of the mobile station apparatus 5 into a fixed terminal.

The characteristic means of the present invention described above can also be implemented by installing the function in an integrated circuit and controlling the function. That is, an integrated circuit according to the present invention is an integrated circuit which is mounted in a mobile station apparatus that communicates with a base station apparatus by using a control channel, and for which a plurality of physical resource block pairs are configured as a control channel region, which is a region in which the control channel is possibly mapped, first elements are made up of resources obtained by dividing one of the physical resource block pairs, and the control channel is made up of an aggregation of one or more first elements. The integrated circuit includes a first receiver that receives, from the base station apparatus, information representing any one of a plurality of combinations regarding the correspondence between the plurality of first elements in the physical resource block pair and a plurality of antenna ports that are used to transmit signals on the individual first elements, and a first radio resource controller that configures, on the basis of the information representing the combination received by the first receiver, antenna ports corresponding to the reference signals used to demodulate the signals on the individual first elements in the physical resource block pair.

The integrated circuit according to the present invention is an integrated circuit which is mounted in a base station apparatus that communicates with a plurality of mobile station apparatuses by using a control channel, and for which a plurality of physical resource block pairs are configured as a control channel region, which is a region in which the control channel is possibly mapped, first elements are made up of resources obtained by dividing one of the physical resource block pairs, and the control channel is made up of an aggregation of one or more first elements. The integrated circuit includes a second radio resource controller that sets, for the mobile station apparatuses, any one of a plurality of combinations regarding the correspondence between the plurality of first elements in the physical resource block pair and a plurality of antenna ports that are used to transmit signals on the individual first elements.

The operation described in the embodiment of the present invention may be implemented by a program. The program that operates in the mobile station apparatus 5 and the base station apparatus 3 according to the present invention is a program that controls a CPU or the like (program that causes a computer to function) to implement the function of the above-described embodiment according to the present invention. The information handled in these apparatuses is temporarily stored in a RAM during processing, and is then stored in various ROMs or HDDs, is read out by the CPU if necessary, and is modified or written. A recording medium that stores the program may be any one of a semiconductor medium (for example, a ROM, a nonvolatile memory card, or the like), an optical recording medium (for example, a DVD, an MO, an MD, a CD, a BD, or the like), a magnetic recording medium (for example, a magnetic tape, a flexible disk, or the like), and so forth. The function of the above-described embodiment is implemented by executing a loaded program. In addition, the function of the present invention may be implemented by performing processing in conjunction with an operating system or another application program or the like on the basis of an instruction of the program.

In the case of circulating the program in the market, the program may be circulated by being stored in a portable recording medium or by being transferred to a server computer connected via a network, such as the Internet. In this case, a storage device of the server computer is also included in the present invention. Part or all of the mobile station apparatuses 5 and the base station apparatus 3 according to the above-described embodiment may be typically implemented as an LSI, which is an integrated circuit. The individual functional blocks of the mobile station apparatuses 5 and the base station apparatus 3 may be individually mounted on chips, or some or all of the functional blocks may be integrated into a chip. The integration method is not limited to the LSI, and an integrated circuit may be formed of a dedicated circuit or a multi-purpose processor. In a case where an integration technology that replaces the LSI emerges due to progress of the semiconductor technology, an integrated circuit produced based on the technology can be used. The individual functional blocks of the mobile station apparatuses 5 and the base station apparatus 3 may be formed of a plurality of circuits.

Information and signals can be indicated by using various different technologies and method. For example, a chip, a symbol, a bit, a signal, information, a command, an instruction, and data that can be referred to through the description given above can be indicated by a voltage, a current, an electromagnetic wave, a magnetic field or magnetic particle, an optical field or optical particle, or a combination of them.

Various exemplary logical blocks, processing units, and algorithm steps described above in association with the disclosure of this description can be mounted as electronic hardware, computer software, or a combination of both. To clearly express the synonymity of hardware and software, various exemplary elements, blocks, modules, circuits, and steps have been described about their functionality. Whether such functionality is installed as hardware or software depends on design restrictions on individual applications and the entire system. A person skilled in the art can install the above-described functionality by using various methods for individual specific applications, but decision of such installation should not be interpreted as deviation from the scope of the present disclosure.

Various exemplary logical blocks and processing units described above in association with the disclosure of this description can be installed or implemented by a multi-purpose processor, digital signal processor (DSP), application specific integrated circuit (ASIC), and field programmable gate array signal (FPGA) that are designed to execute the functions described in this description, or another programmable logical device, a discrete gate or transistor logic, a discrete hardware component, or a combination of them. The multi-purpose processor may be a microprocessor. Instead, the processor may be a conventional processor, a controller, a microcontroller, or a state machine. Alternatively, the processor may be installed in combination with a computing device. The combination may be, for example, a combination of a DSP and a microprocessor, a combination of a plurality of microprocessors, one or more microprocessors connected to a DSP core, or a combination of other configurations.

The method or algorithm steps described above in association with the disclosure of this description can be directly embodied by hardware, a software module implemented by a processor, or a combination of them. The software module can exist in a RAM memory, a flash memory, a ROM memory, an EPROM memory, an EEPROM memory, a register, a hard disk, a removable disc, a CD-ROM, or recording media in various formats that are known in this field. A typical recording medium can be coupled to a processor so that the processor can read information from the recording medium and can write information on the recording medium. In another method, the recording medium may be incorporated into the processor. The processor and the recording medium may be in an ASIC. The ASIC can be in a mobile station apparatus (user terminal). Alternatively, the processor and the recording medium may be in the mobile station apparatus 5 as discrete elements.

In one or more typical designs, the functions described above can be installed as hardware, software, firmware, or a combination of them. If the functions are installed as software, the functions can be stored or transmitted as one or more instructions or codes on a computer-readable medium. The computer-readable medium includes a communication medium and a computer recording medium, which include a medium that helps carrying of a computer program from a certain place to another place. A recording medium may be any commercially available medium that can be accessed by a multi-purpose or application-specific computer. Examples of such a computer-readable medium include a RAM, a ROM, an EEPROM, a CDROM, or another optical disc medium, a magnetic disk medium or another magnetic recording medium, or a medium usable for carrying or holding desired program code means in the form of an instruction or a data structure and in the form of being accessible by a multi-purpose or application-specific computer or a multi-purpose or application-specific processor. The computer-readable medium is not limited to these examples. Various forms of connection are appropriately called computer-readable media. For example, in a case where software is transmitted from a website, a server, or another remote source by using a coaxial cable, an optical fiber cable, a twisted pair, a digital subscriber line (DSL), or a wireless technology such as infrared, radio, or microwaves, the coaxial cable, optical fiber cable, twisted pair, DSL, or the wireless technology such as infrared, radio, or microwaves are included in the definition of a medium. The disc or disk used in this description includes a compact disc (CD), a laser disc (registered trademark), an optical disc, a digital versatile disc (DVD), a floppy (registered trademark) disk, and a blue-ray disc. Generally, data is magnetically played back from a disk, whereas data is optically played back from a disc using laser. A combination of the above-described media should also be included in the computer-readable medium.

The embodiment of the present invention has been described in detail above with reference to the drawings. The specific configuration is not limited to the embodiment, and design or the like within the gist of the present invention is also included in the claims.

REFERENCE SIGNS LIST 3 base station apparatus
4 (A-C) RRH
5 (A-C) mobile station apparatus
101 reception processor
103 radio resource controller
105 controller
107 transmission processor
109 receive antenna
111 transmit antenna
201 physical downlink shared channel processor
203 physical downlink control channel processor
205 downlink pilot channel processor
207 multiplexer
209 IFFT unit
211 GI insertion unit
213 D/A unit
215 transmission RF unit
219 turbo encoder
221 data modulator
223 convolutional encoder
225 QPSK modulator
227 precoding processor (for PDCCH)
229 precoding processor (for PDSCH)
231 precoding processor (for downlink pilot channel)
301 reception RF Unit
303 A/D unit
309 symbol timing detector
311 GI remover
313 FFT unit
315 subcarrier demapping unit
317 channel estimator
319 channel equalizer (for PUSCH)
321 channel equalizer (for PUCCH)
323 IDFT unit
325 data demodulator
327 turbo decoder
329 physical uplink control channel detector
331 preamble detector
333 SRS processor
401 reception processor
403 radio resource controller
405 controller
407 transmission processor
409 receive antenna
411 transmit antenna
501 reception RF Unit
503 A/D unit
505 symbol timing detector
507 GI remover
509 FFT unit
511 demultiplexer
513 channel estimator
515 channel compensator (for PDSCH)
517 physical downlink shared channel decoder
519 channel compensator (for PDCCH)
521 physical downlink control channel decoder
523 data demodulator
525 turbo decoder
527 QPSK demodulator
529 Viterbi decoder
531 downlink reception quality measurement unit
533 PDCCH demapping unit
605 D/A unit
607 transmission RF unit
611 turbo encoder
613 data modulator
615 DFT unit
617 uplink pilot channel processor
619 physical uplink control channel processor
621 subcarrier mapping unit
623 IFFT unit
625 GI insertion unit
627 transmit power adjuster
629 random access channel processor
2101 to 2112 region
2151 to 2155 E-CCE
2201 to 2208 region
2251 to 2254 E-CCE
2301 to 2312 region
2351 to 2362 E-CCE
2401 to 2406 PRB pair
2501 to 2506 PRB pair
2601 to 2606 PRB pair
2701 to 2706 PRB pair
2801 to 2806 PRB pair

The invention claimed is:

1. A terminal apparatus comprising:
a receiver that monitors an enhanced physical downlink control channel (ePDCCH), wherein
resources in a resource block pair within the ePDCCH each constitute constituting a second element, the resources being obtained by dividing at least a part of the resource block pair by N (N is a natural number),
the ePDCCH is received using one or more first elements, and
each of the one or more first elements includes a plurality of the second elements; and
a controller that selectively uses either a first value or a second value as the number of the second elements in each first element, wherein
the resource block pair is made up of two PRBs (physical resource blocks) that are contiguous in a time domain in a downlink, which one of the first value and the second value is to be used depends on at least a Radio Resource Control (RRC) signal transmitted from a base station apparatus, and the RRC signal is used to determine available resources for downlink transmissions.

2. The terminal apparatus according to claim 1, wherein each of a plurality of resource elements in the resource block pair, which are used to transmit the enhanced physical downlink control channel, is a part of one of N second elements in the resource block pair.

3. A base station apparatus comprising:

a transmitter that transmits an enhanced physical downlink control channel (ePDCCH), wherein resources in a resource block pair within the ePDCCH each constitute a second element, the resources being obtained by dividing at least a part of the resource block pair by N (N is a natural number), the ePDCCH is transmitted using one or more first elements, and each of the one or more first elements includes a plurality of the second elements; and a controller that selectively uses either a first value or a second value as the number of the second elements in each first element, wherein the resource block pair is made up of two PRBs (physical resource blocks) that are contiguous in a time domain in a downlink, the transmitter is further configured to and/or programmed to transmit, to a terminal apparatus, a Radio Resource Control (RRC) signal, which one of the first value and the second value is to be used depends the RRC signal, and the RRC signal is used to determine available resources for downlink transmissions.

4. The base station apparatus according to claim 3, wherein each of a plurality of resource elements in the resource block pair, which are used to transmit the enhanced physical downlink control channel, is a part of one of N second elements in the resource block pair.

5. A communication method of a terminal apparatus, the method comprising:

monitoring an enhanced physical downlink control channel (ePDCCH), wherein resources in a resource block pair within the ePDCCH each constitute a second element, the resources being obtained by dividing at least a part of the resource block pair by N (N is a natural number), the ePDCCH is received using one or more a plurality of-first elements, and each of the one or more first elements includes a plurality of the second elements; and using either a first value or a second value selectively as the number of the second elements in each first element, wherein the resource block pair is made up of two PRBs (physical resource blocks) that are contiguous in a time domain in a downlink, which one of the first value and the second, value is to be used depends on at least a Radio Resource Control (RRC)

signal transmitted from a base station apparatus, and the RRC signal is used to determine available resources for downlink transmissions.

6. The communication method according to claim 5, wherein each of a plurality of resource elements in the resource block pair, which are used to transmit the enhanced physical downlink control channel, is a part of one of N second elements in the resource block pair.

7. A communication method of a base station apparatus, the method comprising:

transmitting an enhanced physical downlink control channel (ePDCCH), wherein resources in a resource block pair within the ePDCCH each constitute a second element, the resources being obtained by dividing at least a part of the resource block pair by N (N is a natural number), the ePDCCH is transmitted using one or more first elements, and each of the one or more first elements includes a plurality of the second elements; and using either a first value or a second value selectively as the number of the second elements in each first element; and transmitting, to a terminal apparatus, a Radio Resource Control (RRC) signal, wherein the resource block pair is made up of two PRBs (physical resource blocks) that are contiguous in a time domain in a downlink, which one of the first value and the second value is to be used depends on the RRC signal, and the RRC signal is used to determine available resources for downlink transmissions.

8. The communication method according to claim 7, wherein each of a plurality of resource elements in the resource block pair, which are used to transmit the enhanced physical downlink control channel, is a part of one of N second elements in the resource block pair.

* * * * *